(12) United States Patent (10) Patent No.: US 8,154,672 B2
Abe (45) Date of Patent: Apr. 10, 2012

(54) REFLECTIVE LIQUID CRYSTAL DISPLAY APPARATUS

(75) Inventor: Masayuki Abe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/160,415

(22) Filed: Jun. 14, 2011

(65) Prior Publication Data

US 2011/0242455 A1 Oct. 6, 2011

Related U.S. Application Data

(60) Continuation of application No. 12/544,049, filed on Aug. 19, 2009, now Pat. No. 8,026,985, which is a division of application No. 11/228,612, filed on Sep. 16, 2005, now Pat. No. 7,595,848.

(30) Foreign Application Priority Data

Sep. 17, 2004 (JP) .................................. 2004-271469

(51) Int. Cl.
*G02F 1/1335* (2006.01)

(52) U.S. Cl. ............... 349/5; 349/117; 349/119; 349/13
(58) Field of Classification Search .................. None
See application file for complete search history.

(56) References Cited

U.S. PATENT DOCUMENTS 5,903,388 A * 5/1999 Sedlmayr ..................... 359/283

* cited by examiner

*Primary Examiner* — Lucy Chien
(74) *Attorney, Agent, or Firm* — Canon USA Inc IP Division

(57) ABSTRACT

At least one exemplary embodiment is directed to a reflective liquid crystal display apparatus which includes a polarization beam splitter having a polarization split film used as both a polarizer and an analyzer; a reflective liquid crystal display device; a quarter wave plate; and a projection optical system; where the absolute value of phase difference of diffracted light generated by the reflective liquid crystal display device in a black display state is reduced by the phase difference of the quarter wave plate, and thus the amount of stray light of the diffracted light guided from the polarizing beam splitter to the projection optical system decreases.

5 Claims, 39 Drawing Sheets

FIG. 19

| DIFFRACTION ORIENTATION ANGLE | ORDER OF DIFFRACTED LIGHT | 1 | 2 | 3 | 4 | 5 |
|---|---|---|---|---|---|---|
| | DIFFRACTION ANGLE | | | | | |
| 0 | | 3.5 | 7.0 | 10.5 | 14.0 | 17.5 |
| 90 | | 0 | 0 | 0 | 0 | 0 |
| 180 | | 1.5 | 3.0 | 4.5 | 6.0 | 7.5 |
| 270 | | 0 | 0 | 0 | 0 | 0 |
| | | -1.5 | -3.0 | -4.5 | -6.0 | -7.5 |

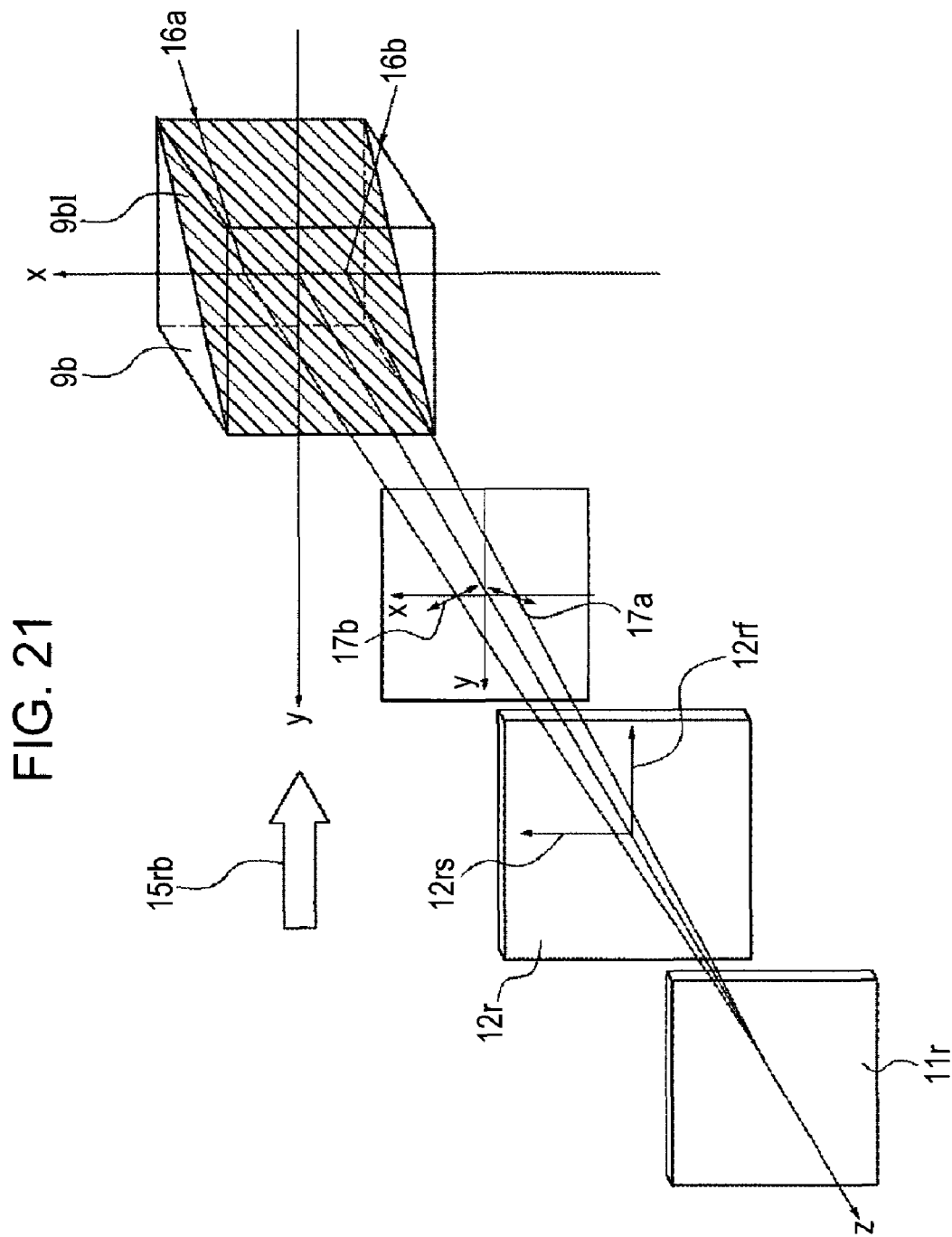

FIG. 26

| DIFFRACTION ORIENTATION ANGLE | ORDER OF DIFFRACTED LIGHT | | | | | |
|---|---|---|---|---|---|---|
| | DIFFRACTION ANGLE | 1 | 2 | 3 | 4 | 5 |
| 0 | | 4.0 | 8.0 | 12.0 | 16.0 | 20.0 |
| 90 | | -1.7 | -3.4 | -5.1 | -6.9 | -8.6 |
| 180 | | 0 | 0 | 0 | 0 | 0 |
| 270 | | 1.7 | 3.4 | 5.1 | 6.9 | 8.6 |

FIG. 32

| ORDER OF DIFFRACTED LIGHT | | 1 | 2 | 3 | 4 | 5 |
|---|---|---|---|---|---|---|
| DIFFRACTION ORIENTATION ANGLE | DIFFRACTION ANGLE | | | | | |
| 0 | | 3.0 | 6.0 | 9.0 | 12.0 | 15.0 |
| 90 | | 0 | 0 | 0 | 0 | 0 |
| 180 | | 1.3 | 2.6 | 3.9 | 5.1 | 6.4 |
| 270 | | 0 | 0 | 0 | 0 | 0 |
| | | -1.3 | -2.6 | -3.9 | -5.1 | -6.4 |

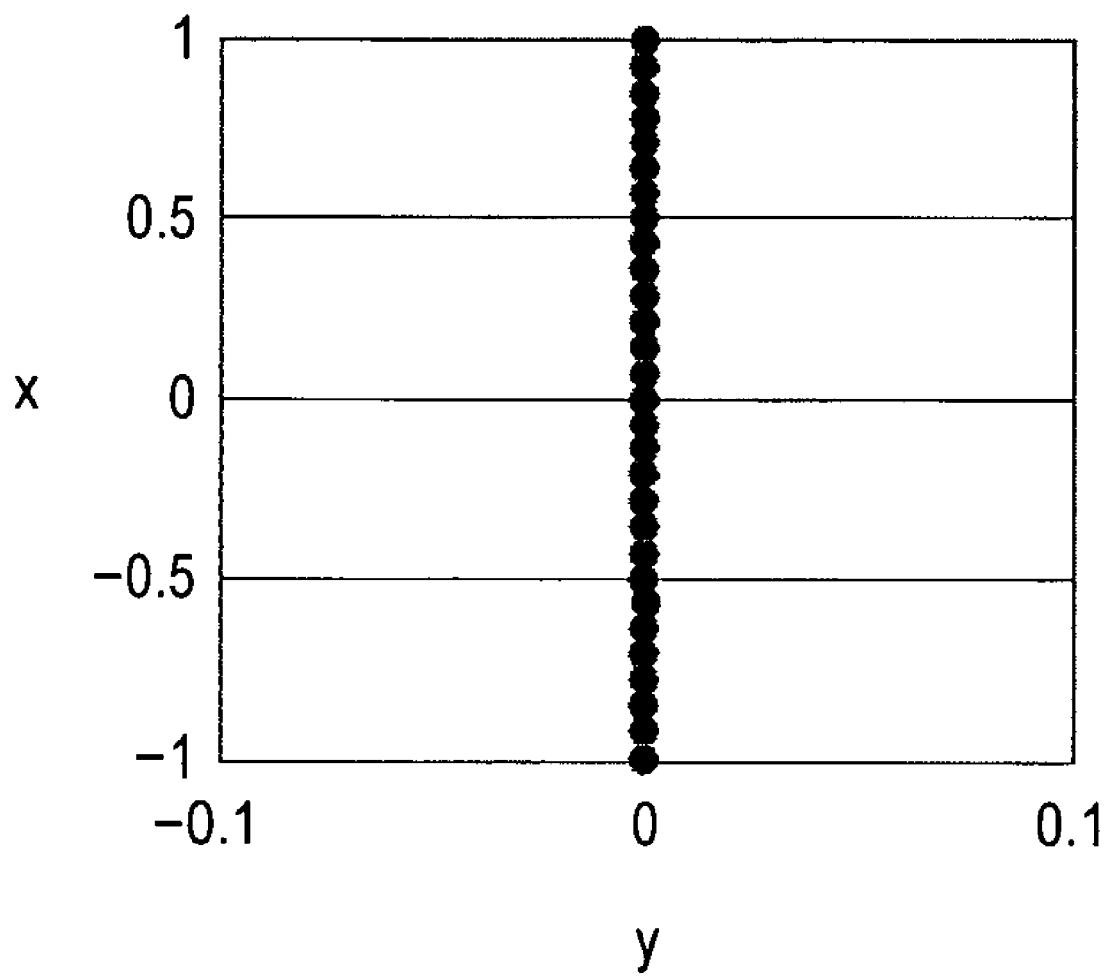

SLOW AXIS

FAST AXIS

SLOW AXIS

FAST AXIS

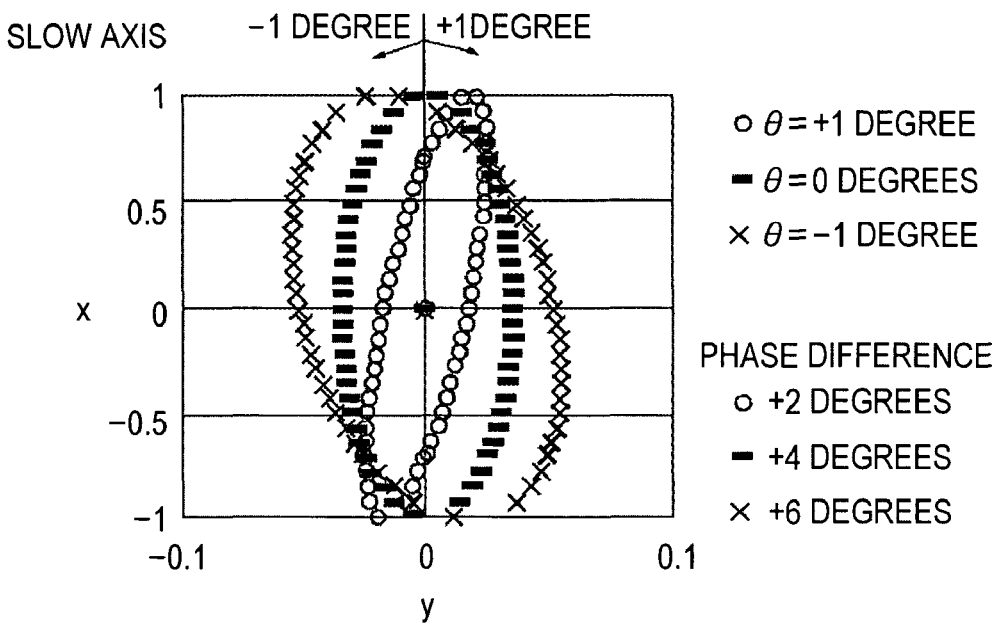
FIG. 46A SLOW AXIS
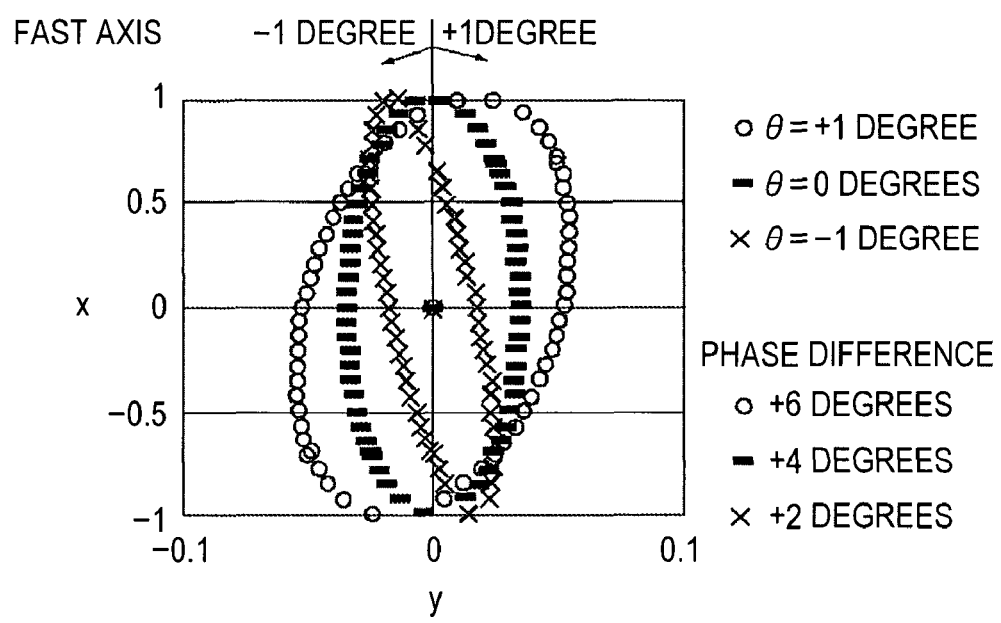
FIG. 46B FAST AXIS

REFLECTIVE LIQUID CRYSTAL DISPLAY APPARATUS

CROSS-REFERENCE TO RELATED APPLICATIONS

The present application is a continuation of U.S. patent application Ser. No. 12/544,049, filed Aug. 19, 2009, entitled "REFLECTIVE LIQUID CRYSTAL DISPLAY APPARATUS", which is a divisional of U.S. patent application Ser. No. 11/228,612, filed Sep. 16, 2005 (and now issued as U.S. Pat. No. 7,595,848), entitled "REFLECTIVE LIQUID CRYSTAL DISPLAY APPARATUS", of which the contents of both applications are expressly incorporated by reference herein in their entirety, hereby maintaining pendency. Further, the present application claims priority from Japanese Patent Application No. 2004-271469, filed Sep. 17, 2004, which is also hereby incorporated by reference herein in its entirety.

BACKGROUND OF THE INVENTION

1. Field of the Invention

The present invention relates to a reflective liquid crystal display apparatus.

2. Description of the Related Art

A configuration is discussed in U.S. Pat. No. 5,327,270 to improve contrast of a reflective liquid crystal display apparatus. The configuration includes a polarization beam splitter used as both a polarizer and an analyzer, and a quarter wave plate, where the quarter wave plate is disposed in an optical path of light exiting the polarization beam splitter and being cast into the polarization beam splitter again, such that the fast axis or the slow axis thereof is substantially orthogonal to a plane containing the incident optical axis and reflected optical axis of the polarization beam splitter.

The configuration of a conventional example of a reflective liquid crystal display apparatus is illustrated in FIG. 40.

Reference numeral 22 denotes a polarization beam splitter, 25 denotes a quarter wave plate, 34 denotes a reflective liquid crystal display device, 28 denotes the fast axis of the quarter wave plate 25, 53 denotes an incident light ray, 54 denotes a reflected light ray, 55 denotes the polarization axis direction of the incident light ray 53 being cast into the quarter wave plate 25, and 56 denotes the polarization axis of the reflected light ray 54 which has transmitted through the quarter wave plate 25.

The incident light ray 53 is linear polarized light being cast into the quarter wave plate 25, and the reflected light ray 54, which has passed through the quarter wave plate 25 twice via the reflective liquid crystal display device 36, is also linear polarized light. The direction bisecting the polarization direction 55 of the incident light ray 53 and the polarization direction 56 of the reflected light ray 54 matches the fast axis 28. The polarization direction 56 of the reflected light ray 54 matches the S-polarization direction of the reflected light ray 54. The polarization beam splitter is designed to not facilitate transmission of s-polarized light, and thus there is no polarization component of the reflected light ray 54 that passes through the polarization beam splitter 22. Thus, increasing the incident angle range to the polarization beam splitter 22 does not lead to reduction in contrast.

Also, a configuration is discussed in U.S. Pat. No. 6,501, 523 to improve contrast of a reflective liquid crystal display apparatus, where a reflective liquid crystal display apparatus comprises a reflective liquid crystal display device having a liquid crystal layer held between a transparent electrode and a reflecting electrode and a plurality of pixel circuits for driving the liquid crystal layer, and a wave plate, with the position of the optical axis (fast axis or slow axis) of the wave plate and the polarization direction of the incident polarized light with respect to the wave plate being slightly offset.

The configuration of a conventional example of a reflective liquid crystal display apparatus is illustrated in FIG. 41.

Reference numeral 101 denotes incident light, 102 denotes a polarization beam splitter, 103 denotes a polarizing film, 104 denotes a wave plate, 105 denotes an axis parallel to the polarization plane of S-polarized light, 106 denotes an axis parallel to the polarization plane of P-polarized light, 107 denotes a slow axis, 108 denotes a fast axis, 158 denotes a reflective liquid crystal display device, and 124 denotes the optical axis rotation angle of the wave plate.

Also, FIG. 42 illustrates reflectivity wavelength scattering properties in an arrangement where the optical axis rotation angle 124 (FIG. 41) of the quarter wave plate 104 is taken as a parameter with a TN (Twisted Nematic) mode twist angle of 80° and voltage of 4 Vrms applied for liquid crystal black display. Now, the optical axis rotation angle 124 of the quarter wave plate 104 is defined as θp, and increasing θp, with a θp=0 reference, reduces the reflectivity for liquid crystal black display. Particularly, taking note of the region around the wavelength 550 nm which is the center of the visible range and which greatly influences contrast, the reflectivity for liquid crystal black display is minimal when θp=around 3, i.e., contrast is increased.

Generally, with a liquid crystal display device used in liquid crystal projectors, pixels are arrayed in matrix fashion, and light cast into the liquid crystal display device exhibits diffraction and interference due to the shape of the pixel openings.

Also, the intensity of diffracted light is inversely proportionate to the size of the openings which have a cyclic structure, and also is proportionate to the wavelength. The pixel shape of liquid crystal devices for liquid crystal projectors is around 10 μm×10 μm, which is far smaller than those of direct-view liquid crystal devices used with personal computers, thus the diffraction phenomena occurs profusely. Moreover, diffracted (interference) light is reflected (transmitted) at a different angle from that of the specular reflection (0th order transmission), so phase difference error occurs due to liquid crystal wavelengths, outside the intended liquid crystal design values, passing through, resulting in reduced image quality of the image displayed.

The conventional art make no mention of diffracted light generated at the reflective liquid crystal display device, and thus they have not discussed that abnormal polarized light due to diffracted light cannot be controlled easily and that contrast cannot be sufficiently improved.

SUMMARY OF THE INVENTION

At least one exemplary embodiment is directed to a high-contrast liquid crystal display apparatus that can reduce not only 0th order light from specular reflection off of the liquid crystal display device when displaying black, but also multi-order diffracted (interference) light, to facilitate a high-contrast liquid crystal display apparatus.

At least one further exemplary embodiment is directed to a reflective liquid crystal display apparatus, comprising: a polarization beam splitter including a polarization split film used as both a polarizer and an analyzer; a reflective liquid crystal display device; a quarter wave plate disposed between the polarization beam splitter and the reflective liquid crystal display device; and a projection optical system. The quarter wave plate can be positioned such that either the slow axis or the fast axis of the quarter wave plate is generally parallel to the polarization axis direction of the polarization beam splitter. Additionally the quarter wave plate can be positioned so that the absolute value of phase difference of diffracted light generated by the reflective liquid crystal display device, in a black display state, is reduced by the phase difference of the quarter wave plate, and so that the amount of stray light of the diffracted light guided from the polarizing beam splitter to the projection optical system is decreased.

At least one exemplary embodiment is directed to a reflective liquid crystal display apparatus, comprising: a polarization beam splitter including a polarization split film; a reflective liquid crystal display device; a quarter wave plate disposed between the polarization beam splitter and the reflective liquid crystal display device; and an illumination optical system for guiding a light flux from a light source in a converged state to the polarization beam splitter, and also illuminating the reflective liquid crystal display device with light from the light source via the polarization beam splitter and the quarter wave plate. The optical axis of the illumination optical system can be inclined with respect to the polarization split film. A positive phase difference can be provided to convert linear polarized light into right-handed circling polarized light or elliptic polarized light. In at least one exemplary embodiment, the negative phase difference can be provided to convert linear polarized light into left-handed circling polarized light or elliptic polarized light. Further the phase difference, which the reflective liquid crystal display device in a black display state of the reflective liquid crystal display apparatus, provides to the diffracted light, occurring at the reflective liquid crystal display device, can be positive or zero. Where, with the polarization direction of S-polarized light defined by the optical axis of the illumination optical system and the polarization split film as the S-polarization direction, the polarization split film, which receives the light flux in a converged state, has a first region which emits light having a polarization direction inclined clockwise with respect to the S-polarization direction as viewed from the side of the reflective liquid crystal display device, and a second region which emits light, having a polarization direction inclined counter-clockwise with respect to the S-polarization direction as viewed from the side of the reflective liquid crystal display device. The phase difference, which the reflective liquid crystal display device provides to the first diffracted light emitted from a point on the optical axis of the reflective liquid crystal display device and cast into the first region, is smaller than the phase difference which the reflective liquid crystal display device provides to the second diffracted light emitted from a point on the optical axis of the reflective liquid crystal display device and cast into the second region. The quarter wave plate can be positioned such that the direction of the slow axis of the quarter wave plate and the S-polarization direction are generally parallel.

At least one further exemplary embodiment is directed to a reflective liquid crystal display apparatus, comprising: a polarization beam splitter including a polarization split film; a reflective liquid crystal display device; a quarter wave plate disposed between the polarization beam splitter and the reflective liquid crystal display device; and an illumination optical system for guiding a light flux from a light source in a converged state to the polarization beam splitter. The illumination optical system can also illuminate the reflective liquid crystal display device with light from the light source via the polarization beam splitter and the quarter wave plate. The optical axis of the illumination optical system can be inclined with respect to the polarization split film. Positive phase difference can be provided to convert linear polarized light into right-handed circling polarized light or elliptic polarized light. Additionally the negative phase difference can be provided to convert linear polarized light into left-handed circling polarized light or elliptic polarized light. The phase difference, which the reflective liquid crystal display device in a black display state of the reflective liquid crystal display apparatus, provides to the diffracted light occurring at the reflective liquid crystal display device can be positive or zero. The polarization direction of S-polarized light can be defined by the optical axis of the illumination optical system and the polarization split film as the S-polarization direction. The polarization split film, which receives the light flux in a converged state, can have a first region which emits light, having a polarization direction inclined clockwise with respect to the S-polarization direction as viewed from the side of the reflective liquid crystal display device, and a second region, which emits light having a polarization direction inclined counter-clockwise with respect to the S-polarization direction as viewed from the side of the reflective liquid crystal display device. The phase difference, which the reflective liquid crystal display device provides to the first diffracted light emitted from a point on the optical axis of the reflective liquid crystal display device and cast into the first region, can be greater than the phase difference, which the reflective liquid crystal display device provides to the second diffracted light emitted from a point on the optical axis of the reflective liquid crystal display device and cast into the second region. The quarter wave plate can be positioned such that the direction of the fast axis of the quarter wave plate and the S-polarization direction are generally parallel.

At least one further exemplary embodiment is directed to a reflective liquid crystal display apparatus, comprising: a polarization beam splitter having a polarization split film; a reflective liquid crystal display device; a quarter wave plate disposed between the polarization beam splitter and the reflective liquid crystal display device; and an illumination optical system for guiding a light flux from a light source in a converged state to the polarization beam splitter. The illumination optical system also can illuminate the reflective liquid crystal display device with light from the light source via the polarization beam splitter and the quarter wave plate. The optical axis of the illumination optical system can be inclined with respect to the polarization split film. Positive phase difference can be provided to convert linear polarized light into right-handed circling polarized light or elliptic polarized light. Additionally the negative phase difference can be provided to convert linear polarized light into left-handed circling polarized light or elliptic polarized light. The phase difference, which the reflective liquid crystal display device in a black display state of the reflective liquid crystal display apparatus provides to the diffracted light occurring at the reflective liquid crystal display device, can be negative or zero. The polarization direction of S-polarized light can be defined by the optical axis of the illumination optical system and the polarization split film as the S-polarization direction. The polarization split film, which receives the light flux in a converged state, has a first region which emits light having a polarization direction inclined clockwise with respect to the S-polarization direction as viewed from the side of the reflective liquid crystal display device, and a second region which emits light having a polarization direction inclined counter-clockwise with respect to the S-polarization direction as viewed from the side of the reflective liquid crystal display device. The phase difference, which the reflective liquid crystal display device provides to the first diffracted light emitted from a point on the optical axis of the reflective liquid crystal display device and cast into the first region, can be smaller than the phase difference which the reflective liquid crystal display device provides to the second diffracted light emitted from a point on the optical axis of the reflective liquid crystal display device and cast into the second region. The quarter wave plate is positioned such that the direction of the fast axis of the quarter wave plate and the S-polarization direction are generally parallel.

At least another exemplary embodiment is directed to a reflective liquid crystal display apparatus, comprising: a polarization beam splitter having a polarization split film; a reflective liquid crystal display device; a quarter wave plate disposed between the polarization beam splitter and the reflective liquid crystal display device; and an illumination optical system for guiding a light flux from a light source in a converged state to the polarization beam splitter. The illumination optical system also illuminates the reflective liquid crystal display device with light from the light source via the polarization beam splitter and the quarter wave plate. The optical axis of the illumination optical system can be inclined with respect to the polarization split film. Positive phase difference can be provided to convert linear polarized light into right-handed circling polarized light or elliptic polarized light. Additionally negative phase difference can be provided to convert linear polarized light into left-handed circling polarized light or elliptic polarized light. The phase difference, which the reflective liquid crystal display device in a black display state of the reflective liquid crystal display apparatus provides to the diffracted light occurring at the reflective liquid crystal display device, can be negative or zero. The polarization direction of S-polarized light can be defined by the optical axis of the illumination optical system and the polarization split film as the S-polarization direction. The polarization split film, which receives the light flux in a converged state, has a first region which emits light having a polarization direction inclined clockwise with respect to the S-polarization direction as viewed from the side of the reflective liquid crystal display device, and a second region which emits light having a polarization direction inclined counter-clockwise with respect to the S-polarization direction as viewed from the side of the reflective liquid crystal display device. The phase difference, which the reflective liquid crystal display device provides to the first diffracted light emitted from a point on the optical axis of the reflective liquid crystal display device and cast into the first region, can be greater than the phase difference which the reflective liquid crystal display device provides to the second diffracted light emitted from a point on the optical axis of the reflective liquid crystal display device and cast into the second region. The quarter wave plate can be positioned such that the direction of the slow axis of the quarter wave plate and the S-polarization direction are generally parallel.

According to at least one exemplary embodiment, the reflective liquid crystal display apparatus comprises a polarization beam splitter having a polarization split film used as both a polarizer and an analyzer, and a reflective liquid crystal display device. Additionally the reflective liquid crystal display apparatus can include a quarter wave plate having the fast axis and slow axis of the optical axis disposed between the polarization beam splitter and the reflective liquid crystal display device. The positioning direction of the optical axis (fast axis and slow axis) of the quarter wave plate can be in the direction of the polarization axis (analyzing axis) of the polarization beam splitter, so that the polarization axis direction of the diffracted light generated at the reflective liquid crystal display device, when displaying black, can be inclined such that stray light is reduced, thereby improving contrast.

Also, at least one exemplary embodiment facilitates direction of the orientation of the fast axis and slow axis of the quarter wave plate, disposed between the polarization beam splitter serving as both a polarizer and an analyzer, and the reflective liquid crystal display device, facilitates reduction of the amount of stray light when displaying black, and the improvement of contrast.

Further features of the present invention will become apparent from the following description of exemplary embodiments with reference to the attached drawings.

BRIEF DESCRIPTION OF THE DRAWINGS

FIG. 19 illustrates a diagram of the inclination angle of the polarizing splitting film to which is cast the diffracted light of the liquid crystal display device of the green light path in the first exemplary embodiment.

FIG. 21 illustrates a diagram showing polarization axis inclination generated by the polarization split film in the red light path in the first exemplary embodiment.

FIG. 26 illustrates a diagram of the inclination angle of the polarizing splitting film to which is cast the diffracted light of the liquid crystal display device of the red light path in the first exemplary embodiment.

FIG. 32 illustrates a diagram of the inclination angle of the polarizing splitting film to which is cast the diffracted light of the liquid crystal display device of the blue light path in the first exemplary embodiment.

FIG. 43 illustrates a diagram of the polarization state of S-polarized light.

FIGS. 46A and 46B illustrate diagrams of the polarization state of light, of which the diffracted light phase difference is 4°, immediately before passing through the quarter wave plate.

DESCRIPTION OF THE EMBODIMENTS

Figure 1:
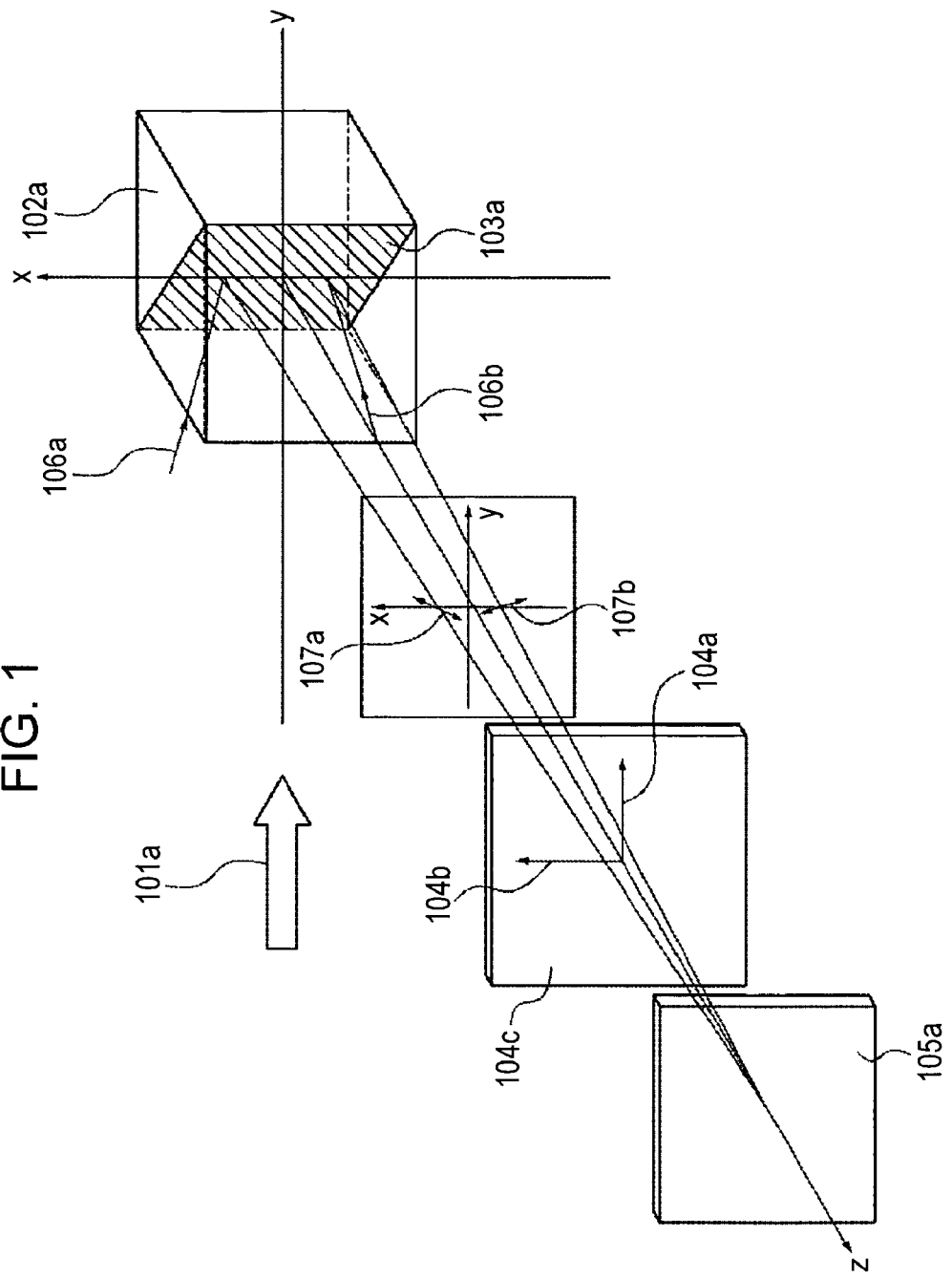
FIG. 1 illustrates a diagram showing the polarization axis inclination direction generated by a polarization split film.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example a light source is mentioned and an example of a high-pressure mercury vapor lamp is given, however any light source that provides the illumination needed for the working of embodiments is intended to lie within the scope of exemplary embodiments. Additionally the actual size of optical elements may not be discussed however any size from macro to nano sized optical elements are intended to lie within the scope of exemplary embodiments (e.g., wave plates with dimensions of nanometer size, micro size, centimeter size, and meter sizes). Additionally, exemplary embodiments are not limited to visual optical photographic systems, for example the system can be designed for use with infrared and other wavelength imaging systems. Additionally, exemplary embodiments can be used with non-digital systems as well as digital systems (e.g., photographic systems using CCDs)

Note that similar reference numerals and letters refer to similar items in the following figures, and thus once an item is defined in one figure, it may not be discussed for following figures.

Exemplary embodiments will now be described in detail with reference to the drawings.

First Exemplary Embodiment

FIG. 1 illustrates a schematic diagram of a reflective liquid crystal display device according to at least one exemplary embodiment.

Reference numeral 101a denotes incident light, 102a denotes a polarization beam splitter, 103a denotes a polarization split film of the polarization beam splitter 102a, 104c denotes a quarter wave plate, 104a denotes a slow axis and 104b denotes a fast axis, 105a denotes a reflective liquid crystal display device, 106a denotes incident light from the x positive direction within the xy plane, 106b denotes incident light from the x negative direction within the xy plane, 107a denotes the polarization axis according to which the incident light 106a can be inclined by the polarizing film 103a, 107b denotes the polarization axis according to which the incident light 106b can be inclined by the polarizing film 103a, the incident light axis in relation to the polarization beam splitter 102a is the y direction, the reflection light axis is the z direction, and the direction substantially perpendicular to the yz plane is the x direction. Note that the y direction and the z direction need not be orthogonal to each other (e.g., angle of incident+angle of reflection is not equal to 90 degrees). Additionally, the directions need not form a right-handed coordinate system, for example FIG. 1 illustrates a left-handed coordinate system where the cross product of the unit vector in the x-direction with the unit vector in the y-direction equals minus the direction of the z-direction unit vector.

Now, the incident light 101a reflects off of the polarization split film 103a of the polarization beam splitter 102a, passes through the quarter wave plate 104c, and is cast into the reflective liquid crystal display device 105a. Further, the light reflected off of the reflective liquid crystal display device 105a passes through the quarter wave plate 104c again, and then is cast into the polarization beam splitter 102a. The analyzing axis components of the polarization axis inclination 107a and 107b of the polarization beam splitter re analyzed, and the transmitting axis component substantially perpendicular to the analyzing axis is transmitted and projected as stray light.

Figure 2:
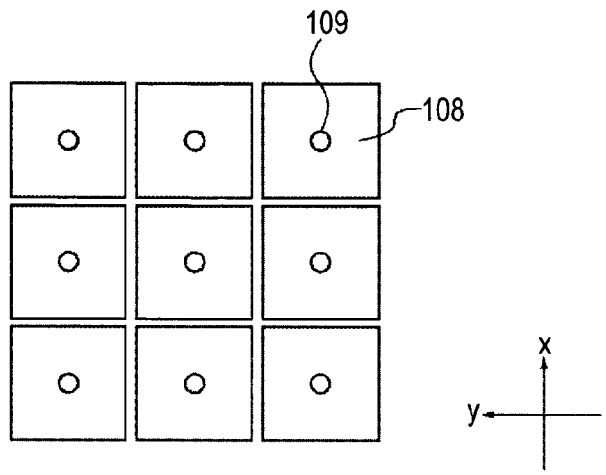
FIG. 2 illustrates a diagram showing the reflecting pixel electrode structure of a reflective liquid crystal display device.

FIG. 2 illustrates the shape of the reflecting pixel electrodes of the reflective liquid crystal display device 105a as viewed from the polarization beam splitter 102a side. Reference numeral 108 denotes reflecting pixel electrodes arrayed in matrix fashion in the x and y directions, and 109 denotes through hole contacts for making contact between the reflecting pixel electrodes 108 and wiring (not shown) provided to drive the reflecting pixel electrodes 108.

Now, upon light being cast into the reflective liquid crystal display device 105a, diffracted (interference) light is generated in the x positive direction, the x negative direction, the y positive direction, and the y negative direction, which are the directions of the array of pixels. The diffracted (interference) light is dependent on the shape of the reflective pixel electrodes and the wavelength of the incident light. The diffracted light traveling in the x positive direction is cast into the region of the polarizing axis 107a of the polarization split film 103a inclined clockwise, the polarizing axis 107a direction component is analyzed, and the component substantially perpendicular to the polarizing axis 107a direction is transmitted. The diffracted light traveling in the x negative direction is cast into the region of the polarizing axis 107b of the polarization split film 103a inclined counter-clockwise. The polarizing axis 107b direction component is analyzed, and the component substantially perpendicular to the polarizing axis 107b direction is transmitted. On the other hand, with regard to incident or reflected light from within the yz plane, the polarization axis direction of the polarization split film 103a is aligned in the x direction, so the x direction component of diffracted light traveling in the y positive direction or y negative direction is analyzed by the polarization split film 103a, and the component substantially perpendicular to the x direction (i.e., the y direction) is transmitted.

Now, let us consider a case where a beam, which reflects off of the polarization split film 103a with S-polarization in the z-axial direction, which is the optical axis direction of the incident light 101a, is cast into the quarter wave plate 104c and reflective liquid crystal display device. The beam which has reflected off of the polarization split film 103a with S-polarization is subjected to the phase effects of the quarter wave plate 104c while being transmitted therethrough, and is cast into the reflective liquid crystal display device 105a, where diffracted light is generated in the x and y axial directions (four directions) due to the shape of the pixel electrodes of the reflective liquid crystal display device 105a.

Figure 3:
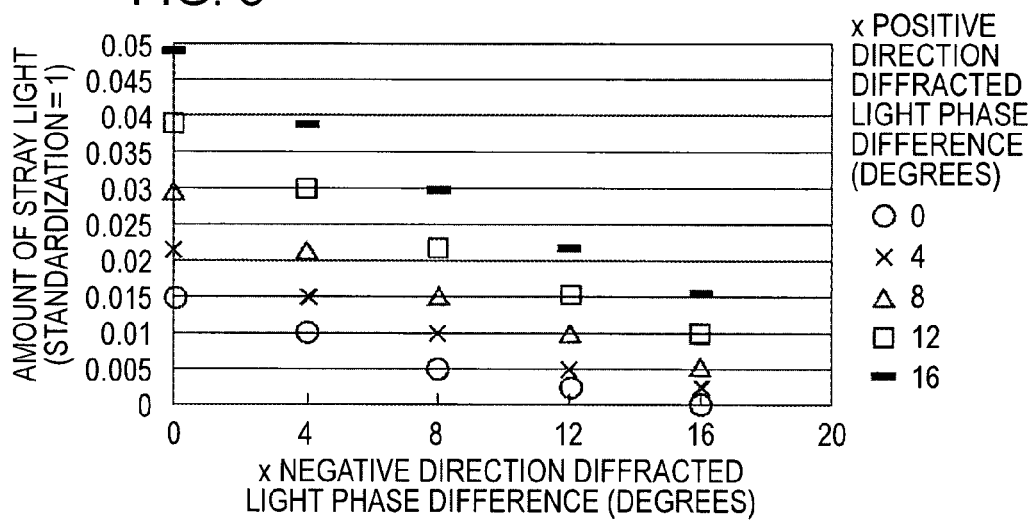
FIG. 3 illustrates a diagram showing the amount of stray light from diffracted light generated by the reflective liquid crystal display device.

First, let us discuss diffracted light generated in the x positive direction and x negative direction. FIG. 3 illustrates the calculation results of the sum of the amount of stray light due to diffracted light of arbitrary phase differences being cast in the directions of the polarization axis 107a inclined 5° in the clockwise direction and the polarization axis 107b inclined 5° in the counter-clockwise direction. The "X positive direction diffracted light phase difference (degrees)" in FIG. 3 means the phase difference which the reflective liquid crystal display device gives to the incident light. FIG. 3 illustrates phase difference cases of 0 degrees (indicated by circles), 4 degrees (indicated by x marks), 8 degrees (indicated by triangles), 12 degrees (indicated by squares), and 16 degrees (indicated by dashes). In each case, the intensity of the diffracted light is 1, and the phase difference of the quarter wave plate 104c is 90°. Also, "phase difference" in exemplary embodiments can be determined from the intensity ratio between the major axis and minor axis of elliptic polarized light in the polarization state, i.e., can be defined such that the phase difference of linear polarized light is 0° (or) 180° and the phase difference of circling polarized light where the major axis intensity and minor axis intensity are equal is 90° (or) 270°.

Figure 4:
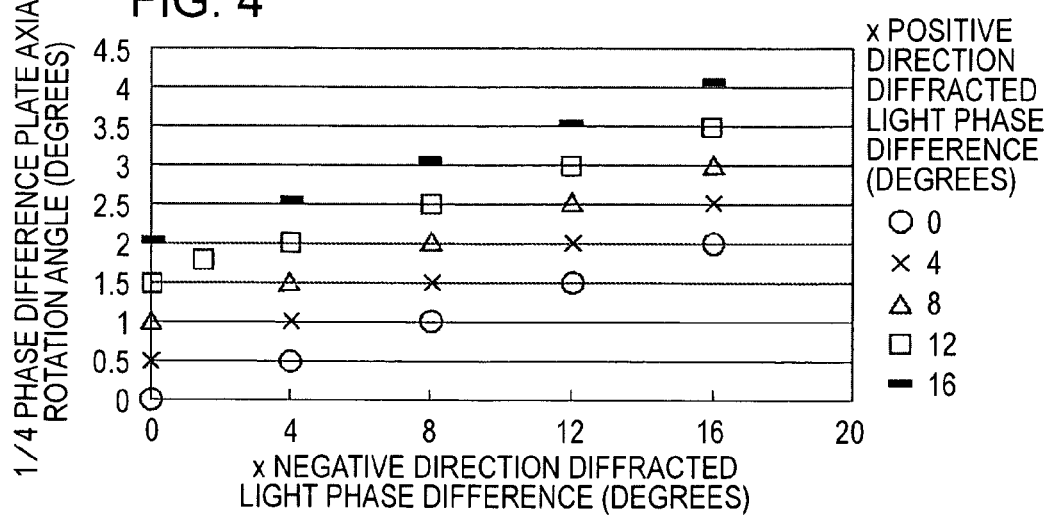
FIG. 4 illustrates a diagram showing the optical axis adjustment angle of a quarter wave plate.

Also, the sum of stray diffracted light in FIG. 3 is the minimal value obtained by arbitrarily rotating the optical axis (slow axis) of the quarter wave plate 104c within the xy plane. FIG. 4 (the same as FIG. 3 regarding the X positive direction diffracted light phase difference) illustrates the optical axis rotation angle of the quarter wave plate 104c, where the sum of stray diffracted light is minimal. Now, the optical axis rotation direction of the quarter wave plate 104c can be defined such that the clockwise direction as viewed from the reflective liquid crystal display device 105a is positive, and the counter-clockwise direction is negative. Also, FIG. 5 (the same as FIG. 3 regarding the X positive direction diffracted light phase difference, which will also hold true for FIGS. 6, 7, 8, 10, 11, 15, 17, 22, 24, 29, 36, 37A, 37B, 38A, and 38B) illustrates the amount of stray light with respect to the difference between the phase difference of the x negative direction diffracted light and the phase difference of the x positive direction diffracted light based on the calculated value shown in FIG. 3.

Figure 6:
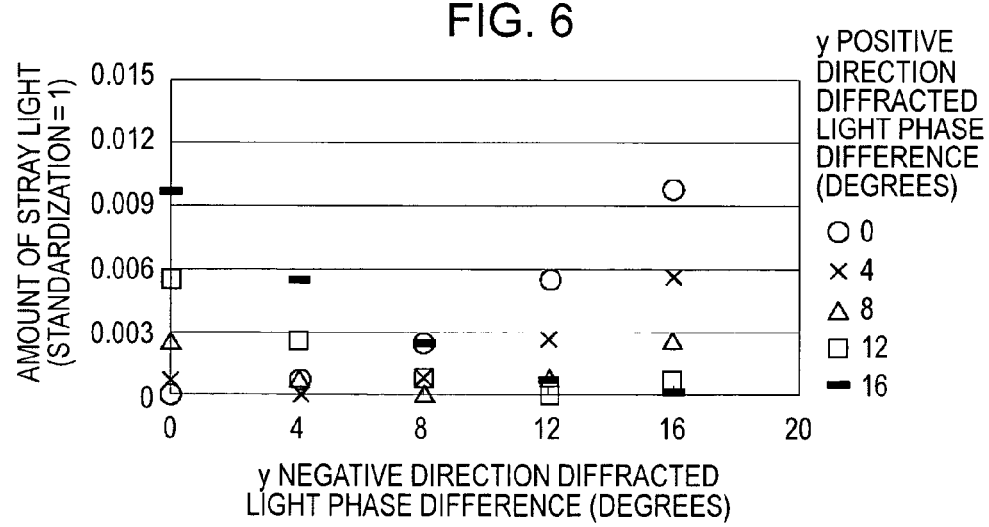
FIG. 6 illustrates a diagram showing the amount of stray light from diffracted light generated by the reflective liquid crystal display device.
Figure 7:
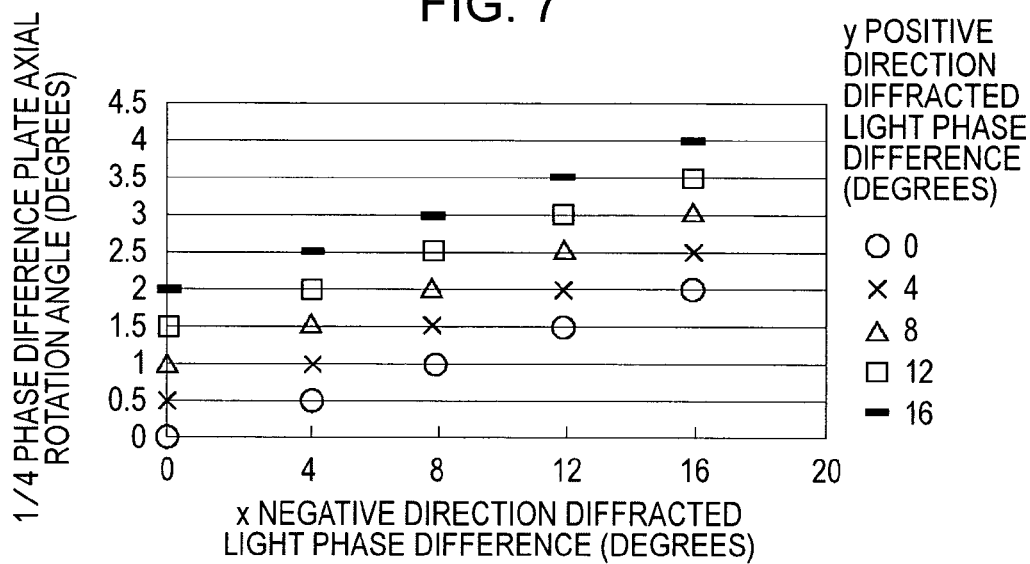
FIG. 7 illustrates a diagram showing the optical axis adjustment angle of a quarter wave plate.

Next, let us discuss diffracted light generated in the y positive direction and y negative direction. FIG. 6 illustrates the calculation results of the sum of the amount of stray light due to diffracted light of arbitrary phase differences being cast in the y positive direction and y negative direction within the yz plane. The sum of stray diffracted light in FIG. 6 is the minimal value obtained by arbitrarily rotating the optical axis (slow axis) of the quarter wave plate 104c within the xy plane. FIG. 7 illustrates the optical axis rotation angle of the quarter wave plate 104c, where the sum of stray diffracted light is minimal. Also, FIG. 8 illustrates the amount of stray light with respect to the difference between the phase difference of the x negative direction diffracted light and the phase difference of the y positive direction diffracted light.

Figure 5:
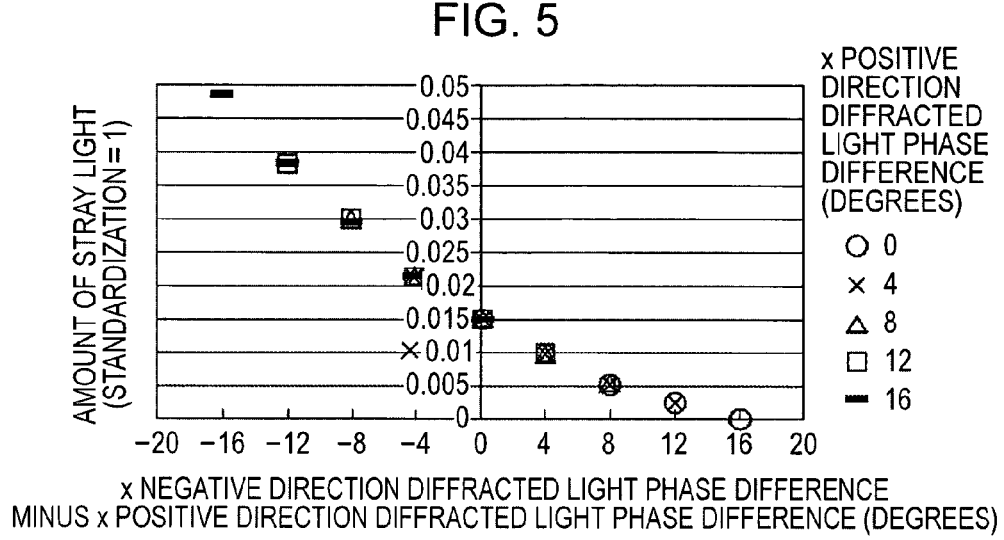
FIG. 5 illustrates a diagram showing the amount of stray light from diffracted light generated by the reflective liquid crystal display device.

Referring to FIG. 5, in the event that the y negative direction diffracted light phase difference minus the y positive direction diffracted light phase difference is zero or greater, i.e., in the event that the phase difference of the diffracted light cast into the polarization axis 107a inclined clockwise (diffracted light proceeding in the y positive direction) is smaller than the phase difference of the diffracted light cast into the polarization axis 107b inclined counter-clockwise (diffracted light proceeding in the y negative direction), the amount of stray diffracted light is small.

Figure 8:
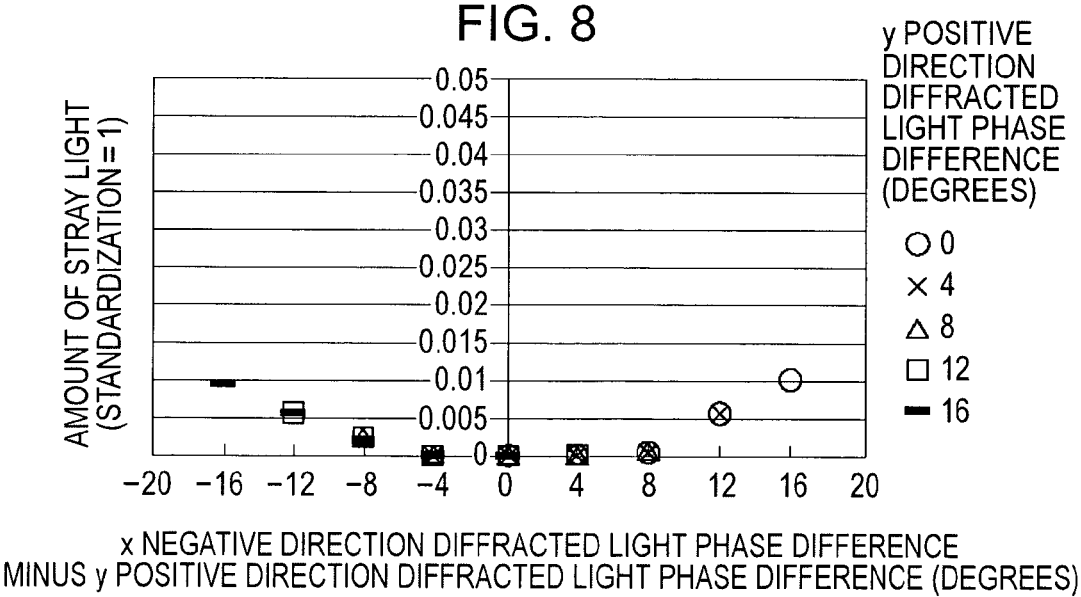
FIG. 8 illustrates a diagram showing the amount of stray light from diffracted light generated by the reflective liquid crystal display device.

Also, referring to FIG. 8, the sum of the amount of stray diffracted light is such that the y negative direction diffracted light phase difference minus the y positive direction diffracted light phase difference is symmetrically balanced on zero, and is independent of the magnitude of phase difference of each case of diffracted light processing in the y positive direction and y negative direction.

In the event that the phase difference of the diffracted light cast into the polarization axis 107a inclined clockwise (x positive direction) is smaller than the phase difference of the diffracted light cast into the polarization axis 107b inclined counter-clockwise (x negative direction), placing the quarter wave plate 104c such that the direction of the slow axis of the quarter wave plate 104c and the S-polarization direction (x direction) are generally parallel facilitates reduction of stray diffracted light, thereby improving contrast.

Figure 9:
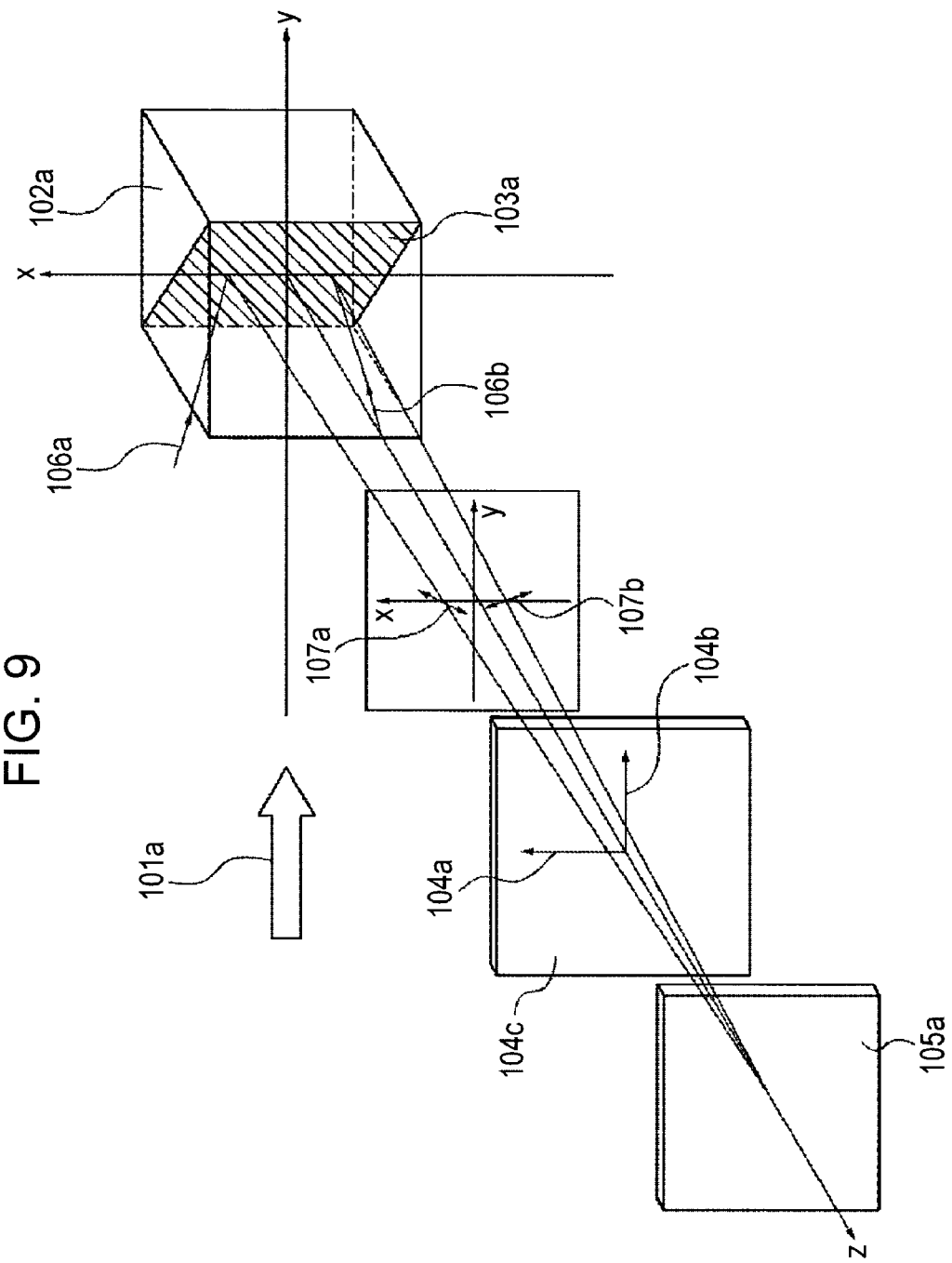
FIG. 9 illustrates a diagram showing the polarization axis inclination direction generated by a polarization split film.

Next, FIG. 9 illustrates a simplified diagram of a reflective liquid crystal display device according to at least one exemplary embodiment, where the optical axis direction of the quarter wave plate 104c has been rotated 90° within the xy plane with respect to the positioning thereof shown in FIG. 1.

Figure 10:
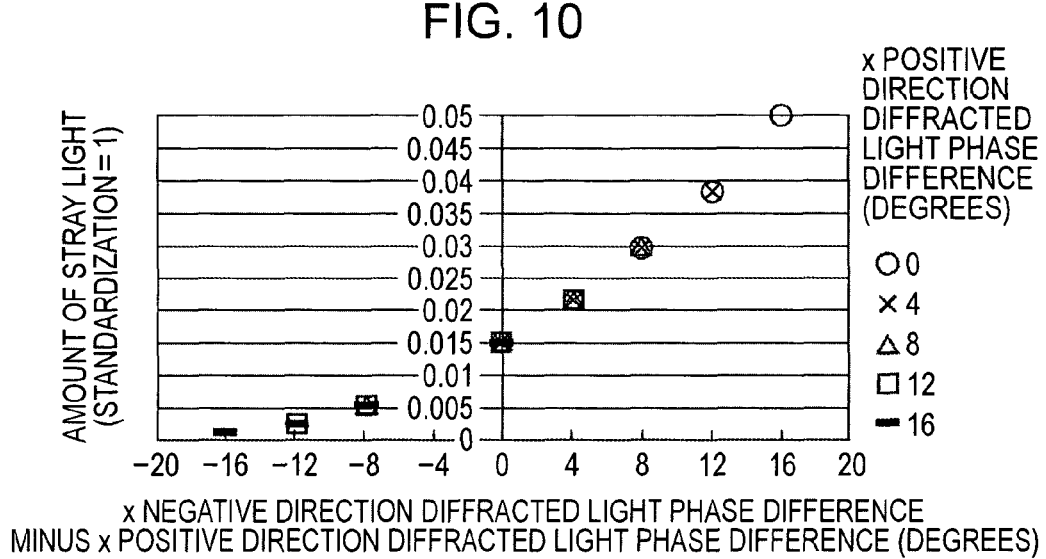
FIG. 10 illustrates a diagram showing the amount of stray light from diffracted light generated by the reflective liquid crystal display device.

Reference numeral 104a denotes the slow axis, and 104b the fast axis. FIG. 10 illustrates the amount of stray light with respect to the difference between the phase difference of the x negative direction diffracted light and the phase difference of the x positive direction diffracted light.

Figure 11:
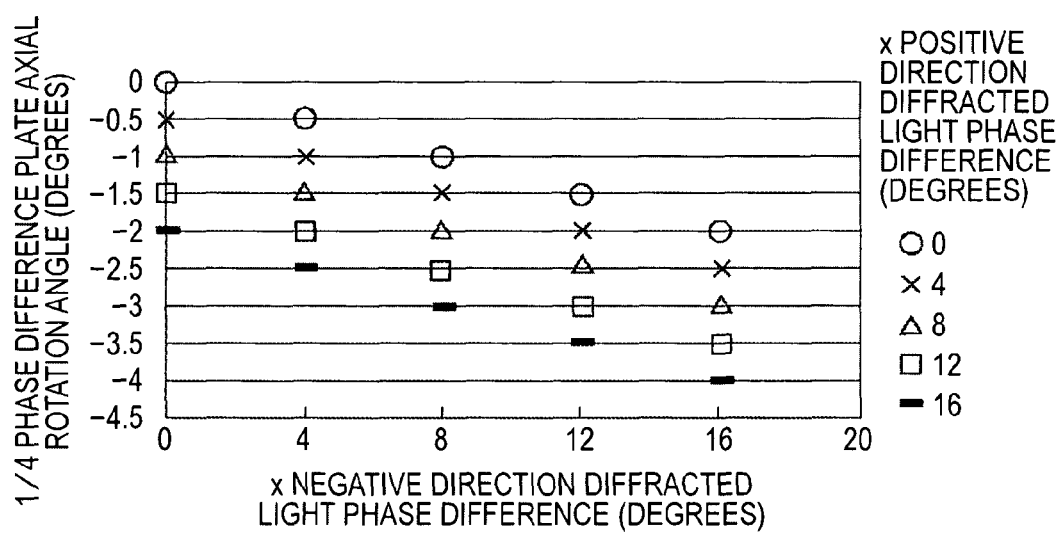
FIG. 11 illustrates a diagram showing the optical axis adjustment angle of a quarter wave plate.

The sum of stray diffracted light in FIG. 10 is the minimal value obtained by arbitrarily rotating the optical axis (slow axis) of the quarter wave plate 104c within the xy plane. FIG. 11 illustrates the optical axis rotation angle of the quarter wave plate 104c where the sum of stray diffracted light is minimal.

Referring to FIG. 10, in the event that the x negative direction diffracted light phase difference minus the x positive direction diffracted light phase difference is zero or smaller, i.e., in the event that the phase difference of the diffracted light cast into the polarization axis 107a inclined clockwise (diffracted light proceeding in the x positive direction) is greater than the phase difference of the diffracted light cast into the polarization axis 107b inclined counter-clockwise (diffracted light proceeding in the x negative direction), the amount of stray diffracted light is small.

The phase difference of the diffracted light cast into the polarization axis 107a inclined clockwise (x positive direction) is greater than the phase difference of the diffracted light cast into the polarization axis 107b inclined counter-clockwise (x negative direction). Placing the quarter wave plate 104c such that the direction of the fast axis of the quarter wave plate 104c and the S-polarization direction (x direction) are generally parallel, facilitates reduction of stray diffracted light, thereby improving contrast.

Now, the polarization state at each optical device in the optical system illustrated in FIG. 1, from the point of the incident light 101a reflecting off of the polarization beam splitter 102a to the point of returning to the polarization beam splitter 102a will be described. Each polarization state is illustrated as viewed from the reflective liquid crystal display device 105a side.

Let us consider a beam of incident light 101a reflecting off of the polarization split film 103a with a polarization axis in the S-polarization direction (x direction). The direction of travel of the reflected beam is the z axial direction. FIG. 43 illustrates the polarization state of a beam reflected off of the polarization split film 103a. In the diagram, x represents the x-axial direction and y the y-axial direction, indicating that the beam is linear polarized light having a polarization axis oscillating in the S-polarization direction (x-axial direction).

Figure 44A:
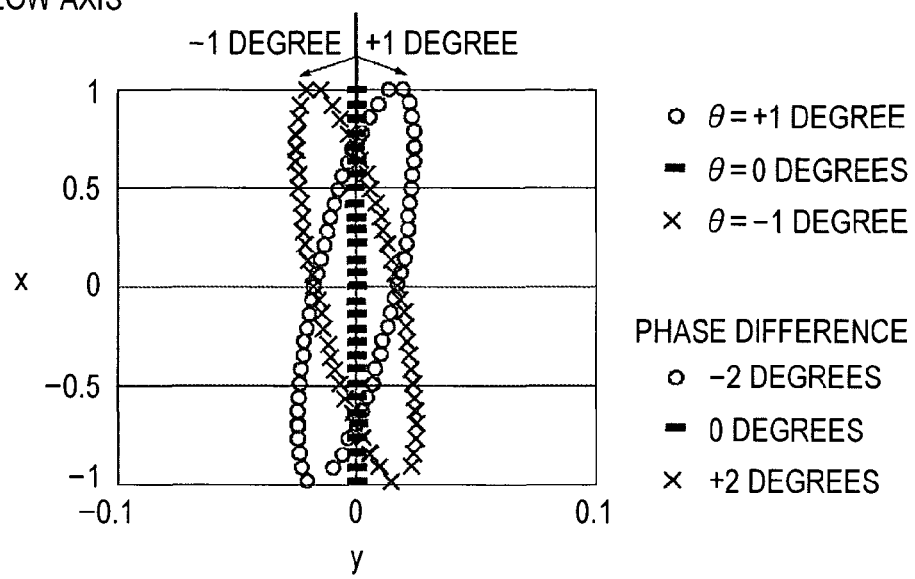
FIGS. 44A and 44B illustrate diagrams of the polarization state of light which has passed through a quarter wave plate.
Figure 44B:
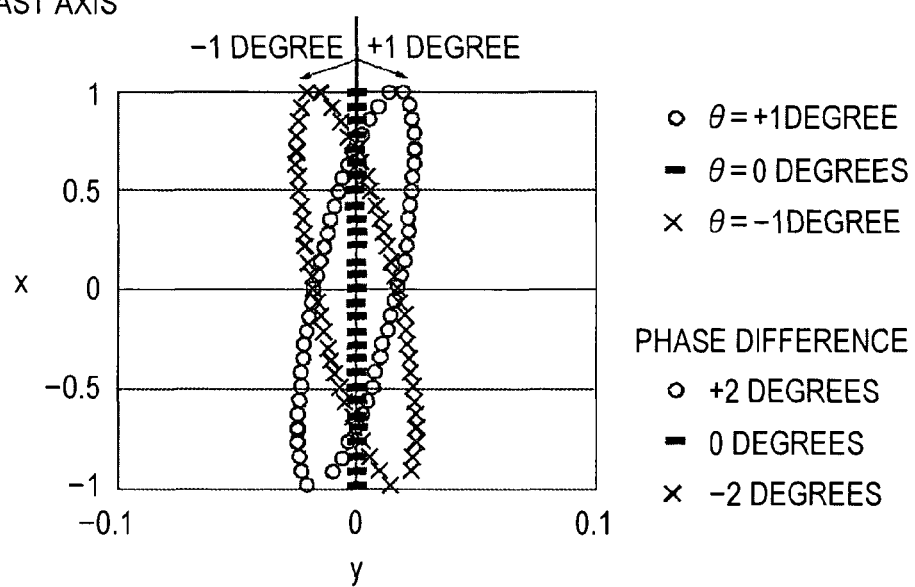

Further, the polarization state upon passing through the quarter wave plate 104c is illustrated in FIGS. 44A and 44B. In FIGS. 44A and 44B, θ=0 represents a state where the respective slow axis and the fast axis of the quarter wave plate 104c are parallel to the x direction, with a polarization state where rotation by one degree in the clockwise direction as viewed from the reflective liquid crystal display device 105a is represented by θ=+1°, and rotation by one degree in the counter-clockwise direction as viewed from the reflective liquid crystal display device 105a is represented by θ=−1°.

In either case of the slow axis reference (FIG. 44A) and the fast axis reference (FIG. 44B), the major axis is in the axis rotation direction, and phase difference twice the axis rotational angle is given. Further, the symbol is reversed for the phase difference between the slow axis reference and the fast axis reference.

Figure 45A:
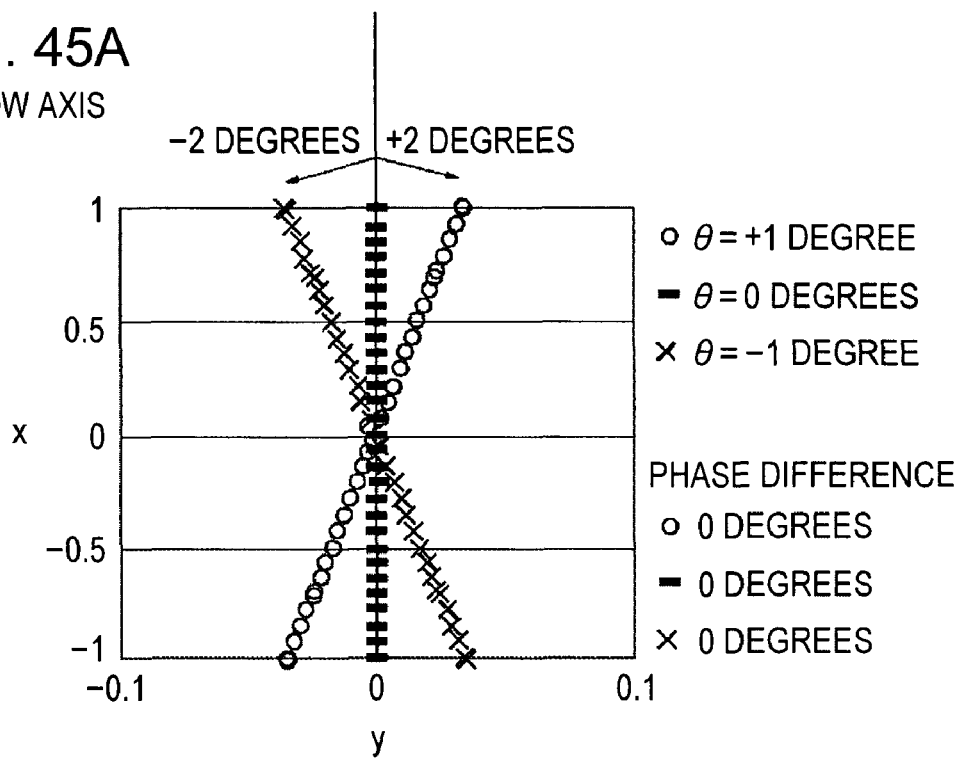
FIGS. 45A and 45B illustrate diagrams of the polarization state of light, of which the diffracted light phase difference is 0°, which has passed through the quarter wave plate.
Figure 45B:
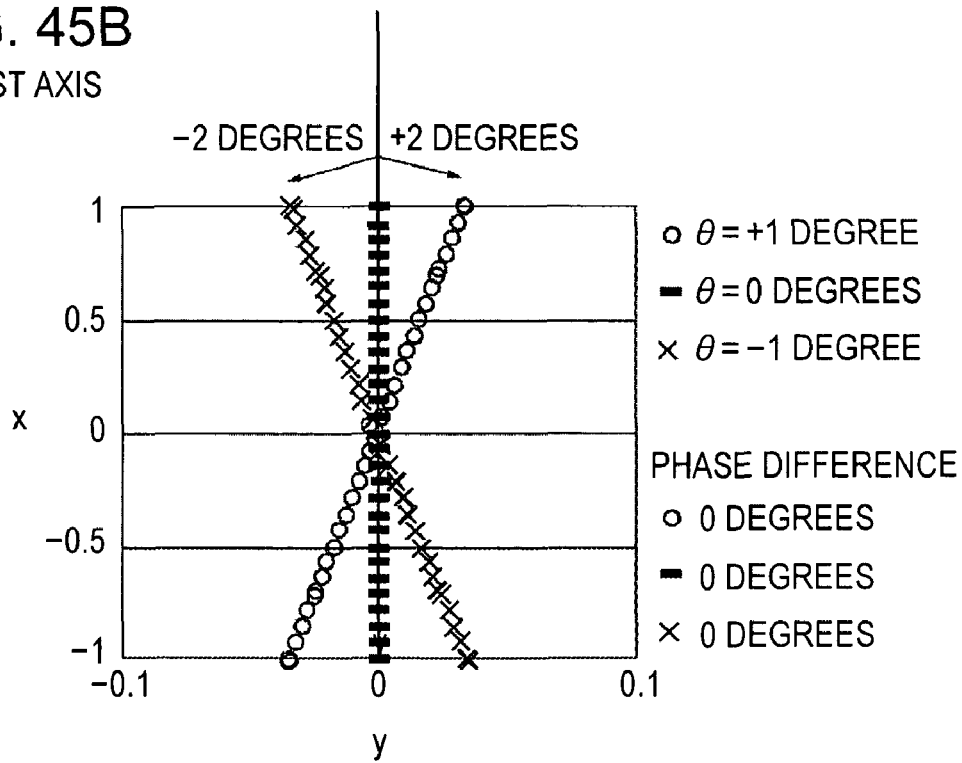

The beam with the polarization state shown in FIGS. 44A and 44B is cast into the reflective liquid crystal display device 105a. First, let us consider a case where no phase difference is given at the reflective liquid crystal display device 105a (phase difference of 0°). The polarization state of the beam shown in FIGS. 44a and 44B is maintained when reflecting, and the beam is input to the quarter wave plate 104c again. FIGS. 45A and 45B illustrate the respective polarization states upon being transmitted through the quarter wave plate 104c again. In either case of the slow axis reference (FIG. 45A) and the fast axis reference (FIG. 45B), a further 1° rotation is given in the optical axis (slow axis and fast axis) rotation direction of the quarter wave plate 104, and the phase difference is 0°, i.e., linear polarized light. Thus, in the event that no phase difference is given at the reflective liquid crystal display device 105a, the beam is input to the polarization split film 103a in the polarization state shown in FIGS. 45A and 45B.

Figure 47A:
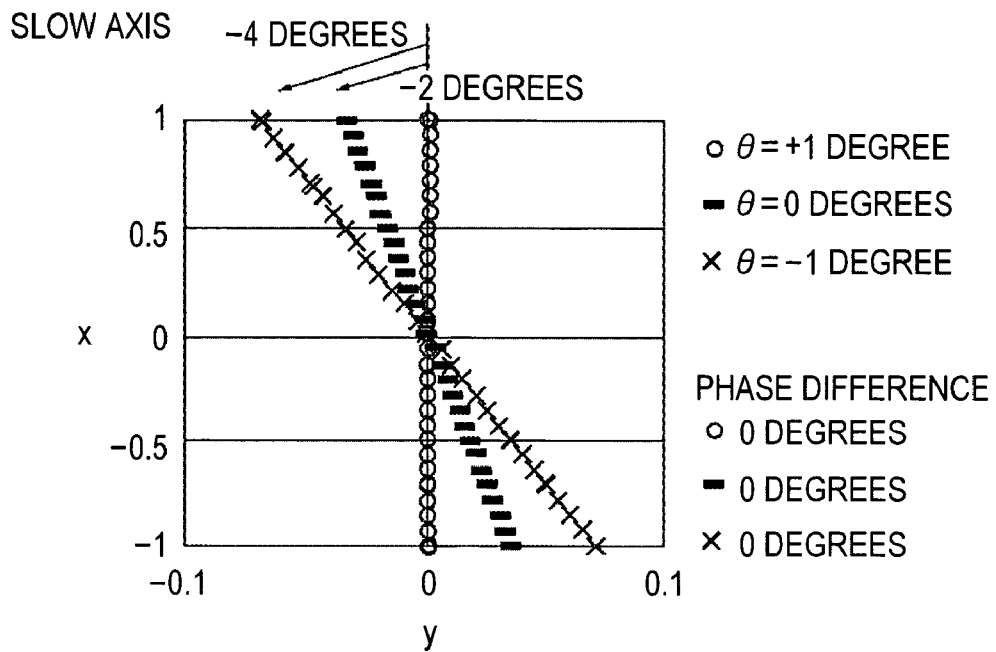
FIGS. 47A and 47B illustrate diagrams of the polarization state of light, of which the diffracted light phase difference is 4°, immediately after passing through the quarter wave plate.
Figure 47B:
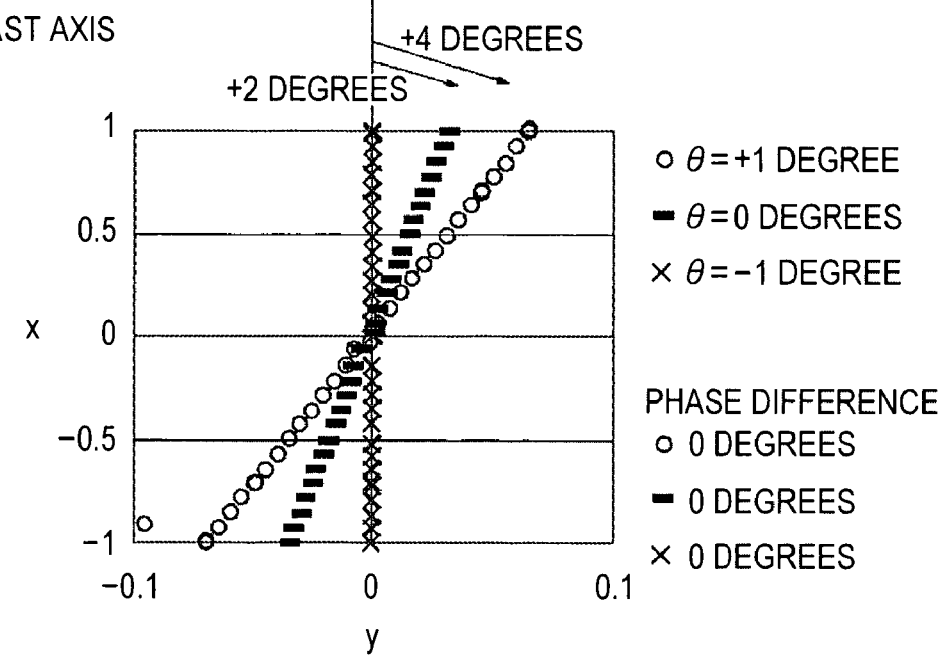

Also, in a case where +4° phase difference is given by the reflective liquid crystal display device 105a, +4° is added to each phase difference of the beam being cast into the reflective liquid crystal display device 105a shown in FIGS. 44A and 44B (FIGS. 46A and 46B). With respective polarization states, the major axis of the elliptic polarized light does not change in comparison with the polarization state in FIGS. 44A and 44B; only the phase difference is added. FIGS. 47A and 47B illustrate the respective polarization states upon being transmitted through the quarter wave plate 104c again. Upon the positive phase difference light passing through the quarter wave plate 104c based on the slow axis reference, the polarization axis rotates in the counter-clockwise direction by an angle corresponding to half of the phase difference of the incident light, so the phase difference is 0°, i.e., linear polarized light. On the other hand, upon the positive phase difference light passing through the quarter wave plate 104c based on the fast axis reference, the polarization axis rotates in the clockwise direction by an angle corresponding to half of the phase difference of the incident light, so the phase difference is 0°, i.e., linear polarized light. Accordingly, in the case of the slow axis reference as shown in FIG. 47A, the polarization axis of the beam being transmitted through the quarter wave plate 104c rotates in the counter-clockwise direction, while in the case of the fast axis reference as shown in FIG. 47B, the polarization axis of the beam being transmitted through the quarter wave plate 104c rotates in the clockwise direction. Thus, in a case that a phase difference of +4° is given at the reflective liquid crystal display device 105a, the beam is cast into the polarization split film 103a in the polarization state shown in FIGS. 47A and 47B.

Figure 48A:
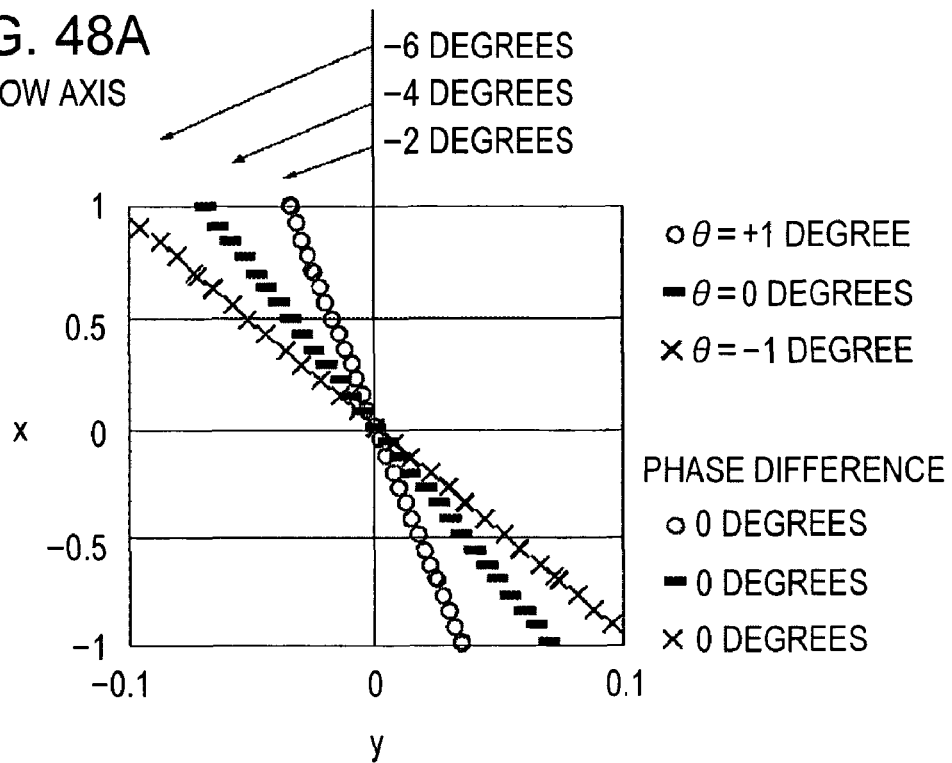
FIGS. 48A and 48B illustrate diagrams of the polarization state of light, of which the diffracted light phase difference is 8°, immediately after passing through the quarter wave plate.
Figure 48B:
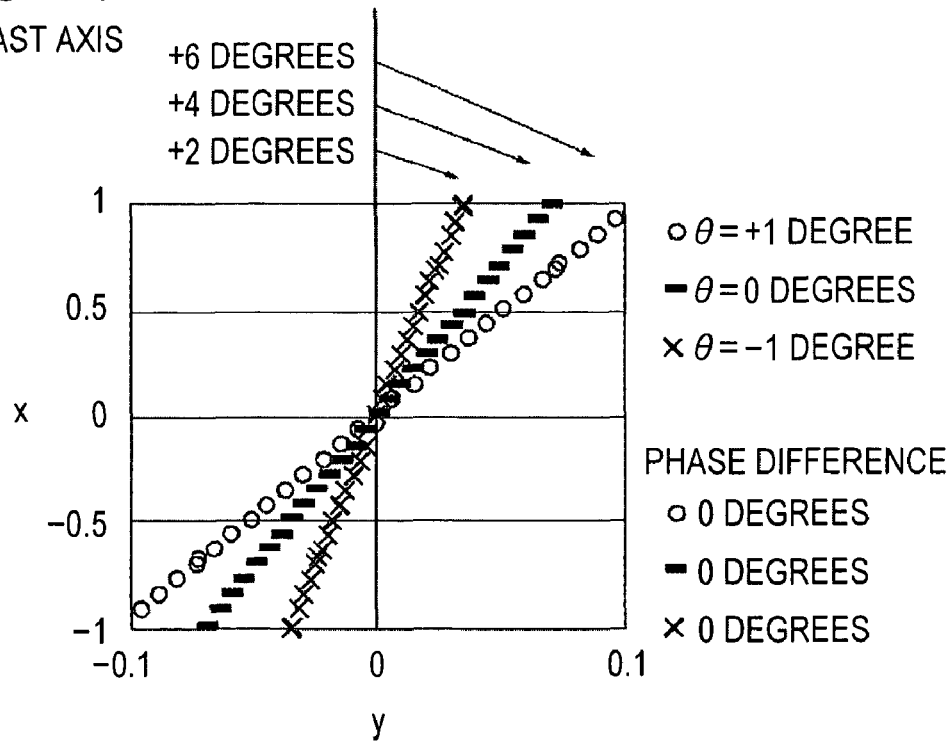

Further, in a case where +8° phase difference is given by the reflective liquid crystal display device 105a, +8° is added to each phase difference of the beam being cast into the reflective liquid crystal display device 105a shown in FIGS. 44A and 44B. FIGS. 48A and 48B show the respective polarization states upon being transmitted through the quarter wave plate 104c again. Upon the positive phase difference light passing through the quarter wave plate 104c based on the slow axis reference, the polarization axis rotates in the counter-clockwise direction by 2° more with respect to the polarization axis direction shown in FIG. 47A, and on the other hand, upon the positive phase difference light passing through the quarter wave plate 104c based on the fast axis reference, the polarization axis rotates in the clockwise direction by 2° more with respect to the polarization axis direction shown in FIG. 47B. Thus, in a case that a phase difference of +8° is given at the reflective liquid crystal display device 105a, the beam is cast into the polarization split film 103a in the polarization state shown in FIGS. 48A and 48B.

Thus, the polarization state of the beam being input to the polarization split film 103a is compared for the cases of 0°, +4°, and +8° in phase difference for the diffracted light generated by the reflective liquid crystal display device 105a when displaying black. In at least one exemplary embodiment, the diffracted light is generated in the x-axial positive direction and the x-axial negative direction, cast into the polarization axis inclinations 107a and 107b, and that the polarization axis inclinations are each ±2° with respect to the x axial direction.

In the case of slow axis reference (disposed near the x-axial direction; see FIGS. 45A, 47A, 48A) upon the phase difference of the diffracted light generated at the reflective liquid crystal display device 105a increasing, the inclination direction of the polarization axis can be inclined in the counter-clockwise direction. In the event that the inclination of the polarization split film 103a where diffracted light with great phase difference proceeds rotates in the counter-clockwise direction, and the inclination of the polarization split film 103a where diffracted light with small phase difference proceeds rotates in the clockwise direction, placing the slow axis of the quarter wave plate 104c near the S-polarization direction (x direction) facilitates the amount of stray light guided from the polarization beam splitter 102a to the projection lens system (not shown) to be reduced, due to the polarization axis direction of the diffracted light being inclined toward the polarization axis direction of the polarization split film 103a. Also, in the event of diffracted light with a small phase difference of 0° being cast into the polarization axis inclination 107a rotated 2° in the clockwise direction, and diffracted light with a great phase difference of +8° being cast into the polarization axis inclination 107b rotated 2° in the counter-clockwise direction, the polarization axis direction of each refracted light matches the polarization axis inclination direction (±2°) of the respective polarization split films 103a with the slow axis rotation angle of the quarter wave plate 104c at +1°, according to FIGS. 45A and 48A, so the diffracted light is analyzed and there is little stray light.

On the other hand, in the case of slow axis reference (disposed near the x-axial direction; see FIGS. 45B, 47B, 48B) upon increasing the phase difference of the diffracted light generated at the reflective liquid crystal display device 105a, the inclination direction of the polarization axis can be inclined in the clockwise direction. In the event that the inclination of the polarization split film 103a where diffracted light with great phase difference proceeds rotates in the counter-clockwise direction, and the inclination of the polarization split film 103a where diffracted light with great phase difference proceeds rotates in the clockwise direction, placing the fast axis of the quarter wave plate 104c near the S-polarization direction (x direction) facilitating the amount of stray light guided from the polarization beam splitter 102a to the projection lens system (not shown) to be reduced, due to the polarization axis direction of the diffracted light being inclined toward the polarization axis direction of the polarization split film 103a. Also, in the event of diffracted light with a small phase difference of +8° being cast into the polarization axis inclination 107a rotated 2° in the clockwise direction, and diffracted light with a great phase difference of 0° being cast into the polarization axis inclination 107b rotated 2° in the counter-clockwise direction, the polarization axis direction of each refracted light matches the polarization axis inclination direction (±2° of the respective polarization split films 103a with the slow axis rotation angle of the quarter wave plate 104c at −1°, according to FIGS. 45A and 48A, so the diffracted light is analyzed and there is little stray light.

Figure 12:
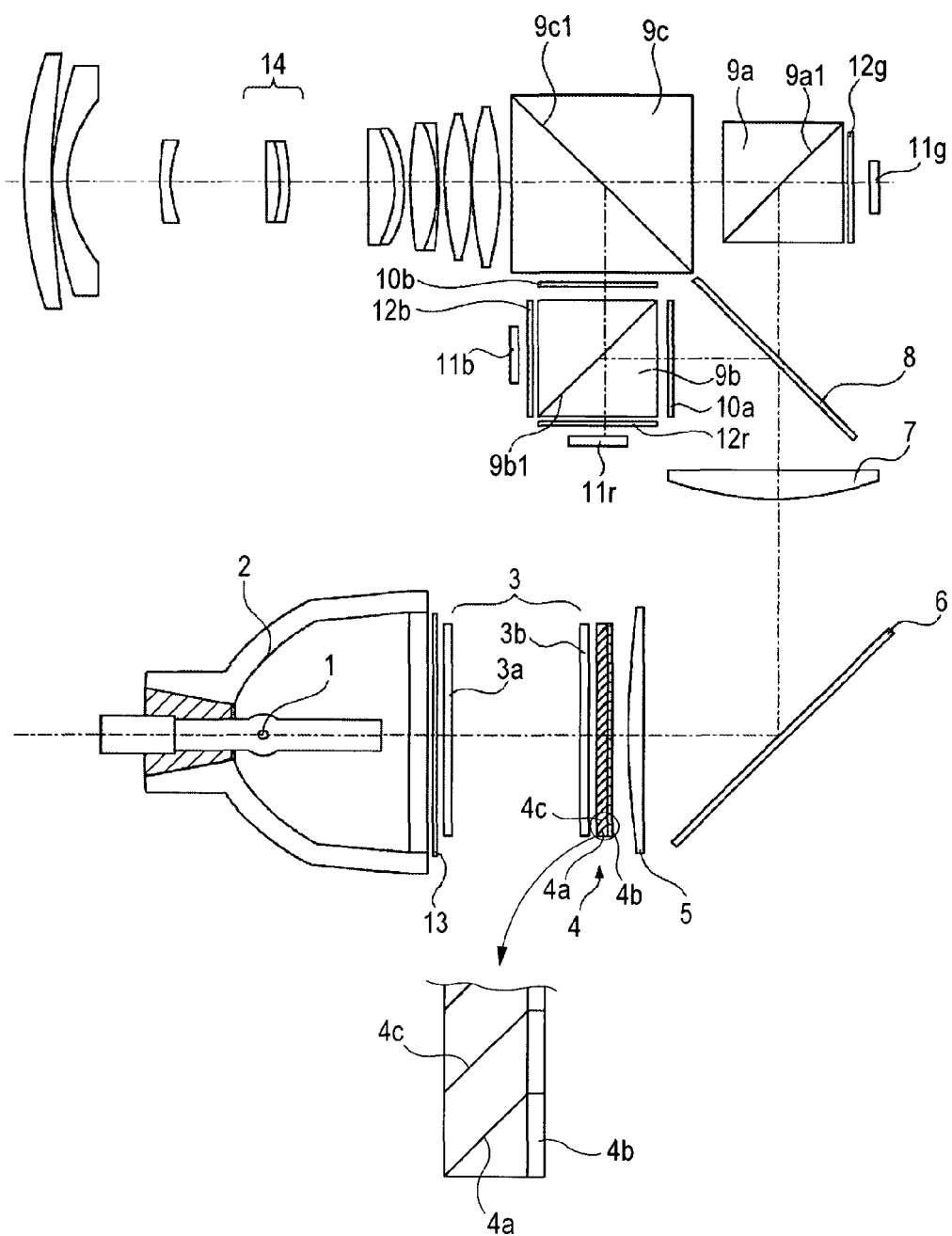
FIG. 12 illustrates a diagram showing a reflective liquid crystal display apparatus according to a first exemplary embodiment, with a partial enlargement of a polarization conversion element.

FIG. 12 illustrates an overall drawing of a reflective liquid crystal display apparatus which is the first exemplary embodiment. In the drawing, reference numeral 1 denotes a light source (e.g., formed of a high-pressure mercury vapor lamp), 2 denotes a reflector for emitting the light from the light source 1 in a predetermined direction, 3 denotes an integrator formed of cylindrical lens arrays 3a and 3b (optical devices where multiple cylindrical lenses are arrayed; the cylindrical lenses can be fly-eye lenses) configured to form a lighting region having a substantially uniform illumination intensity, 4 denotes a polarization conversion element including a polarization split film 4a and a reflecting film 4c and a half wave plate 4b (see enlargement in FIG. 12) configured to align unpolarized light in a predetermined polarization direction, 5 denotes a condenser lens for condensing illumination light, 6 denotes a mirror, 7 denotes a field lens for changing illumination light into telecentric light, 8 denotes a dichroic mirror for transmitting light of the green wavelength band. In other exemplary embodiments, the dichroic mirror can be designed for a non-green wavelength band. Reference numbers 9a1, 9b1, and 9c1 are each polarization split films having properties for reflecting S-polarized light and transmitting P-polarized light, 9a, 9b, and 9c are each polarization beam splitters having the polarization split films 9a1, 9b1, and 9c1, 10a and 10b are color selective wave plates each for converting (rotating) the polarization direction of light of predetermined wavelength bands by 90°, 11r, 11g, and 11b are reflective liquid crystal display devices for reflecting incident illumination light while forming image light by modulating incident illumination light according to image signals, 12r, 12g, and 12b are each quarter wave plates, 13 denotes a UV cut filter for cutting out light of the ultraviolet wavelength band, and 14 denotes a projection lens system.

Next, the optical effects of the above configuration will be described. The light emitted from the light source 1 is reflected off of the reflector 2, is transmitted through the UV cut filter 13 configured to reduce ultraviolet wavelength band light, and is condensed in the direction of the cylindrical lens 3a. This light flux is split into multiple light fluxes by the cylindrical lens 3a, and then superimposed upon the reflective liquid crystal display devices 11r, 11g, and 11b, by the effects of the cylindrical lens 3b, condenser lens 5, and filed lens 7, thereby forming illumination regions of substantially uniform illumination intensity on the reflective liquid crystal display devices 11r, 11g, and 11b. Also the multiple light fluxes which have been emitted from the cylindrical lens 3b are split into P-polarization light and S-polarization light at the polarization split film 4a, corresponding to each of the light fluxes. The P-polarization light is converted into a polarization component having the same direction as the S-polarization light by the half wave plate 4c, and the S-polarization light is reflected by the reflecting film 4b. The multiple light fluxes emitted form the cylindrical lens 3b are emitted in the same direction as light having a predetermined polarization direction. The light which has been generally aligned to S-polarization light by the polarization conversion element 4 is cast into the dichroic mirror 8 which transmits light of the green wavelength band, and light of the red and blue wavelength bands is reflected. The light of the green wavelength band which has been transmitted through the dichroic mirror 8 is cast into the polarization beam splitter 9a, reflected off of the polarization split film 9a1, transmitted through the quarter wave plate 12g, and cast into the reflective liquid crystal display device 11g. On the other hand, of the light of the red and blue wavelength bands which has been reflected off of the dichroic mirror 8, just the light of the blue wavelength band has the polarization direction thereof changed by 90° by the first color selective wave plate 10a, thereby becoming P-polarization light, and the light of the red wavelength band remains S-polarization light and enters the polarization beam splitter 9b. Further, the light of the blue wavelength band, which is P-polarization light, is transmitted through the polarization split film 9b1 of the polarization beam splitter 9b, and the light of the red wavelength band which is S-polarization light is reflected. Thus, the light is split into red and blue wavelength bands of which the polarization direction is mutually substantially orthogonal. The light of the red wavelength band which has been reflected off of the polarization beam splitter 9b is transmitted through the quarter wave plate 12r, and cast into the reflective liquid crystal display device 11r, while the light of the blue wavelength band which has been transmitted through the polarization beam splitter 9b is transmitted through the quarter wave plate 12b, and cast into the reflective liquid crystal display device 11b.

Further, the light of the green wavelength band which has been subjected to 180° phase difference modulation and reflection by the reflective liquid crystal display device 11g is transmitted through the quarter wave plate 12g, and becomes P-polarization light that is transmitted through the polarization beam splitters 9a and 9c. Also, the light of the red wavelength band which has been subjected to 180° phase difference modulation and reflection by the reflective liquid crystal display device 11r is transmitted through the quarter wave plate 12r, and becomes P-polarization light that is transmitted through the polarization beam splitter 9b, and is cast into the second color selective wave plate 12b. Also, the light of the blue wavelength band which has been subjected to 180° phase difference modulation and reflection by the reflective liquid crystal display device 11b is transmitted through the quarter wave plate 12b, becomes S-polarization light that is reflected off of the polarization beam splitter 9b, and is cast into the second color selective wave plate 12b. Of the light of the red and blue wavelength bands that has been cast into the second color selective wave plate 10b which converts the polarization direction of only the light of the red wavelength band by 90°, just the polarization direction of the light of the red wavelength band is changed by 90° by the second color selective wave plate 10b and becomes S-polarization light. The light of the blue wavelength band is cast into the polarization beam splitter 9c as S-polarization light, and is reflected. The light of the entire RGB wavelength band is synthesized by the polarization beam splitter 9c, guided to the projection lens 14, and is projected on screen (not shown).

Figure 13:
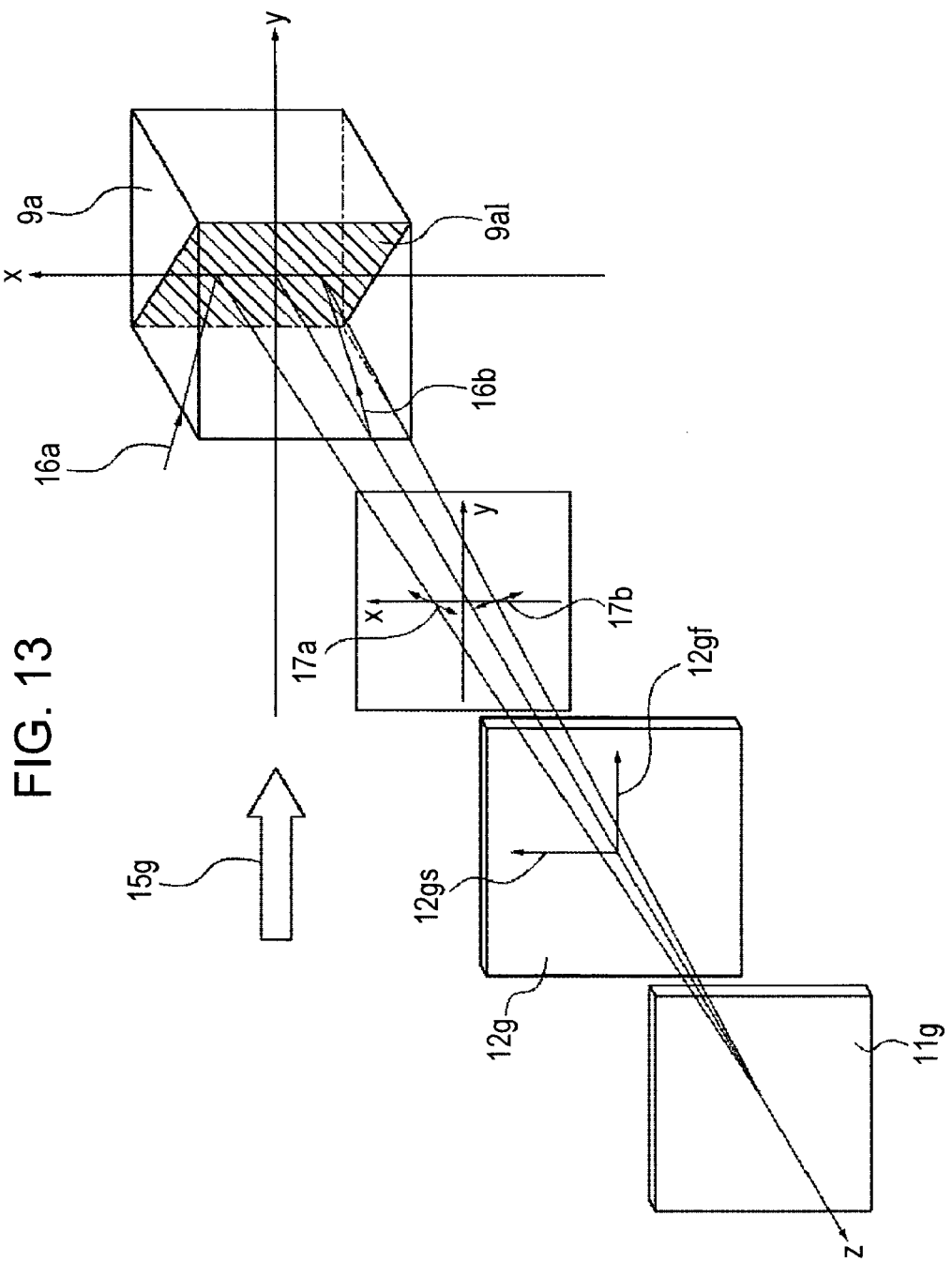
FIG. 13 illustrates a diagram showing polarization axis inclination generated by a polarization split film in the green light path, in the first exemplary embodiment.

Now, FIG. 13 illustrates the optical path of the green light which has been subjected to color separation by the dichroic mirror 8, using the polarization beam splitter 9a, the polarization split film 9a1, the quarter wave plate 12g, and the reflective liquid crystal display device 11g. In the drawing, reference numeral 15g denotes incident light which is light of the green band which has been subjected to color separation by the dichroic mirror 8 being cast into the polarization beam splitter 9a. 16a denotes incident beams from the X positive direction within the xy plane, and 16b denotes incident beams from the x negative direction within the xy plate. 17a denotes the polarization axis of the incident light 16a inclined by the polarization split film 9a1, and 17b denotes the polarization axis of the incident light 16b inclined by the polarization split film 9a1. The incident light axis of the polarization beam splitter 9a is the y direction, the reflection light axis the z direction, and the direction substantially perpendicular to the xy plane the x direction. Generally, grazing incidence light to the polarization split film of a polarization beam splitter exhibits geometric inclination of the polarization axis at the time of reflecting or transmitting the polarization split film. With the present exemplary embodiment, as illustrated in FIG. 13, the incident beam 16a from the x positive direction has the polarization axis 17a thereof inclined in the clockwise direction as viewed from the z positive direction at the time of reflecting off of the polarization split film 9a1, and the polarization axis 17b of the incident beam 16b from the x negative direction can be inclined in the counter-clockwise direction as viewed from the z positive direction at the time of reflecting off of the polarization split film 9a1.

Further, the incident beam 16a is transmitted through the quarter wave plate 12g, reflected off of the reflective liquid crystal display device 11g, transmitted through the quarter wave plate 12g again, and cast into the polarization split film 9a1 of the polarization beam splitter 9a. The beam 16a, which has been reflected off of the reflective liquid crystal display device 11g, proceeds in the x negative direction, and is cast into the polarization split film 9a1 having a polarization axis 17b inclination which is linearly symmetrical on the x axis with respect to the polarization axis 17a. Also, the incident beam 16b is transmitted through the quarter wave plate 12g, reflected off of the reflective liquid crystal display device 11g, is transmitted through the quarter wave plate 12g again, and is cast into the polarization split film 9a1 of the polarization beam splitter 9a. The beam 16b which has been reflected off of the reflective liquid crystal display device 11g proceeds in the x positive direction, and is cast into the polarization split film 9a1 having a polarization axis 17a inclination which is linearly symmetrical on the x axis with respect to the polarization axis 17b.

Further, the incident beams 16a and 16b, corresponding to the directions of the polarization axis 17b and polarization axis 17a of the polarization split film 9a1, are analyzed and transmitted.

Figure 14:
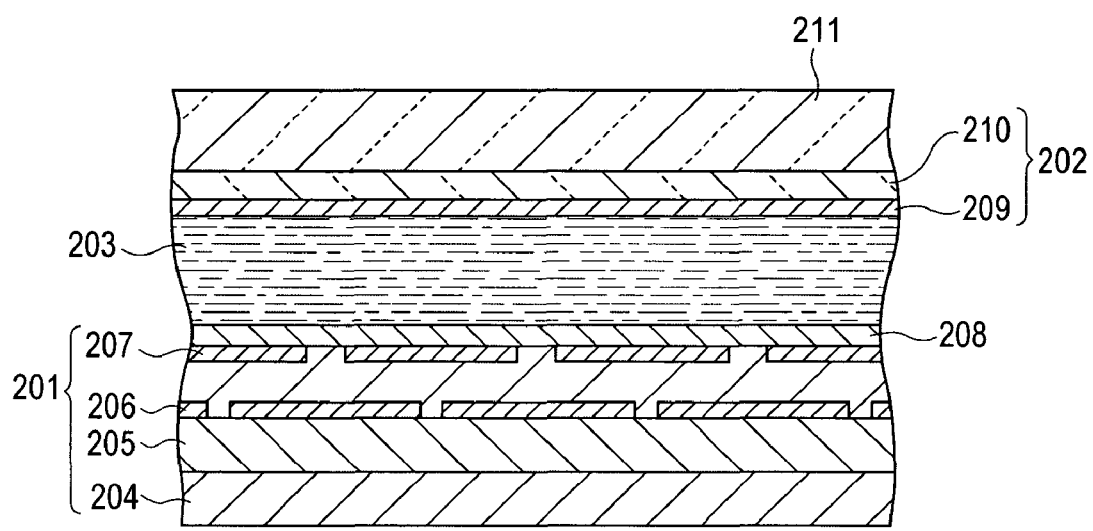
FIG. 14 illustrates a diagram showing the structure of a reflective liquid crystal display device according to the first exemplary embodiment.

The reflective liquid crystal display device 11g according to the present exemplary embodiment is of a vertical orientation normally-black display mode, where the display is black when the effective voltage of the liquid crystal is around 0 Vrms, and displays white when voltage is applied. The structure thereof is illustrated in FIG. 14. In the drawing, reference numeral 201 denotes an active matrix substrate, 202 denotes an opposing glass substrate, 203 denotes a liquid crystal layer, 204 denotes a Si substrate, 205 denotes an active device layer, 206 denotes a shielding layer, 207 denotes reflecting pixel electrodes, 208 and 209 denote orientation films, 210 denotes a transparent electrode, and 211 denotes a glass substrate. The active matrix substrate 201 is made up of the active device layer 205 which drives the pixels on the Si substrate 204 to reflect light, the reflecting pixel electrodes 207, the orientation film 208, and the shielding layer 206 for shielding stray light, and the opposing glass substrate 202 is made up of the transparent electrode 210 and the orientation film 209 formed on the glass substrate 211, with the liquid crystal layer 203 being sandwiched in between the active matrix substrate 201 and the opposing glass substrate 202. Also, the pixel shape of the reflecting pixel electrodes 207 is a 10 μm by 10 μm square, arrayed vertically and horizontally in matrix fashion. Note that the reflecting pixel electrodes 207 of the reflective liquid crystal display device 11g shown in FIG. 14 are arrayed in matrix fashion in the x direction and the y direction.

Generally, the closer the liquid crystal orientation angle in a black display state is substantially perpendicular with respect to the substrate, a wider viewing angle can be realized, but in at least one exemplary embodiment, the direction of rotation of the liquid crystal molecules is restricted at the time of performing gradation display or white display by the voltage applied, so a liquid crystal molecule tilt angle can be used.

Figure 15:
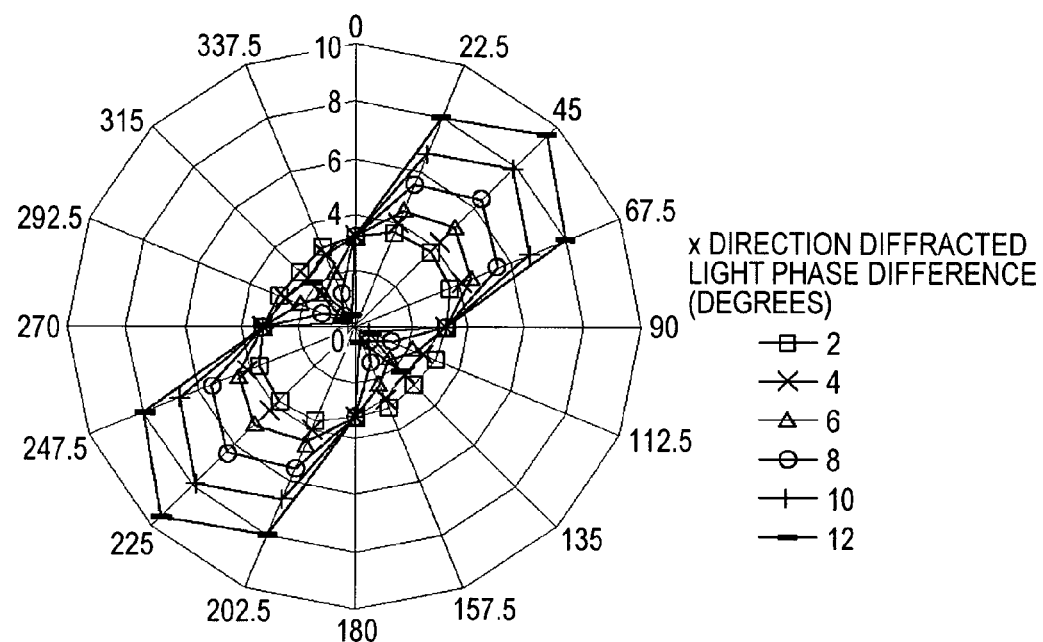
FIG. 15 illustrates a 0th order light phase difference contour diagram for the reflective liquid crystal display device of the green light path in the first exemplary embodiment.

FIG. 15 illustrates the phase difference incident angle properties of the reflective liquid crystal display device 11g for black display in a case where the direction of tilt of the reflective liquid crystal display device is an inclination around 45° with respect to the polarization plane (xz plane) of S-polarization with respect to the polarization split plane 9a1 of the polarization beam splitter 9a, for both the glass substrate 202 side and the Si substrate 204 side, and further where the tilt angle is an angle inclined several degrees from 90°, which is the substantially perpendicular direction to the substrate. In FIG. 15, the angular radial lines correspond to incident light directions. The incident light directions to the reflective liquid crystal display device 11g in FIG. 15 are the y axis negative direction related to the orientation angle of 0°, the x axis positive direction is related to the orientation angle of 90°, the y axis positive direction is related to the orientation angle of 180°, and the x axis negative direction is related to the orientation angle of 270°, respectively. Also, generally, in the case that the tilt angle is 90°, the phase difference is great in the direction of the orientation angles 45°, 135°, 225°, and 315°, and the phase difference is small in the direction of the orientation angles 0°, 90°, 180°, and 270°. While this exhibits a cross-shaped four-way symmetrical phase counter shape, inclining the tile angle several degrees from 90° yields non-symmetrical properties, as illustrated in FIG. 1. The phase difference is great in the direction of the orientation angles 45° and 225°, and the phase difference is small in the direction of the orientation angles 135° and 315°.

Figure 16:
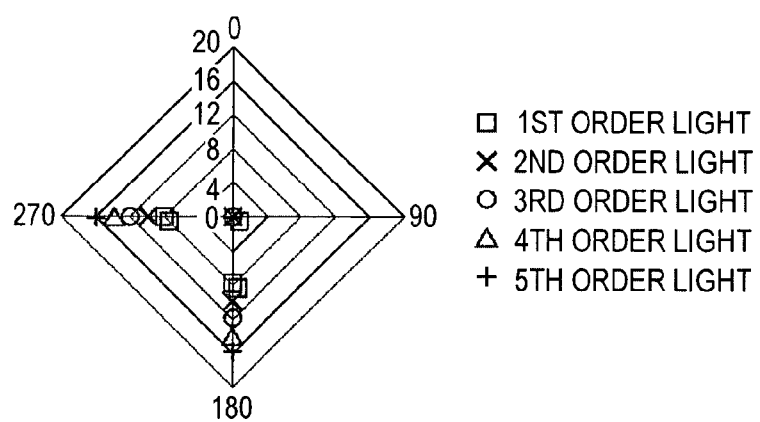
FIG. 16 illustrates a diffracted light phase difference contour diagram for the reflective liquid crystal display device of the green light path in the first exemplary embodiment.

Also, FIG. 16 illustrates a phase difference pattern of diffracted light generated upon substantially perpendicular input of a beam to the reflective liquid crystal display device 11g while displaying black. The reflecting electrodes 207 of the reflective liquid crystal display device 11g shown in FIG. 14 are arrayed in matrix fashion in the x direction and the y direction, so diffracted (interference) light is generated in the x direction and the y direction. In this particular example, the diffraction angle is 3.5°, while taking into consideration an output angle of 17.5° (5th order light) projected from the projection light system 14. The orientation angle 0° direction represents the diffracted light generated in the y axis negative direction, the orientation angle 90° direction represents the diffracted light generated in the x axis positive direction, the orientation angle 180° direction represents the diffracted light generated in the y axis positive direction, and the orientation angle 270° direction represents the diffracted light generated in the x axis negative direction.

The 0th order light and diffracted light reflected off of the reflective liquid crystal display device 11g are transmitted through the quarter wave plate 12b, and are cast into the polarization film 9a1 of the polarization beam splitter 9a, respectively. The polarization axis inclination angle of the polarization split film 9a1 geometrically changes according to the incident angle, so the 0th order light and the diffracted light each are subjected to analyzing of the polarization component in the direction of the polarization axis inclination angle corresponding to the angle of incidence to the polarization split film 9a1, and the polarization component substantially perpendicular to the polarization axis inclination direction is transmitted and becomes stray light.

Figure 17:
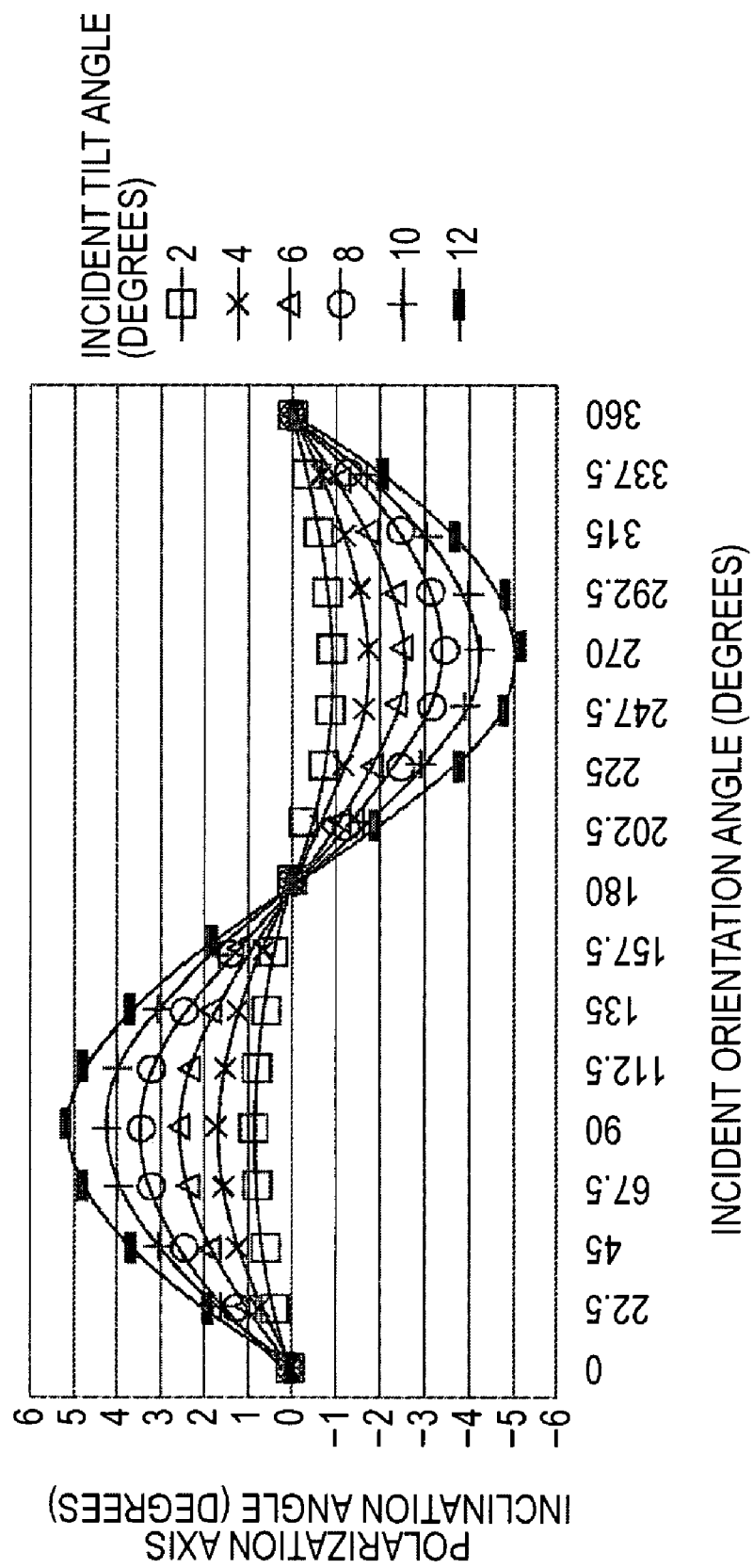
FIG. 17 illustrates a diagram showing the polarization axis inclination angle of the polarization split film in the green light path in the first exemplary embodiment.

FIG. 17 illustrates the inclination of the polarization axis corresponding to the incident angle, which is generated at the polarization film 9a1 of the polarization beam splitter 9a. The definition of the orientation angles in FIG. 17 is the same as with FIG. 16, with the orientation angle 0° direction representing the diffracted light generated in the y axis negative direction, the orientation angle 90° direction representing the diffracted light generated in the x axis positive direction, the orientation angle 180° direction representing the diffracted light generated in the y axis positive direction, and the orientation angle 270° direction representing the diffracted light generated in the x axis negative direction, as viewed from the axial direction of incidence to the polarization split film 9a1 from the reflective liquid crystal display device 11g. Further, clockwise rotation of the polarization axis inclination as viewed from the z axis positive direction is positive, and counter-clockwise rotation is negative.

According to FIG. 17, the direction of polarization axis inclination of the polarization beam splitter 9a is a direction parallel to the polarization plane of the S-polarization direction (x direction), without inclination of the polarization axis with respect to incident beams from within the yz plane at orientation angle 0° (360° and 180°). On the other hand, the closer the orientation angle approaches 90° (270°) from 0° (180°), the greater the inclination of the polarization axis becomes, and the greater the incident tilt angle is the greater the polarization axis can be inclined. Also, the polarization axis inclination is clockwise for beams entering in the x positive direction, and the polarization axis inclination is counter-clockwise for beams entering in the x negative direction.

Figure 18A:
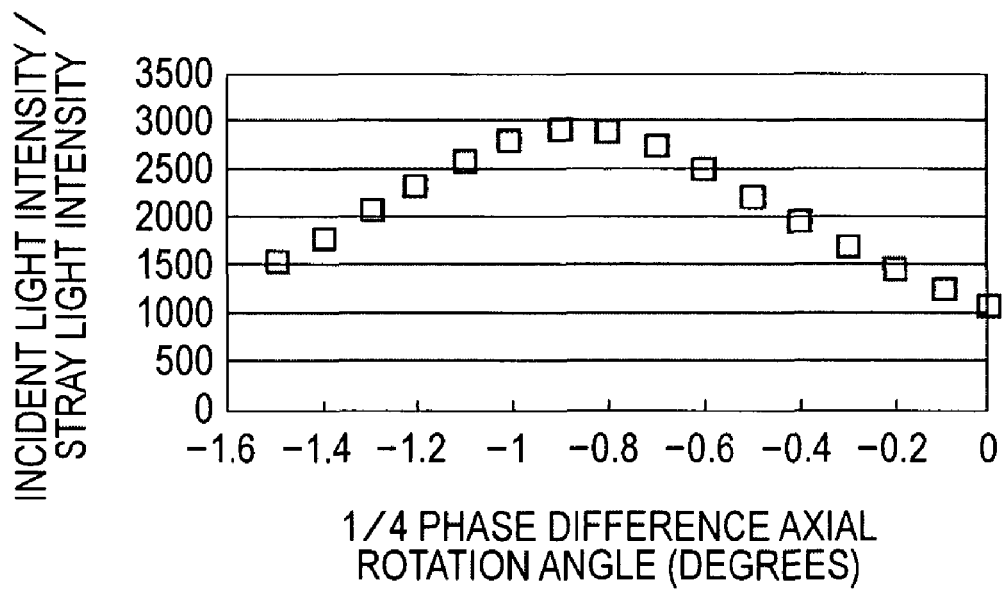
FIGS. 18A and 18B illustrate diagrams of 0th order light contrast of the reflective liquid crystal display device of the green light path in the first exemplary embodiment.
Figure 18B:
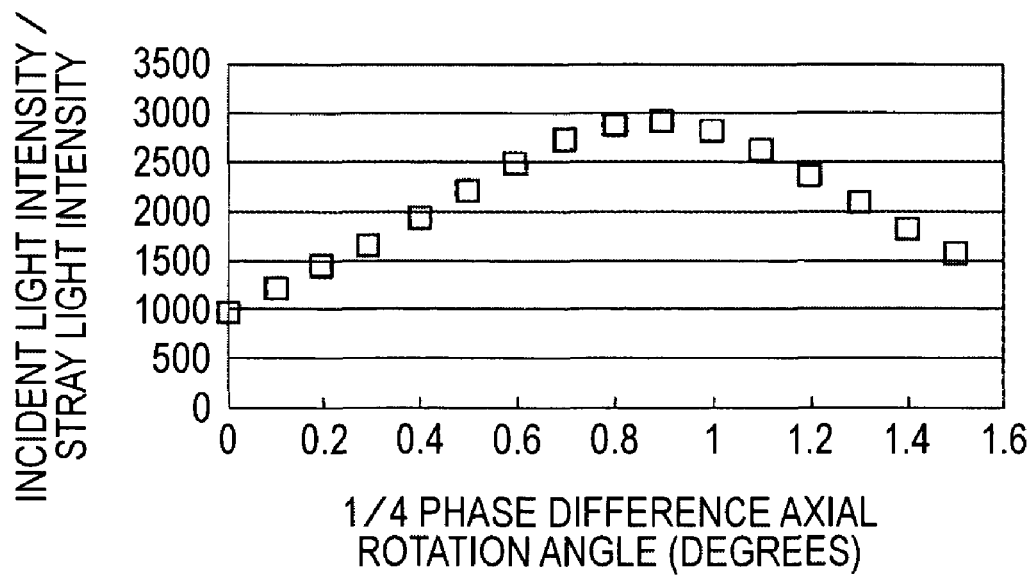

Now, FIGS. 18A and 18B illustrate the 0th order stray light of the reflective liquid crystal display device 11g when displaying black. The stray light calculation method will be described with reference to the optical system shown in FIG. 13. At the time of the incident light 15g reflecting off of the polarization split film 9a1, the polarization split film 9a1 serves as a polarizer, and the light is cast into the quarter wave plate 12g with a polarization axis inclination corresponding to each incident angle shown in FIG. 17. The light flux which has transmitted through the quarter wave plate 12g has phase difference corresponding to each incident angle shown in FIG. 15, so beams of each incident angle are subjected to phase effects, reflected off of the reflective liquid crystal display device 11g, transmitted through the quarter wave plate 12g again, and cast into the polarization split film 9a1. The polarization split film 9a1 serves as an analyzer, having polarization axis inclination corresponding to each inclination angle shown in FIG. 17, where the polarization axis inclination direction is the analyzing axis direction, and polarization components other than the analyzing axis direction become stray light. Note that the phase difference of the quarter wave plate is calculated as 90°.

FIG. 18A illustrates the ratio of stray light intensity with respect to incident light intensity as contrast, in a case of rotation within the xy plane with the direction where the direction of the fast axis and the direction of the x axis match as a reference (where the quarter phase difference axis rotation angle=0°), and FIG. 18B in a case of rotation within the xy plane with the direction where the direction of the slow axis and the direction of the x axis match as a reference (where the quarter phase difference axis rotation angle=0°). The clockwise direction of the rotation angle of the quarter wave plate as viewed from the z positive direction is the positive direction, and the counter-clockwise direction is the negative direction. The outermost angle of the incident illumination light here to the reflective liquid crystal display device 11g is 12°.

As can be seen from FIGS. 18A and 18B, in the event that the fast axis is near the S-polarization direction, the contrast is maximum at 2968 when rotated −0.9° in the negative direction, and in the event that the slow axis is near the S-polarization direction, the contrast is maximum at 2969 when rotated +0.9° in the positive direction. As for 0th order light, the contrast, i.e., stray light is equal, and is not dependent on the disposing direction (fast axis and slow axis direction) of the optical axis of the quarter wave plate 12g.

Next, stray light of the diffracted light will be calculated. The incident angle to the polarization split film 9a1 of the polarization beam splitter 9a differs for diffracted light of differing orders, thus one can take into consideration the polarization axis inclination 17a (17b) according to the order of the diffracted light.

FIG. 19 shows the diffraction angle of diffracted light of each order and the polarization axis inclination of the polarization beam splitter 9a. Here, the polarization axis inclination angle of the polarization beam splitter 9a is generated only for the diffracted light of the orientation angle 90° (x positive direction) and orientation angle 270° (x negative direction), and polarized light components of each polarization axis inclination angle direction are analyzed.

Figure 20A:
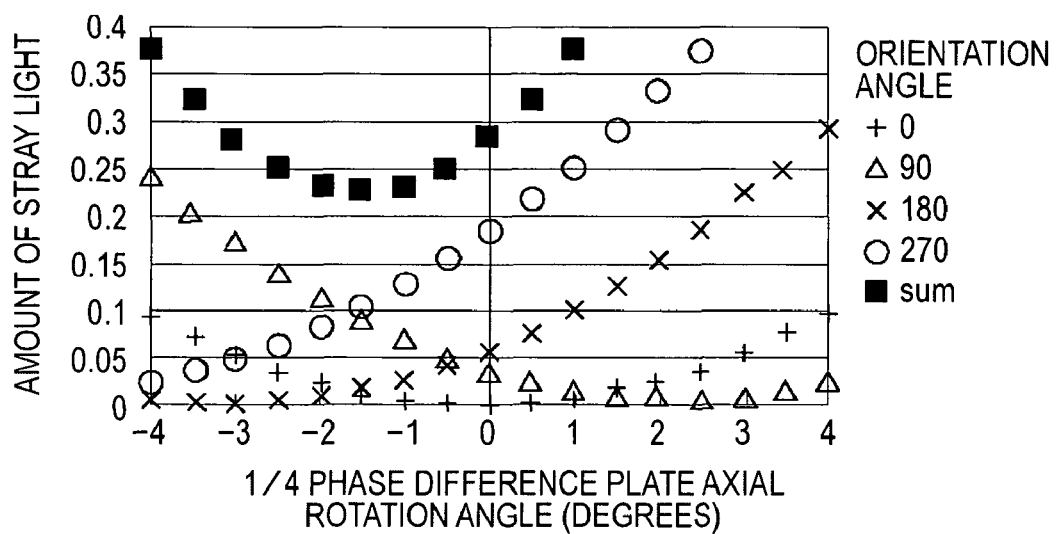
FIGS. 20A and 20B illustrate diagrams of amount of stray diffracted light of the reflective liquid crystal display device of the green light path in the first exemplary embodiment.
Figure 20B:
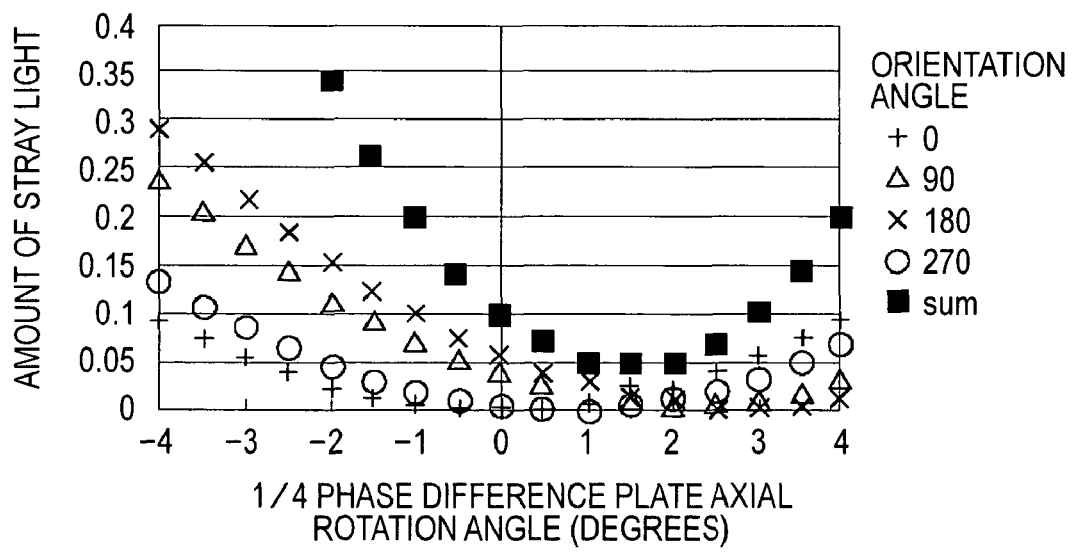

FIGS. 20A and 20B illustrate the amount of stray light of diffracted light in a case of the optical axis (fast axis and slow axis) of the quarter wave plate 12g being rotated within the xy plane. Here, the sum of stray light of the diffracted light of the 1st order through the 5th order is shown as the sum of diffraction stray light regarding each orientation angle (0°, 90°, 180°, and 270°, where the orientation angle 0° is the y axis negative direction, the orientation angle 90° is the x axis positive direction, the orientation angle 180° is the y axis positive direction, and the orientation angle 270° is the x axis negative direction). Also here, each diffracted light intensity generated from the reflective liquid crystal display device 11g is represented as 1.

FIG. 20A illustrates a case where the fast axis is set with the x direction as a reference (i.e., the state where the fast axis faces the X positive direction is 0° in FIG. 20A), and FIG. 20B illustrates a case where the slow axis is set with the x direction as a reference (i.e., the state where the slow axis faces the X positive direction is 0° in FIG. 20B). It can be seen from FIG. 20A that the minimum value of the sum of all diffracted stray light is 0.225 with the fast axis inclined by −1.5°, and from FIG. 20B that the minimum value of the sum of all diffracted stray light is 0.045 with the slow axis inclined by +1.5°. Thus, with the present exemplary embodiment, the amount of diffraction stray light can be reduced to around one fifth, and contrast can be improved, by based on the slow axis on the x direction, and further inclining by +1.5°.

Also, the sum of diffracted stray light in the orientation angle 0° and 180° which is cast into the direction where there is no polarization axis inclination due to the polarization split film 9a1 of the polarization beam splitter 9a is 0.030 (FIG. 20A) when the fast axis can be inclined −1.5° from the x axis direction, and is 0.030 (FIG. 20B) when the slow axis can be inclined +1.5° from the x axis direction, meaning that the contrast is not dependent on the optical axis positioning direction of the quarter wave plate 12g (the direction of the fast axis or slow axis).

On the other hand, the sum of diffracted stray light in the orientation angle 90° and 270° which is cast into the direction where there is polarization axis inclination due to the polarization split film 9a1 of the polarization beam splitter 9a is 0.195 (FIG. 20A) when the fast axis can be inclined −1.5° from the x axis direction, and is 0.145 (FIG. 20B) when the slow axis can be inclined +1.5° from the x axis direction, meaning that the contrast is dependent on the optical axis positioning direction of the quarter wave plate 12g (the direction of the fast axis or slow axis).

According to FIGS. 18A, 18B, 20A, and 20B, performance of contrast (amount of stray light) with regard to the optical axis placement direction of the quarter wave plate 12g depends on the phase difference of the diffracted light generated in the S-polarization direction (the orientation angle 90° and orientation angle 270° directions) by the reflective liquid crystal display device 11g when displaying black, so an image display device with high contrast can be obtained by placing the quarter wave plate 12g such that the direction of the slow axis of the quarter wave plate 12g and the S polarization direction (x direction) are generally parallel in a case where the phase difference of the diffracted light cast into the polarization axis direction 107a inclined clockwise with respect to the S-polarization direction (x direction) as viewed from the reflective liquid crystal display device 11g side is smaller than the phase difference of the diffracted light cast into the polarization axis direction 107b inclined counter-clockwise.

Also, keeping the generally-parallel angle between the slow axis direction of the quarter wave plate 12g and the S-polarization direction within 5° yields images with high contrast, and keeping this within 3° yields images with even higher contrast.

Next, FIG. 21 illustrates the optical path of the red light which has been subjected to color separation by the dichroic mirror 8 in detail, using the polarization beam splitter 9b, the polarization split film 9b1, the quarter wave plate 12r, and the reflective liquid crystal display device 11r. In the drawing, reference numeral 15rb denotes incident light which is light of the red band which has been subjected to color separation by the dichroic mirror 8 being cast into the polarization beam splitter 9b, 16a denotes incident beams from the X positive direction within the xy plane, 16b denotes incident beams from the x negative direction within the xy plate, 17b denotes the polarization axis of the incident light 16a inclined by the polarization split film 9b1, and 17a denotes the polarization axis of the incident light 16b inclined by the polarization split film 9b1, with the incident light axis of the polarization beam splitter 9b being the y direction, the reflection light axis the z direction, and the direction substantially perpendicular to the xy plane the x direction.

As shown in FIG. 21, the incident beam 16a from the x positive direction has the polarization axis 17b thereof inclined in the counter-clockwise direction as viewed from the z positive direction at the time of reflecting off of the polarization split film 9b1, and the polarization axis 17a of the incident beam 16b from the x negative direction can be inclined in the clockwise direction as viewed from the z negative direction at the time of reflecting off of the polarization split film 9b1. The configuration is such that the polarization axis inclination generated at the polarization split film 9b1 of the polarization beam splitter 9b is inverted within the yz plane when compared within incident beams 16a and 16b of the green optical path shown in FIG. 13.

Further, the incident beam 16a is transmitted through the quarter wave plate 12r, reflected off of the reflective liquid crystal display device 11r, is transmitted through the quarter wave plate 12r again, and is cast into the polarization split film 9b1 of the polarization beam splitter 9b. The beam 16a which has been reflected off of the reflective liquid crystal display device 11r proceeds in the x negative direction, and is cast into the polarization split film 9b1 having a polarization axis 17a inclination which is linearly symmetrical on the x axis with respect to the polarization axis 17b. Also, the incident beam 16b is transmitted through the quarter wave plate 12r, reflected off of the reflective liquid crystal display device 11r, is transmitted through the quarter wave plate 12r again, and is cast into the polarization split film 9b1 of the polarization beam splitter 9b. The beam 16b, which has been reflected off of the reflective liquid crystal display device 11r, proceeds in the x positive direction, and is cast into the polarization split film 9b1 having a polarization axis 17b inclination which is linearly symmetrical on the x axis with respect to the polarization axis 17a.

Further, the incident beams 16a and 16b are analyzed and transmitted corresponding to the direction of the polarization axis 17b and polarization axis 17a of the polarization split film 9b1, respectively.

The reflective liquid crystal display device 11r of the red light path has the same properties of the reflective liquid crystal display device 11g of the green light path, and is rotated 180° with respect to the reflective liquid crystal display device 11g of the green light path within the reflective liquid crystal display device face (the xy plane in FIGS. 13 and 21).

Figure 22:
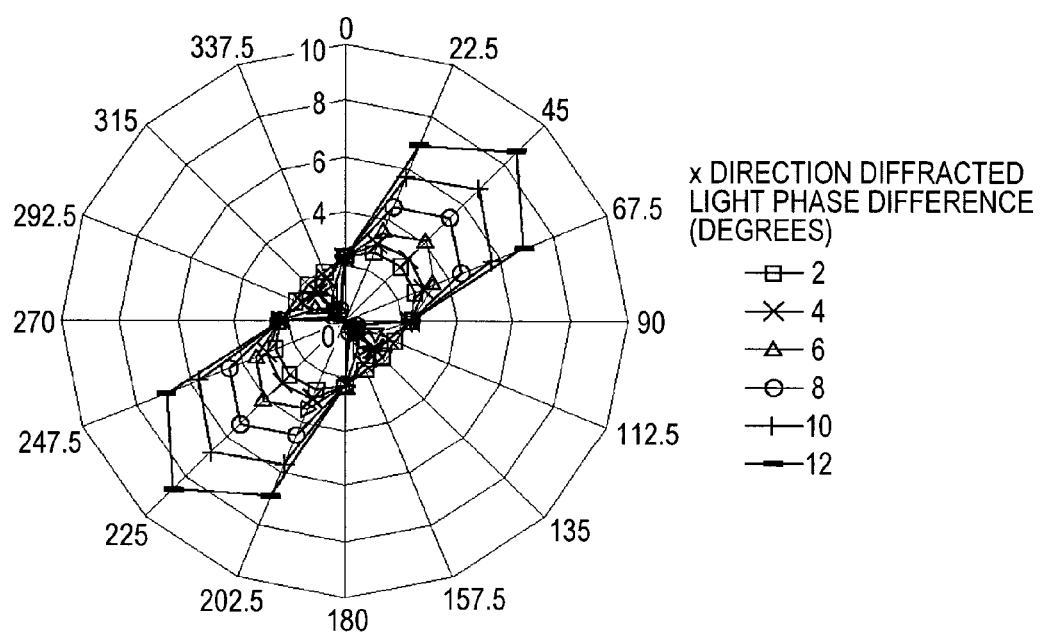
FIG. 22 illustrates a 0th order light phase difference contour diagram for the reflective liquid crystal display device of the red light path in the first exemplary embodiment.

FIG. 22 illustrates the phase difference incident angle properties of the reflective liquid crystal display device 11r for black display. The incident light directions to the reflective liquid crystal display device 11r in FIG. 22 are defined as the y axis negative direction for the orientation angle of 0°, the x axis positive direction for the orientation angle of 90°, the y axis positive direction for the orientation angle of 180°, and the x axis negative direction for the orientation angle of 270°, respectively. Here, with Δn as the refractive index difference of ordinary rays and extraordinary rays with respect to the thickness of the liquid crystal layer, d as the liquid crystal layer thickens, and λ as the incident wavelength, the phase difference when displaying black obtained by Δnd/λ shows that the λ of the black display phase difference of red band input shown in FIG. 22 is greater than that of the black display phase difference of green band input shown in FIG. 15, meaning that the phase difference is small.

Figure 23:
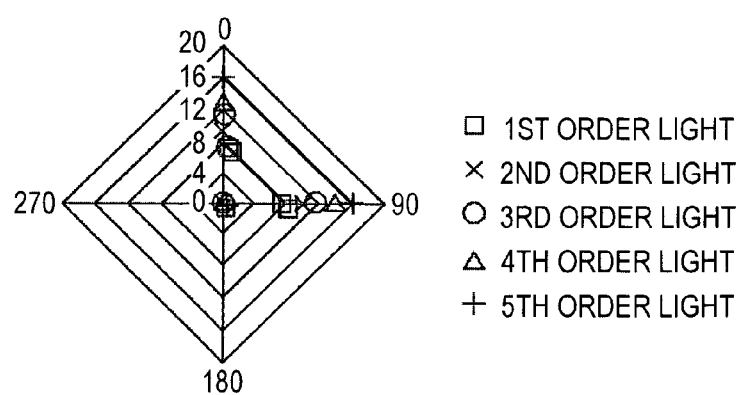
FIG. 23 illustrates a diffracted light phase difference contour diagram for the reflective liquid crystal display device of the red light path in the first exemplary embodiment.

Also, FIG. 23 illustrates a phase difference pattern of diffracted light generated at the reflective liquid crystal display device 11r while displaying black. The reflecting pixel electrodes 207 of the reflective liquid crystal display device 11r shown in FIG. 21 are arrayed in matrix fashion in the x direction and the y direction, so diffracted (interference) light is primarily generated in the x direction and the y direction. The diffraction angle is 4.0°, and an output angle of 20° (5th order light) projected from the projection light system 14 has been taken into consideration. Also, the orientation angle 0° direction represents the diffracted light generated in the y axis negative direction, the orientation angle 90° direction represents the diffracted light generated in the x axis positive direction, the orientation angle 180° direction represents the diffracted light generated in the y axis positive direction, and the orientation angle 270° direction represents the diffracted light generated in the x axis negative direction. Now, the reflective liquid crystal display device 11r in the red light path is rotated by 180° within the reflective liquid crystal display device plane (the xy plane in FIGS. 13 and 21) with respect to the reflective liquid crystal display device 11g in the green light path, so the phase difference pattern of diffracted light is rotated 180° as compared to that in FIG. 16.

Figure 24:
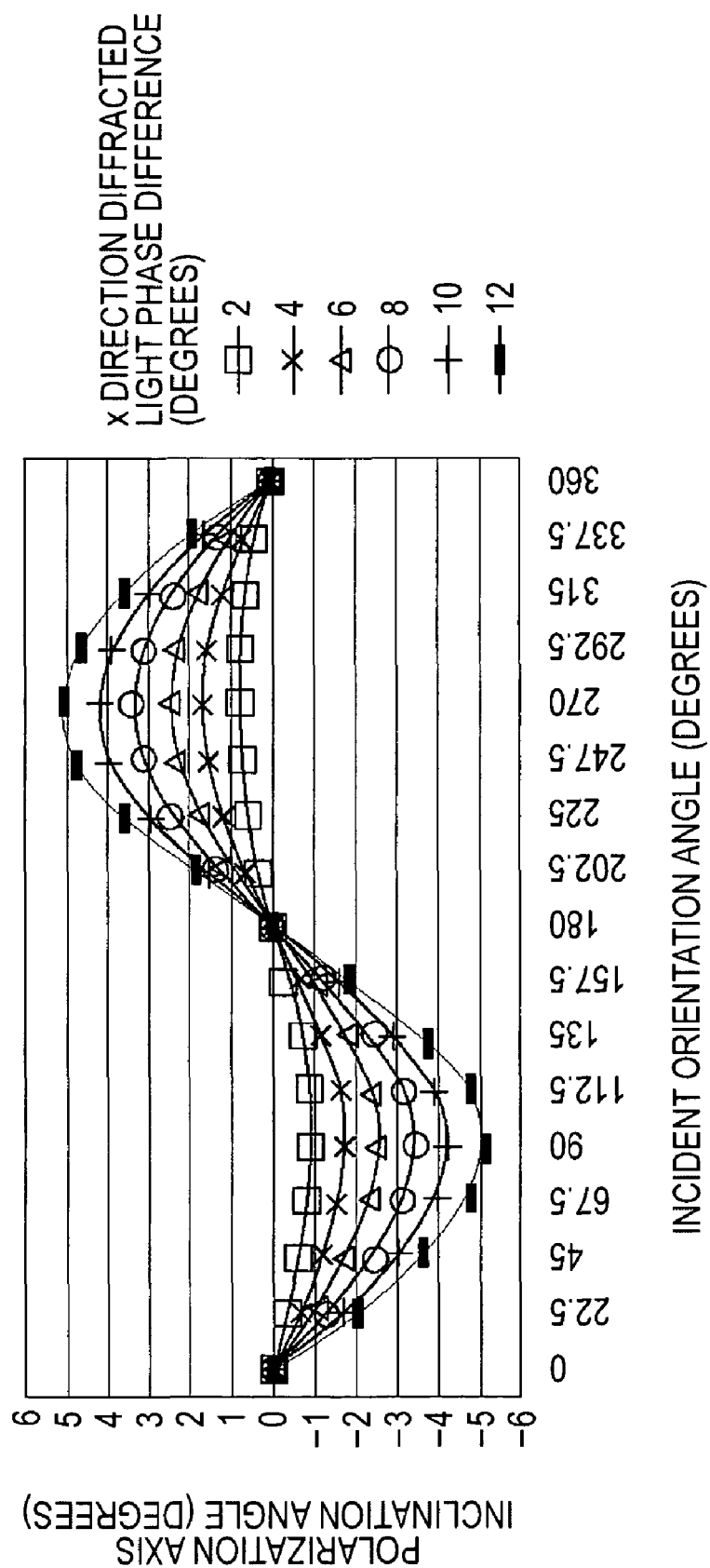
FIG. 24 illustrates a diagram showing the polarization axis inclination angle of the polarization split film in the red light path in the first exemplary embodiment.

FIG. 24 illustrates the inclination of the polarization axis corresponding to the incident angle, which is generated at the polarization film 9b1 of the polarization beam splitter 9b. The definition of the orientation angles in FIG. 24 is the same as with FIG. 22, with the orientation angle 0° direction representing the diffracted light generated in the y axis negative direction with respect to the polarization split film 9b1, the orientation angle 90° direction representing the diffracted light generated in the x axis positive direction, the orientation angle 180° direction representing the diffracted light generated in the y axis positive direction, and the orientation angle 270° direction representing the diffracted light generated in the x axis negative direction, as viewed from the axial direction of incidence to the polarization split film 9b1 from the reflective liquid crystal display device 11r. Further, clockwise rotation of the polarization axis inclination as viewed from the z axis positive direction is positive, and counter-clockwise rotation is negative.

Note that the polarization axis inclination direction of the red light path in FIG. 24 is inverted in the yz plane with respect to the polarization axis inclination of the green light path shown in FIG. 17.

Figure 25A:
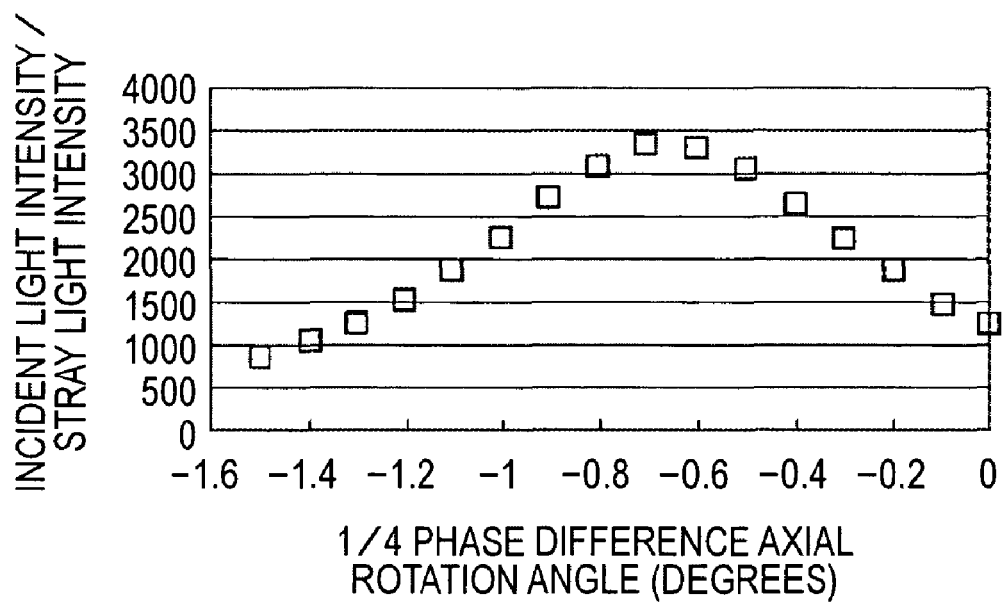
FIGS. 25A and 25B illustrate diagrams of 0th order light contrast of the reflective liquid crystal display device of the red light path in the first exemplary embodiment.
Figure 25B:
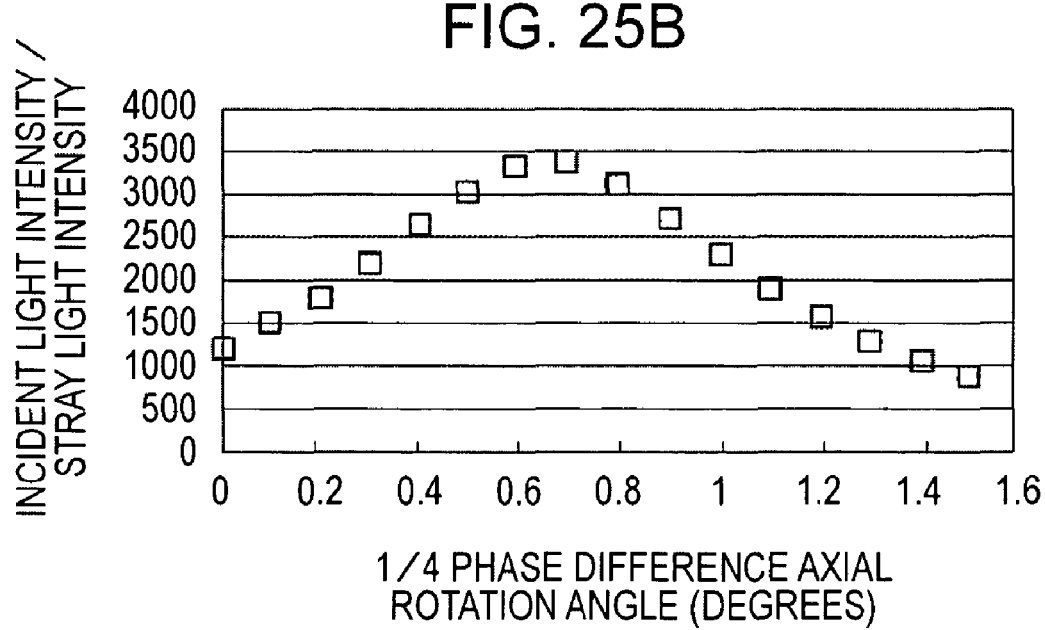

Now, FIGS. 25A and 25B illustrate the amount of the 0th order stray light of the reflective liquid crystal display device 11r when displaying black. The phase difference of 0th order light is as shown in FIG. 22. FIG. 25A illustrates the ratio of stray light intensity with respect to incident light intensity as contrast, in a case of rotation within the xy plane with the direction where the direction of the fast axis and the direction of the x axis match as a reference (where the quarter phase difference axis rotation angle=0°), and FIG. 25B in a case of rotation within the xy plane with the direction where the direction of the slow axis and the direction of the x axis match as a reference (where the quarter phase difference axis rotation angle=0°). The clockwise direction of the rotation angle of the quarter wave plate as viewed from the z positive direction is the positive direction, and the counter-clockwise direction is the negative direction. The outermost angle of the incident illumination light here to the reflective liquid crystal display device 11r is 12°.

As can be seen from FIGS. 25A and 25B, with the fast axis as the reference, the contrast is maximum at 3328 when rotated −0.7° in the negative direction, and with the slow axis as the reference, the contrast is maximum at 3330 when rotated +0.7° in the positive direction. As for 0th order light, the contrast, i.e., stray light, is equal, and is not dependent on the disposing direction (fast axis and slow axis direction) of the optical axis of the quarter wave plate 12r.

Next, stray light of the diffracted light will be calculated. FIG. 26 shows the diffraction angle of diffracted light of each order and the polarization axis inclination angle of the polarization beam splitter 9b. Here, the polarization axis inclination angle of the polarization beam splitter 9a is generated only for the diffracted light of the orientation angle 90° (x positive direction) and orientation angle 270° (x negative direction), and analyzing and transmission (stray light) occurs according to each polarization axis inclination angle.

Figure 27A:
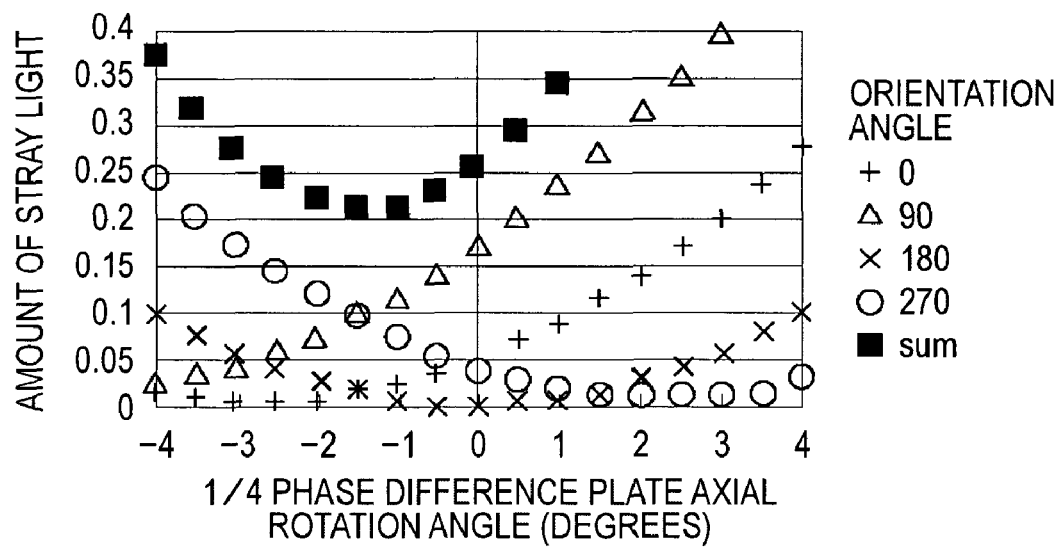
FIGS. 27A and 27B illustrate diagrams of amount of stray diffracted light of the reflective liquid crystal display device of the red light path in the first exemplary embodiment.
Figure 27B:
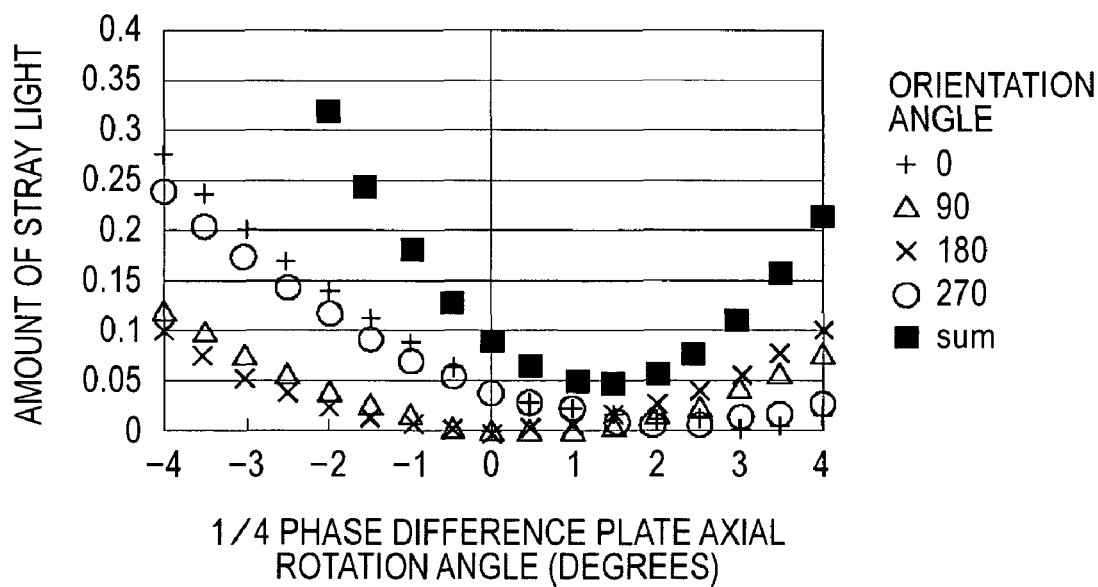

FIGS. 27A and 27B illustrate the amount of stray light of diffracted light in a case of the optical axis (fast axis and slow axis) of the quarter wave plate 12r being rotated within the xy plane. Here, the sum of stray light of the diffracted light of the 1st order through the 5th order is shown as the sum of diffraction stray light regarding each orientation angle (0°, 90°, 180°, and 270°), and each diffracted light intensity generated from the reflective liquid crystal display device 11*r* is represented as 1.

FIG. 27A illustrates a case where the fast axis is set with the x direction as a reference, and FIG. 27B illustrates a case where the slow axis is set with the x direction as a reference. It can be seen from FIG. 27A that the minimum value of the sum of all diffracted stray light is 0.210 with the fast axis inclined by −1.5°, and from FIG. 27B that the minimum value of the sum of all diffracted stray light is 0.043 with the slow axis inclined by +1.5°. Thus, with the present exemplary embodiment, the amount of diffraction stray light can be reduced to around one fifth, and contrast can be improved, by placing the slow axis based on the x direction, and further inclining by +1.5°.

Also, the sum of diffracted stray light in the orientation angle 0° and 180° which is cast into the direction where there is no polarization axis inclination due to the polarization split film 9*b*1 of the polarization beam splitter 9*b* is 0.026 (FIG. 27A) when the fast axis can be inclined −1.5° from the x axis direction, and is 0.026 (FIG. 27B) when the slow axis can be inclined +1.5° from the x axis direction, meaning that the contrast is not dependent on the optical axis positioning direction of the quarter wave plate 12*r* (the direction of the fast axis or slow axis).

On the other hand, the sum of diffracted stray light in the orientation angle 90° and 270° which is cast into the direction where there is polarization axis inclination due to the polarization split film 9*b*1 of the polarization beam splitter 9*b* is 0.184 (FIG. 27A) when the fast axis can be inclined −1.5° from the x axis direction, and is 0.017 (FIG. 27B) when the slow axis can be inclined +1.5° from the x axis direction, meaning that the contrast is dependent on the optical axis positioning direction of the quarter wave plate 12*r* (the direction of the fast axis or slow axis).

Keeping the generally-parallel angle between the slow axis direction of the quarter wave plate 12*r* and the S-polarization direction within 5° yields images with high contrast, and keeping this within 3° yields images with even higher contrast.

Figure 28:
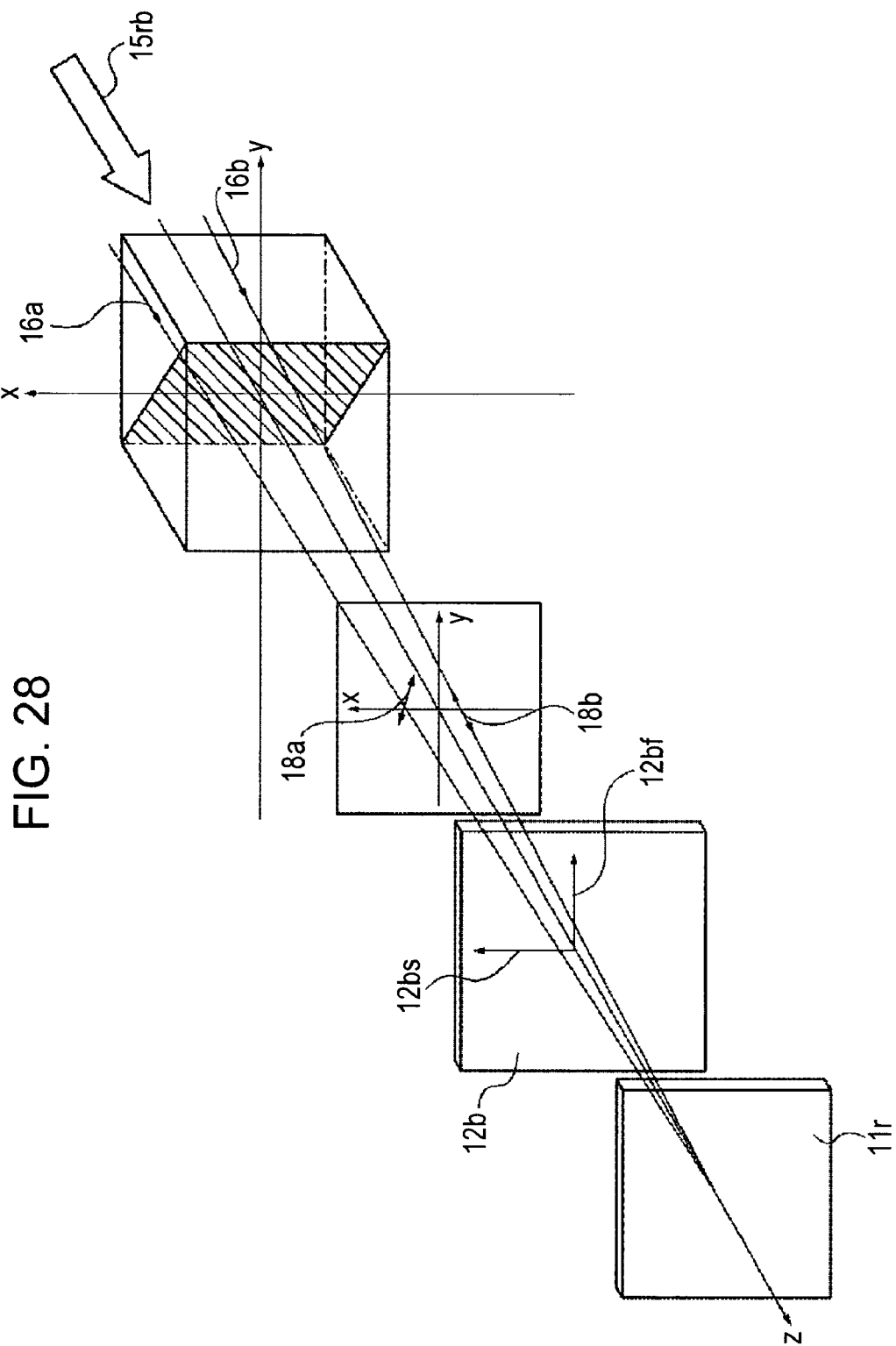
FIG. 28 illustrates a diagram showing polarization axis inclination generated by the polarization split film in the blue light path in the first exemplary embodiment.

Next, FIG. 28 illustrates the optical path of the blue light which has been subjected to color separation by the dichroic mirror 8 in detail, using the polarization beam splitter 9*b*, the polarization split film 9*b*1, the quarter wave plate 12*b*, and the reflective liquid crystal display device 11*b*. In the drawing, reference numeral 15*rb* denotes incident light which is light of the blue band which has been subjected to color separation by the dichroic mirror 8 being cast into the polarization beam splitter 9*b*, 16*a* denotes incident beams from the X positive direction within the xy plane, 16*b* denotes incident beams from the x negative direction within the xy plate, 18*a* denotes the polarization axis of the incident light 16*a* inclined by the polarization split film 9*b*1, and 18*b* denotes the polarization axis of the incident light 16*b* inclined by the polarization split film 9*b*1, with the incident light axis of the polarization beam splitter 9*b* being the y direction, the reflection light axis the z direction, and the direction substantially perpendicular to the xy plane the x direction.

As shown in FIG. 28, the incident beam 16*a* from the x positive direction has the polarization axis 18*a* thereof inclined in the counter-clockwise direction as viewed from the z positive direction at the time of transmitting the polarization split film 9*b*1, and the polarization axis 18*b* of the incident beam 16*b* from the x negative direction can be inclined in the clockwise direction as viewed from the z negative direction at the time of transmitting the polarization split film 9*b*1.

Further, the incident beam 16*a* is transmitted through the quarter wave plate 12*b*, reflected off of the reflective liquid crystal display device 11*b*, is transmitted through the quarter wave plate 12*b* again, and is cast into the polarization split film 9*b*1 of the polarization beam splitter 9*b*. The beam 16*a* which has been reflected off of the reflective liquid crystal display device 11*b* proceeds in the x negative direction, and is cast into the polarization split film 9*b*1 having a polarization axis 18*b* inclination which is linearly symmetrical on the x axis with respect to the polarization axis 18*a*. Also, the incident beam 16*b* is transmitted through the quarter wave plate 12*b*, reflected off of the reflective liquid crystal display device 11*b*, is transmitted through the quarter wave plate 12*b* again, and is cast into the polarization split film 9*b*1 of the polarization beam splitter 9*b*. The beam 16*b* which has been reflected off of the reflective liquid crystal display device 11*b* proceeds in the x positive direction, and is cast into the polarization split film 9*b*1 having a polarization axis 18*a* inclination which is linearly symmetrical on the x axis with respect to the polarization axis 18*b*.

Further, the incident beams 16*a* and 16*b* are analyzed and transmitted corresponding to the direction of the polarization axis 18*b* and polarization axis 18*a* of the polarization split film 9*b*1, respectively.

The reflective liquid crystal display device 11*b* of the blue light path has the same properties of the reflective liquid crystal display device 11*g* of the green light path.

Figure 29:
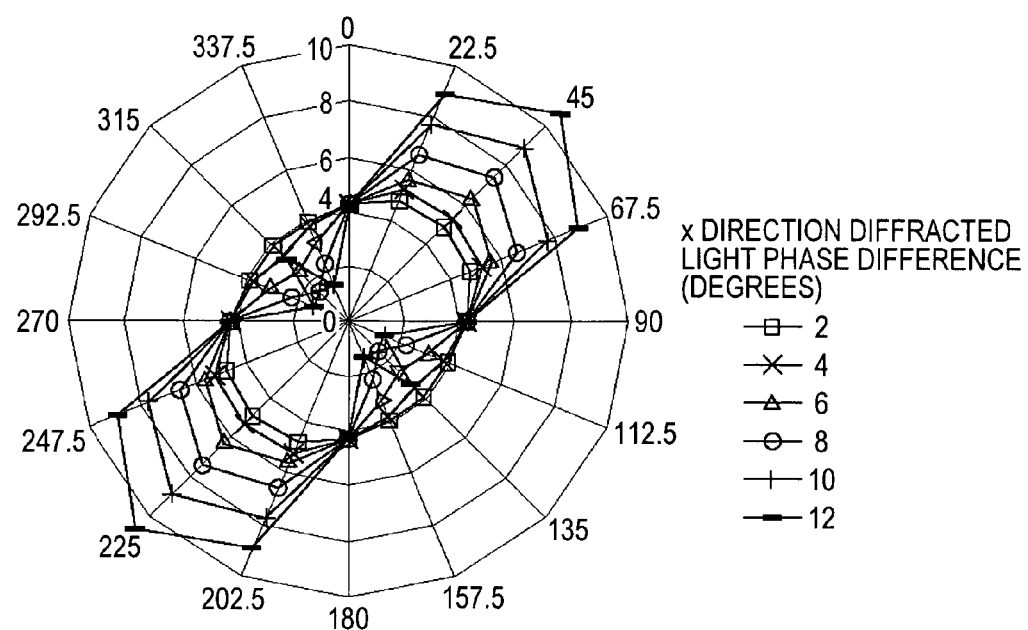
FIG. 29 illustrates a 0th order light phase difference contour diagram for the reflective liquid crystal display device of the blue light path in the first exemplary embodiment.

FIG. 29 illustrates the phase difference incident angle properties of the reflective liquid crystal display device 11*b* for black display. The incident light directions to the reflective liquid crystal display device 11*b* in FIG. 29 are defined as the y axis negative direction for the orientation angle of 0°, the x axis positive direction for the orientation angle of 90°, the y axis positive direction for the orientation angle of 180°, and the x axis negative direction for the orientation angle of 270°, respectively. Here, with $\Delta n$ as the refractive index difference of ordinary rays and extraordinary rays with respect to the thickness of the liquid crystal layer, d as the liquid crystal layer thickens, and $\lambda$ as the incident wavelength, the phase difference when displaying black obtained by $\Delta nd/\lambda$ shows that the $\lambda$ of the black display phase difference of blue band input shown in FIG. 29 is smaller than that of the black display phase difference of green band input shown in FIG. 15, meaning that the phase difference is great.

Figure 30:
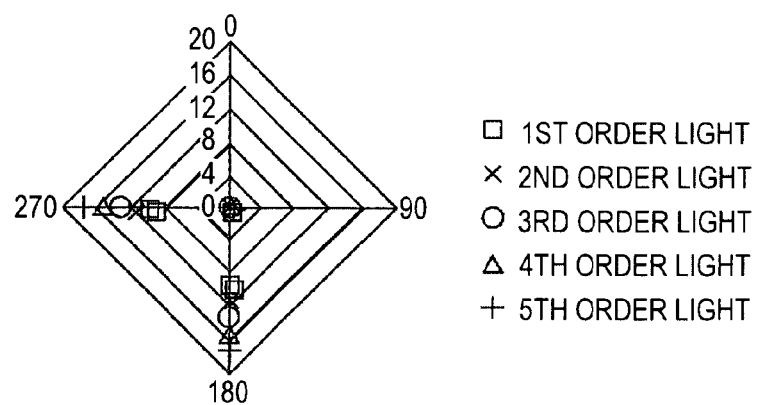
FIG. 30 illustrates a diffracted light phase difference contour diagram for the reflective liquid crystal display device of the blue light path in the first exemplary embodiment.

Also, FIG. 30 illustrates a phase difference pattern of diffracted light generated at the reflective liquid crystal display device 11*b* while displaying black. The reflecting pixel electrodes 207 of the reflective liquid crystal display device 11*b* shown in FIG. 29 are arrayed in matrix fashion in the x direction and the y direction, so diffracted (interference) light is primarily generated in the x direction and the y direction. The diffraction angle is 3.0°, and an output angle of 15° (5th order light) projected from the projection light system 14 has been taken into consideration. Also, the orientation angle 0° direction represents the diffracted light generated in the y axis negative direction, the orientation angle 90° direction represents the diffracted light generated in the x axis positive direction, the orientation angle 180° direction represents the diffracted light generated in the y axis positive direction, and the orientation angle 270° direction represents the diffracted light generated in the x axis negative direction.

The inclination of the polarization axis generated at the polarization split film 9*b*1 of the polarization beam splitter 9*b* is the same as that of the green light path, shown in FIG. 17.

Figure 31A:
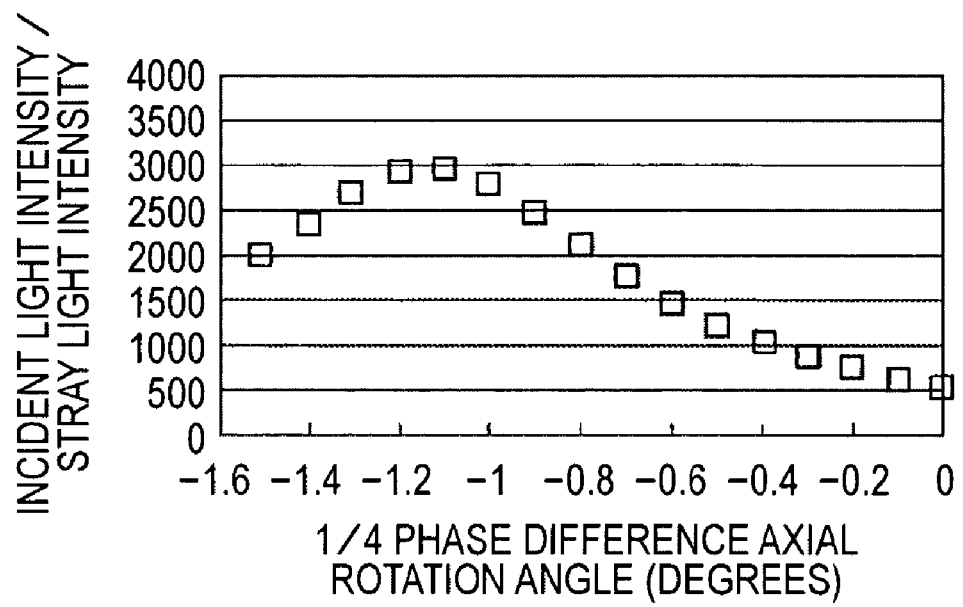
FIGS. 31A and 31B illustrate diagrams of 0th order light contrast of the reflective liquid crystal display device of the blue light path in the first exemplary embodiment.
Figure 31B:
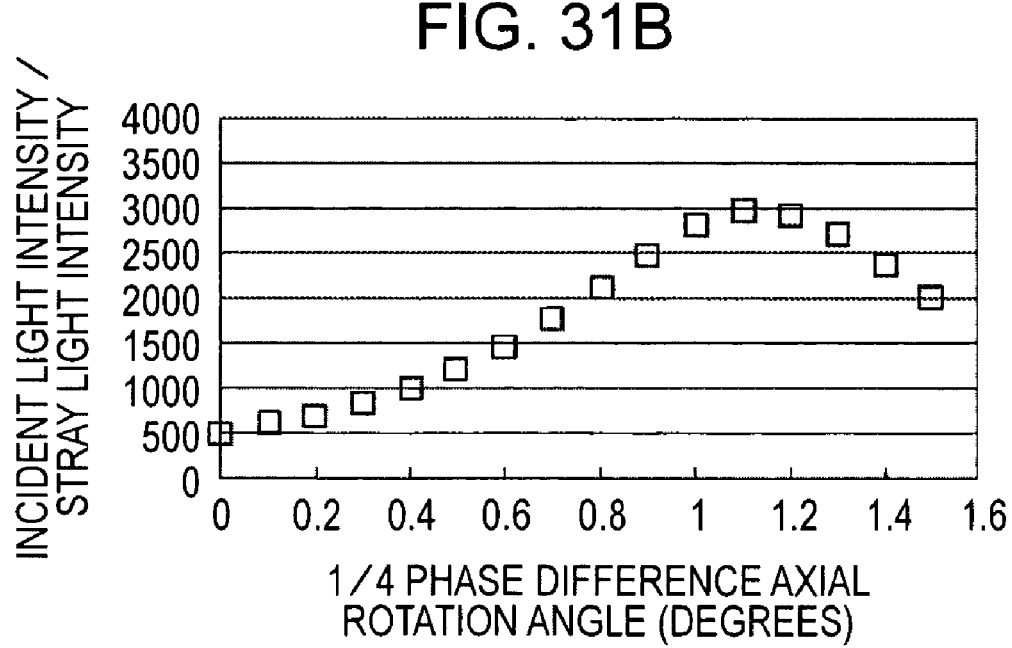

Now, FIGS. 31A and 31B illustrate the 0th order stray light of the reflective liquid crystal display device 11b when displaying black. The phase difference of 0th order light is as shown in FIG. 29. FIG. 31A illustrates the ratio of stray light intensity with respect to incident light intensity as contrast, in a case of rotation within the xy plane with the direction where the direction of the fast axis and the direction of the x axis match as a reference (where the quarter phase difference axis rotation angle=0°), and FIG. 31B in a case of rotation within the xy plane with the direction where the direction of the slow axis and the direction of the x axis match as a reference (where the quarter phase difference axis rotation angle=0°). The clockwise direction of the rotation angle of the quarter wave plate as viewed from the z positive direction is the positive direction, and the counter-clockwise direction is the negative direction. The outermost angle of the incident illumination light here to the reflective liquid crystal display device 11b is 12°.

With the fast axis as the reference, the contrast is maximum at 3008 when rotated −1.1° in the negative direction, and with the slow axis as the reference, the contrast is maximum at 3006 when rotated +1.1° in the positive direction. As for 0th order light, the contrast, i.e., stray light, is equal, and is not dependent on the disposing direction (fast axis and slow axis direction) of the optical axis of the quarter wave plate 12b.

Next, stray light of the diffracted light will be calculated. FIG. 32 shows the diffraction angle of diffracted light of each order and the polarization axis inclination of the polarization beam splitter 9b. Here, the polarization axis inclination angle of the polarization beam splitter 9a is generated only for the diffracted light of the orientation angle 90° (x positive direction) and orientation angle 270° (x negative direction), and analyzing and transmission (stray light) occurs according to each polarization axis inclination angle.

Figure 33A:
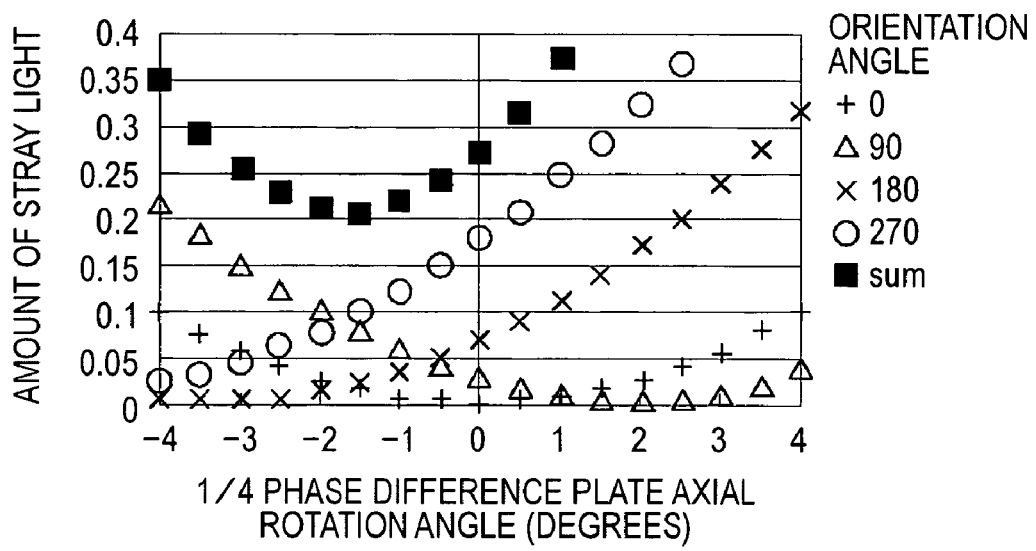
FIGS. 33A and 33B illustrate diagrams of amount of stray diffracted light of the reflective liquid crystal display device of the blue light path in the first exemplary embodiment.
Figure 33B:
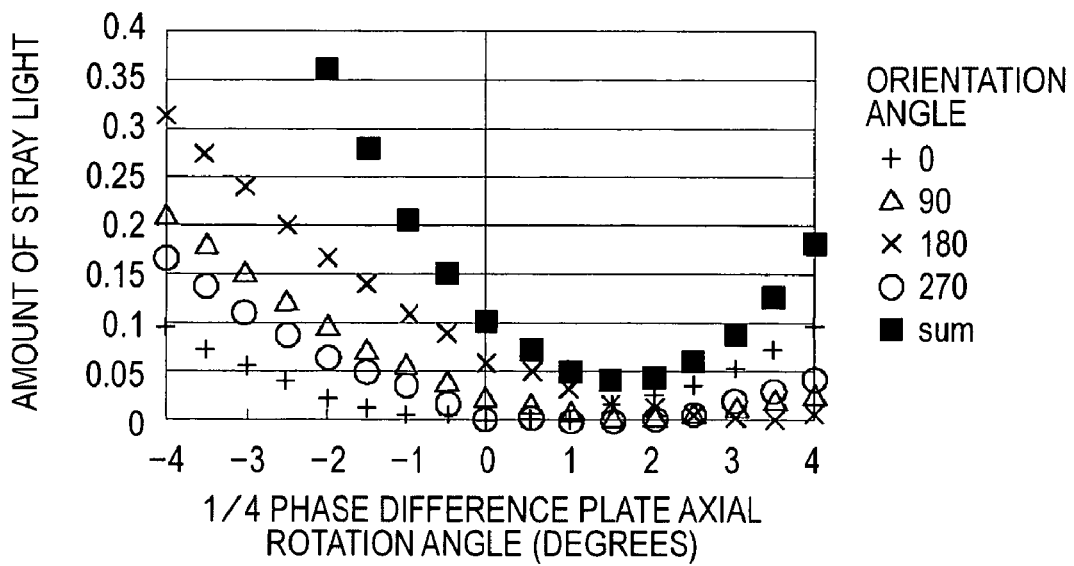

FIGS. 33A and 33B illustrate the amount of stray light of diffracted light in a case of the optical axis (fast axis and slow axis) of the quarter wave plate 12b being rotated within the xy plane. Here, the sum of stray light of the diffracted light of the 1st order through the 5th order is shown as the sum of diffraction stray light regarding each orientation angle (0°, 90°, 180°, and 270°), and each diffracted light intensity generated from the reflective liquid crystal display device 11b is represented as 1.

FIG. 33A illustrates a case where the fast axis is set with the x direction as a reference, and FIG. 33B illustrates a case where the slow axis is set with the x direction as a reference. It can be seen from FIG. 33A that the minimum value of the sum of all diffracted stray light is 0.208 with the fast axis inclined by −1.5°, and from FIG. 33B that the minimum value of the sum of all diffracted stray light is 0.042 with the slow axis inclined by +1.5°. Thus, with the present exemplary embodiment, the amount of diffraction stray light can be reduced to around one fifth, and contrast can be improved, by placing the slow axis based on the x direction, and further inclining by +1.5°.

Also, the sum of diffracted stray light in the orientation angle 0° and 180° which is cast into the direction where there is no polarization axis inclination due to the polarization split film 9b1 of the polarization beam splitter 9b is 0.035 (FIG. 33A) when the fast axis can be inclined −1.5° from the x axis direction, and is 0.035 (FIG. 33B) when the slow axis can be inclined +1.5° from the x axis direction, meaning that the contrast is not dependent on the optical axis positioning direction of the quarter wave plate 12b (the direction of the fast axis or slow axis).

On the other hand, the sum of diffracted stray light in the orientation angle 90° and 270° which is cast into the direction where there is polarization axis inclination due to the polarization split film 9b1 of the polarization beam splitter 9b is 0.173 (FIG. 33A) when the fast axis can be inclined −1.5° from the x axis direction, and is 0.006 (FIG. 33B) when the slow axis can be inclined +1.5° from the x axis direction, meaning that the contrast is dependent on the optical axis positioning direction of the quarter wave plate 12b (the direction of the fast axis or slow axis).

Keeping the generally-parallel angle between the slow axis direction of the quarter wave plate 12b and the S-polarization direction within 5° yields images with high contrast, and keeping this within 3° yields images with even higher contrast.

Second Exemplary Embodiment

Figure 34:
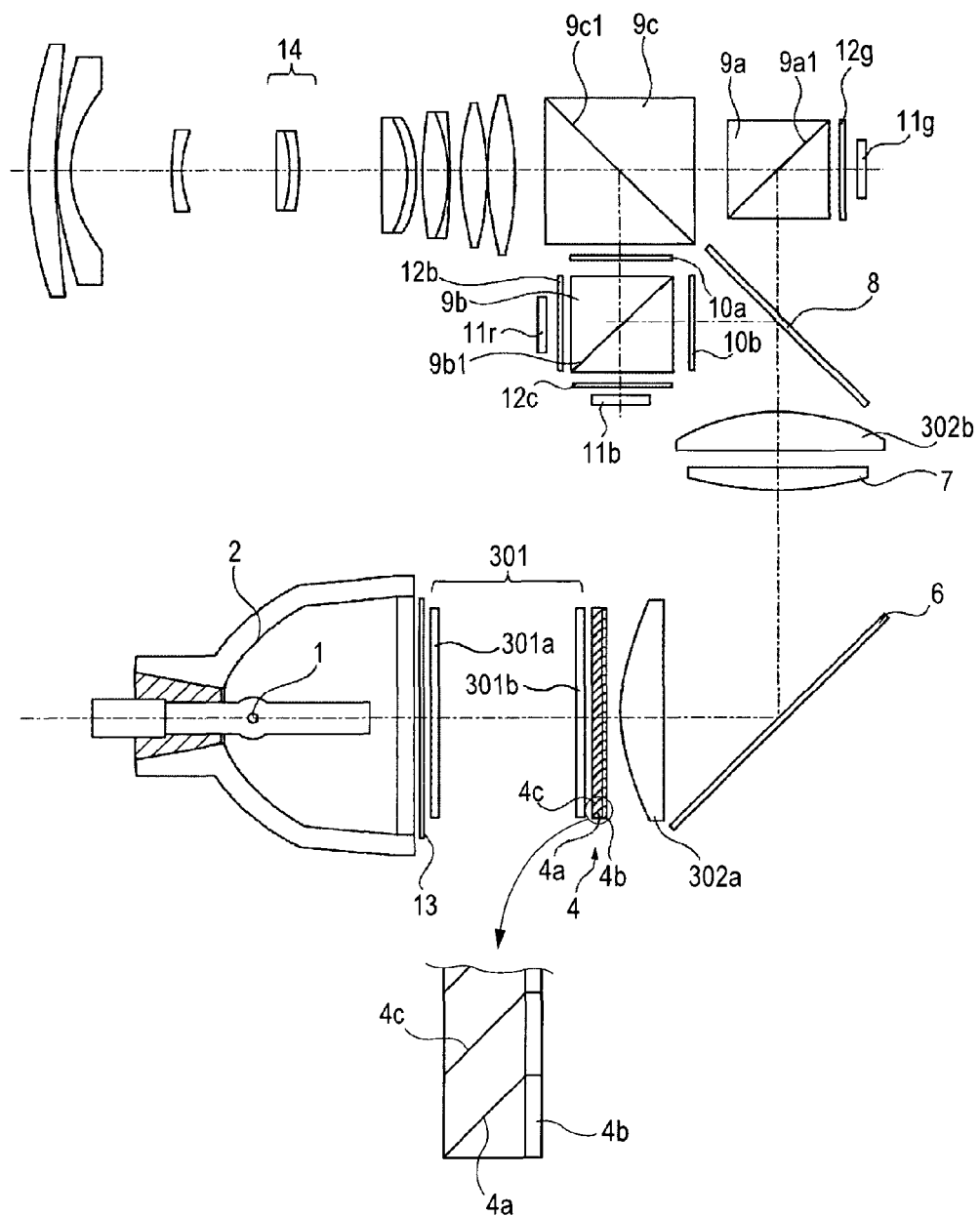
FIG. 34 illustrates a diagram showing a reflective liquid crystal display apparatus according to a second exemplary embodiment.

FIG. 34 illustrates an overall diagram of a reflective liquid crystal display apparatus which is the second exemplary embodiment. In the drawing, components which are the same as those in FIG. 1 of the first exemplary embodiment have been provided with the same reference numerals.

In the drawing, reference numeral 301 denotes a one-dimensional integrator configured to form a substantially uniform intensity illumination distribution in a one-dimensional direction, configured of a cylindrical lens arrays 301a and 301b arrayed one-dimensionally, and 302a and 302b are light flux compression lenses for compressed illumination of the generally parallel light flux emitted from the light source 1, having curvature only with regard to the direction substantially orthogonal to the direction of array of the cylindrical lens arrays 301a and 301b.

Further, the light flux from the illumination optical system is subjected to color separation into the three colors or R, G, and B, which are then cast into each of the reflective liquid crystal display devices 11r, 11g, and 11b, and further synthesized and introduced to the projection lens system 14. The configuration of such a color separating/synthesizing optical system is the same as that shown in FIG. 12 for the first exemplary embodiment.

Now, the geometric-optical effects of the illumination optical system according to the present exemplary embodiment will be described with reference to a two-dimensional cross-sectional diagram.

Figure 35A:
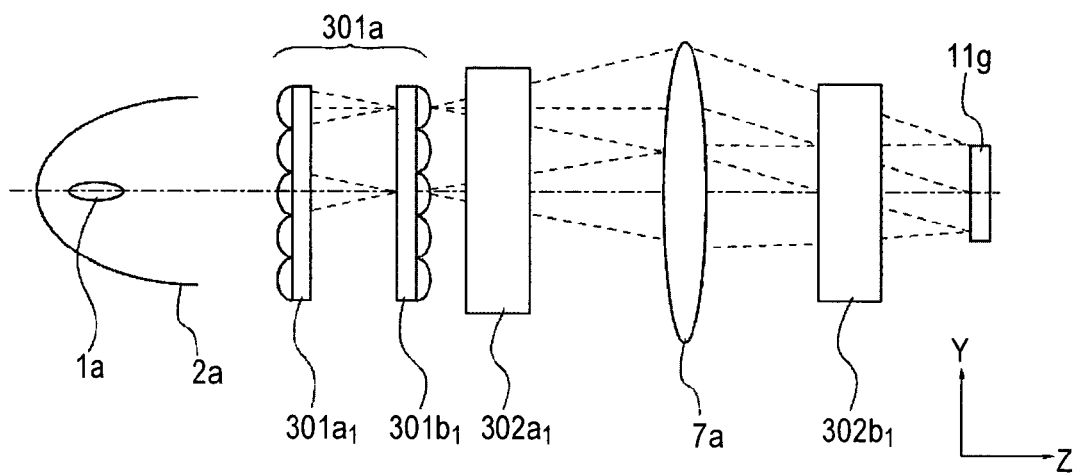
FIGS. 35A and 35B illustrate diagrams showing the illumination optical system according to the second exemplary embodiment.
Figure 35B:
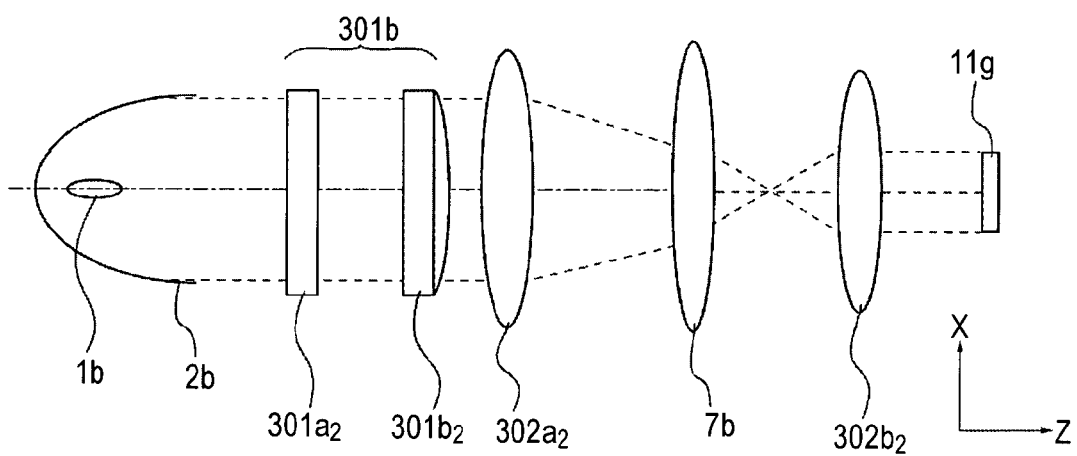

FIG. 35A illustrates a cross-sectional diagram in the lens array direction of the cylindrical lens arrays 301a1 and 301b1 (YZ cross-sectional diagram). The Z-axial direction is the optical axis direction of the light emitted from the light source 1a, the Y-axial direction is the direction of lens array of the one-dimensional integrator, and the X-axial direction is the direction substantially perpendicular to the YZ plane. Further, FIG. 35B is an XZ cross-sectional diagram.

The one-dimensional integrator 301a has a first cylindrical lens array 301a1 made up of multiple cylindrical lenses having refractive power in the YZ plane, and a second cylindrical lens array 301b1, and the condensing optical system has the first optical compression lenses 301a1 having refractive power in the XZ plane, a condenser lens 7a formed of a spherical system, and the second light flux compression lenses 301b1 having refractive power in the XZ plane.

The geometric optics occurring in the XZ plane shown in FIG. 35A will be described. Light emitted from the light source 1a is reflected off of the reflector 2a and is cast into the first cylindrical lens array 301a1 as generally parallel light. Light emitted from the first cylindrical lens array 301a1 is divided according to the number of lenses in the lens array, and is condensed to form a light source image near the second cylindrical lens array 301b1. Light emitted from the second cylindrical lens array 301b1 is refracted by the positive refractive power in the Y direction, and further is subjected to the refractive power of the condenser lens 7a, and is cast into the reflective liquid crystal display device 11g.

Further, the geometric optics occurring in the XZ plane shown in FIG. 35B will be described. Light emitted from the light source 1b is reflected off of the reflector 2b and proceeds in the Z positive direction as generally parallel light, is not subjected to the refractive power of the first cylindrical lens array 301a2 and the second cylindrical lens array 301b2, and illuminated in a condensed manner on the reflective liquid crystal display device 11g as generally parallel light due to the light flux compression lenses 301a2 and 301b2.

According to FIG. 35A, regarding light cast into the reflective liquid crystal display device 11g from the Y direction, the light flux emitted from the second cylindrical lens array 301b1 and the condenser lens 7a and then is illuminated on the reflective liquid crystal display device 11g in a superimposed manner having been subjected to refractive power in the Y direction, and the incident angle is great and the intensity is great. On the other hand, according to FIG. 35B, regarding light cast into the reflective liquid crystal display device 11g from the X direction, the light flux emitted from the light flux compressing lenses 301a2 and 301b2 is illuminated on the reflective liquid crystal display device 11g in a compressed manner as generally parallel light, and the incident angle is small and the intensity is small.

The incident angle intensity distribution cast into the reflective liquid crystal display device 11g is such that the angle of incident light from the S-polarization direction (Y direction) is great with great intensity, and the angle of incident light from the P-polarization direction (X direction) is small with small intensity (the intensity of incident light of the S-polarization direction should be 1.3 times the intensity of incident light of the P-polarization direction, suitably 1.7 times or greater intensity), yielding a rhombus-shaped distribution, and is a distribution with small angle of incident light from 45° (135°, 215°, 315°) and weak intensity (the intensity of incident light of the S-polarization direction should be 1.2 times the intensity of incident light from 45°, suitably 1.4 times or greater intensity).

Figure 36:
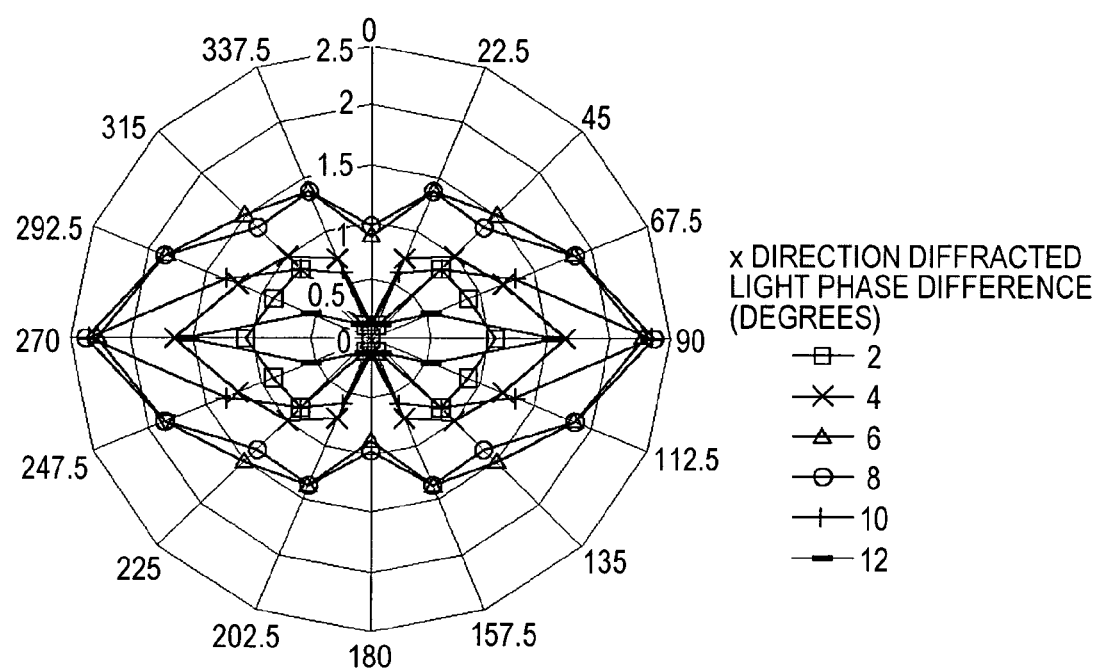
FIG. 36 illustrates a diagram showing the incident angle intensity distribution of the illumination optical system according to the second exemplary embodiment.

Now, FIG. 36 illiterates an example of incident angle intensity distribution of light flux cast into the reflective liquid crystal display device 11 by the illumination optical system according to the present exemplary embodiment. Here, the incident orientation angles are according to the coordinates system shown in FIG. 13 of the first exemplary embodiment, where the orientation angle 0° means a beam entering from the y axis negative direction, the orientation angle 90° the x axis positive direction, the orientation angle 180° the y axis positive direction, and the orientation angle 270° the x axis negative direction, respectively. It can be understood here that of the planes following the orientation angles, the plane where the intensity of light entering the reflective liquid crystal display device is greatest in generally parallel with the X axis (S-polarization direction), with offset within 3°, and in at least one exemplary embodiment, within 1°.

Figure 37A:
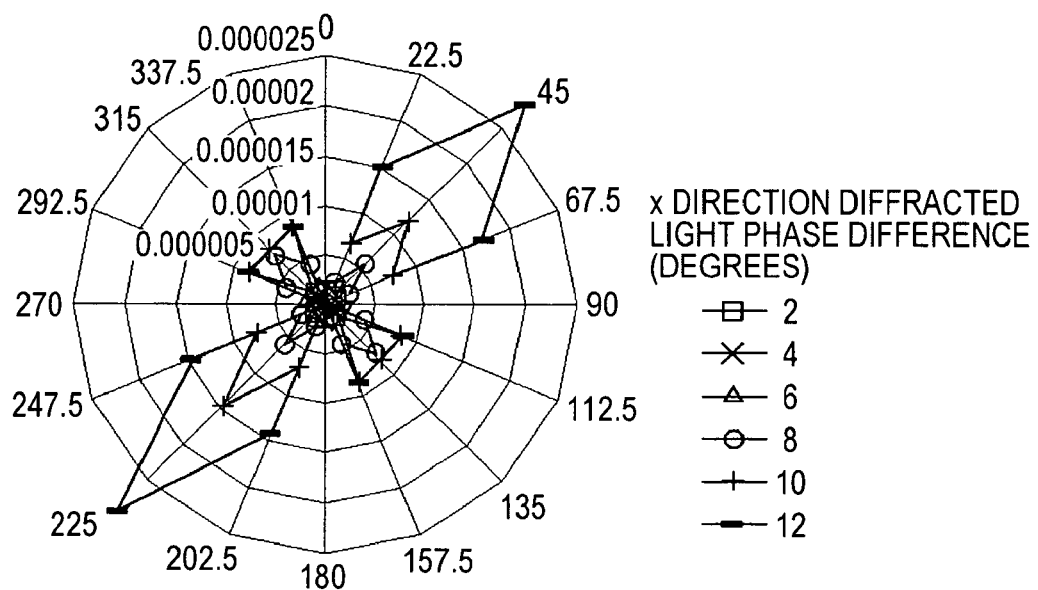
FIGS. 37A and 37B illustrate diagrams of the distribution of stray 0th order light of the reflective liquid crystal display device of the green light path in the first exemplary embodiment.
Figure 37B:
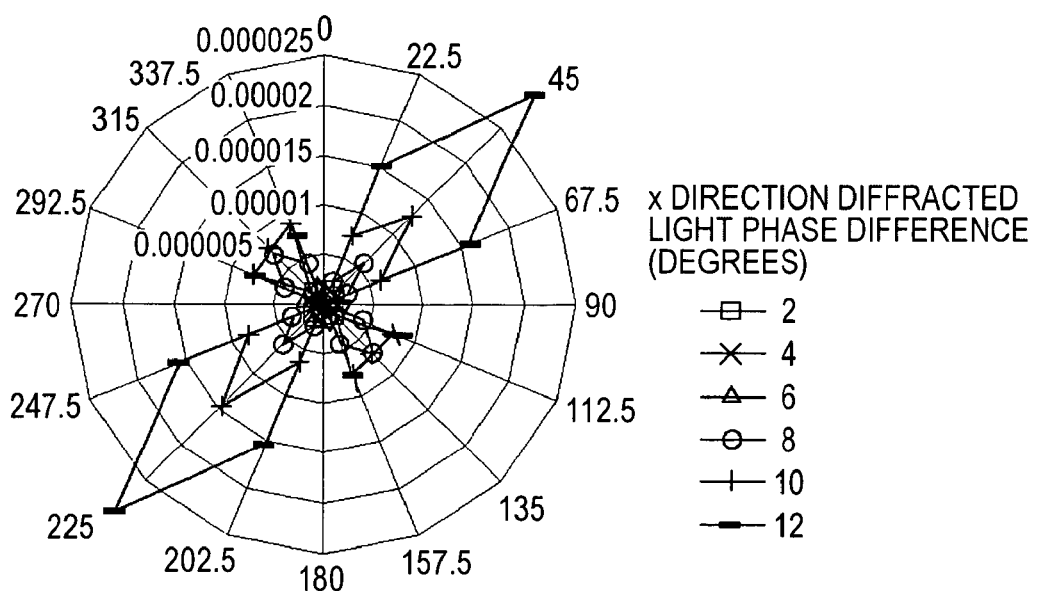

Now, the angle distribution of stray light when the amount of stray light is minimal as shown in FIGS. 18A and 18B (incident light intensity/amount of stray light is maximal) of the first exemplary embodiment is shown in FIGS. 37A and 37B. Let us say that the incident angle intensity distribution on the reflective liquid crystal display device 11g here is a flat illumination where the intensity is the same for the tilt angles 0° through 12° over the orientation angles 0° through 360°. FIG. 37A shows the angle intensity distribution of stray light in a case where the fast axis of the quarter wave plate has been rotated −0.9° from the x axis direction, and FIG. 37B a case where the slow axis of the quarter wave plate has been rotated +0.9° from the x axis direction. Also, as for the value of stray light, the intensity of the total incident light flux is 1.

As can be seen from FIGS. 37A and 37B, there is a great amount of stray light at orientation angles 45° and 255° where the phase difference error of the reflective liquid crystal display device 11g displaying black as shown in FIG. 15 is great, and the stray light distribution is generally equal for both cases of basing on the fast axis and the slow axis (FIGS. 37A and 37B).

Figure 38A:
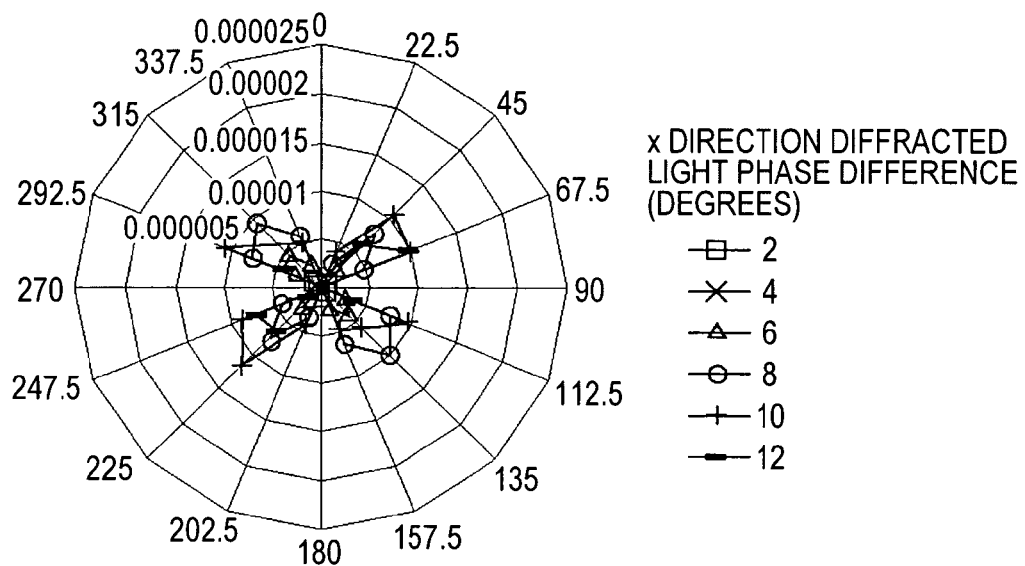
FIGS. 38A and 38B illustrate diagrams of the distribution of stray 0th order light of the reflective liquid crystal display device of the green light path in the second exemplary embodiment.
Figure 38B:
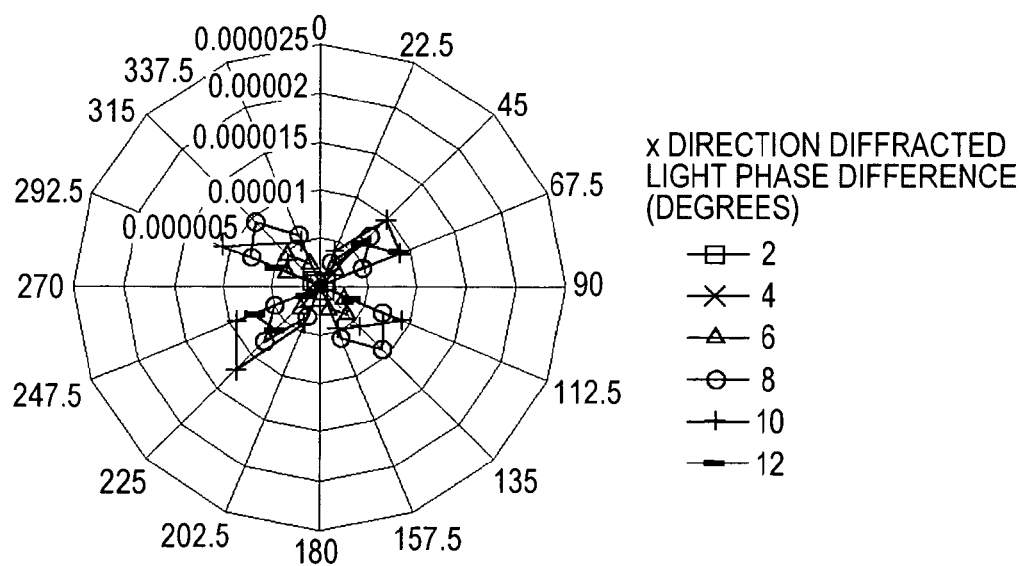

Further, FIGS. 38A and 38B illustrate diagrams where the stray light distribution shown in FIGS. 37A and 37B has been weighted with the incident angle intensity distribution at the reflective liquid crystal display device 11g according to the present exemplary embodiment shown in FIG. 36. As with FIGS. 37A and 37B, for the value of stray light, the intensity of the total incident light flux is 1. Here, the intensity of the incident angle intensity distribution shown in FIG. 36 is weak in the direction of the orientation angle 45° (135°, 225°, 315°), so stray light in the orientation angles 45° and 225° shown in FIG. 37A and 37B decreases, and the amount of stray light of the entire light flux can be reduced, and contrast can be improved.

Figure 39A:
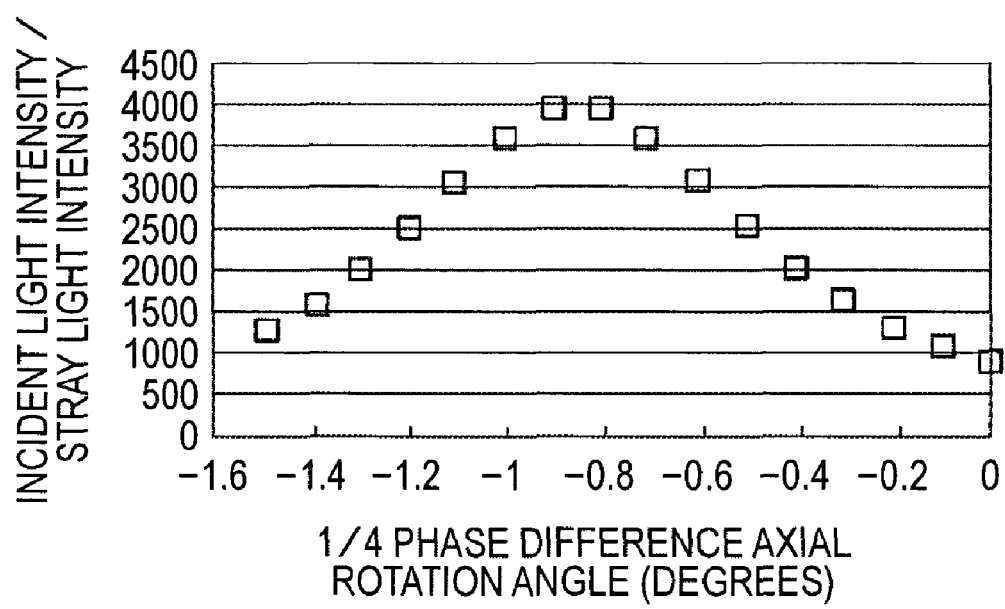
FIGS. 39A and 39B illustrate diagrams of the contrast of 0th order light of the reflective liquid crystal display device of the green light path in the second exemplary embodiment.
Figure 39B:
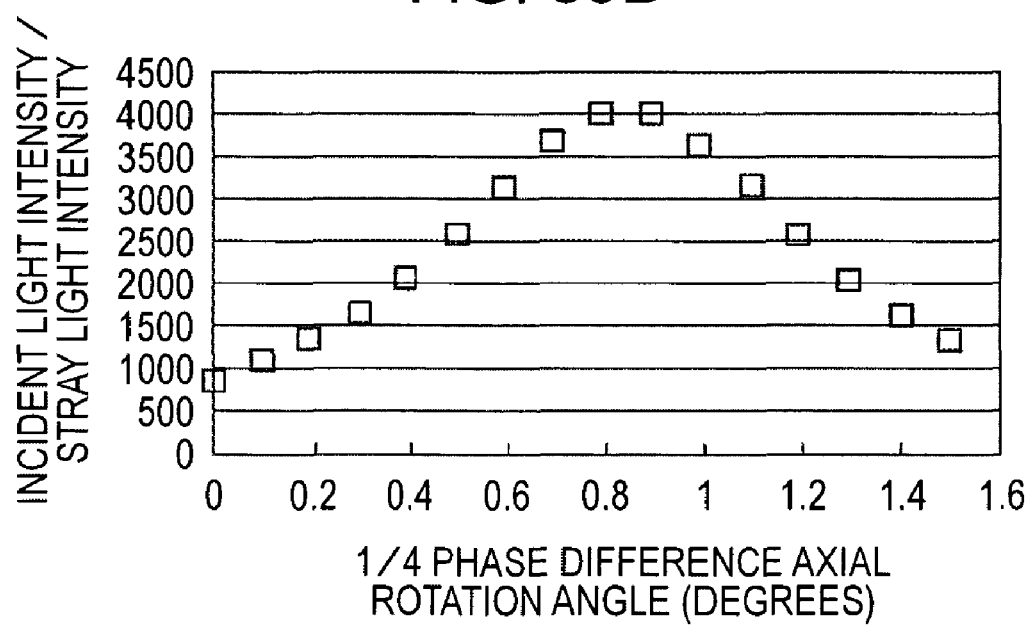
Figure 40:
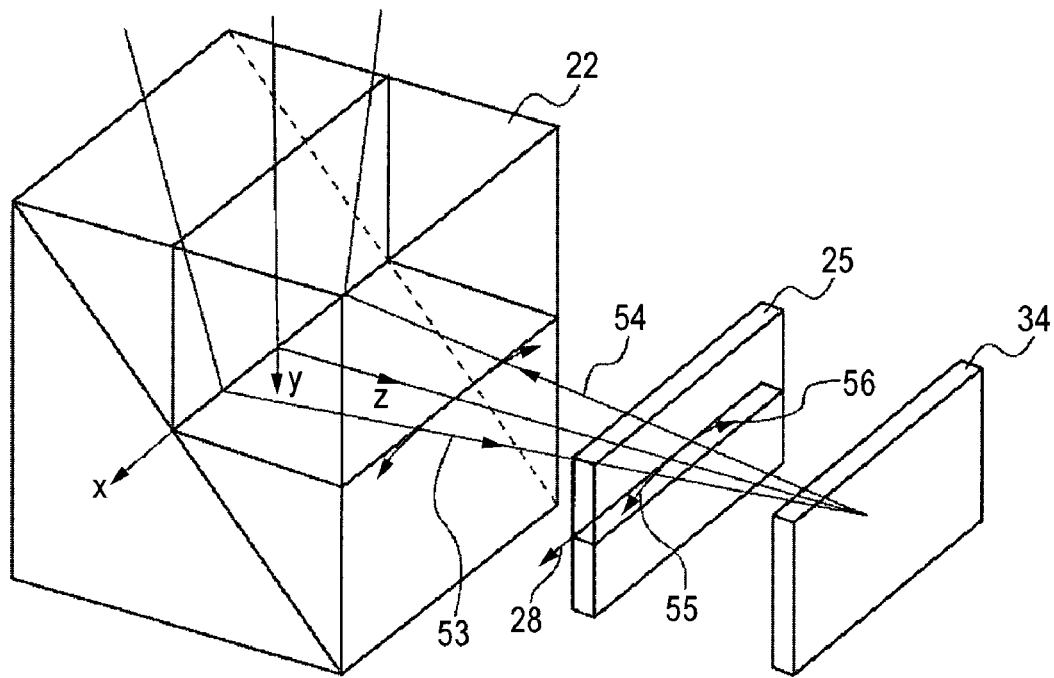
FIG. 40 illustrates a diagram showing a conventional example.
Figure 41:
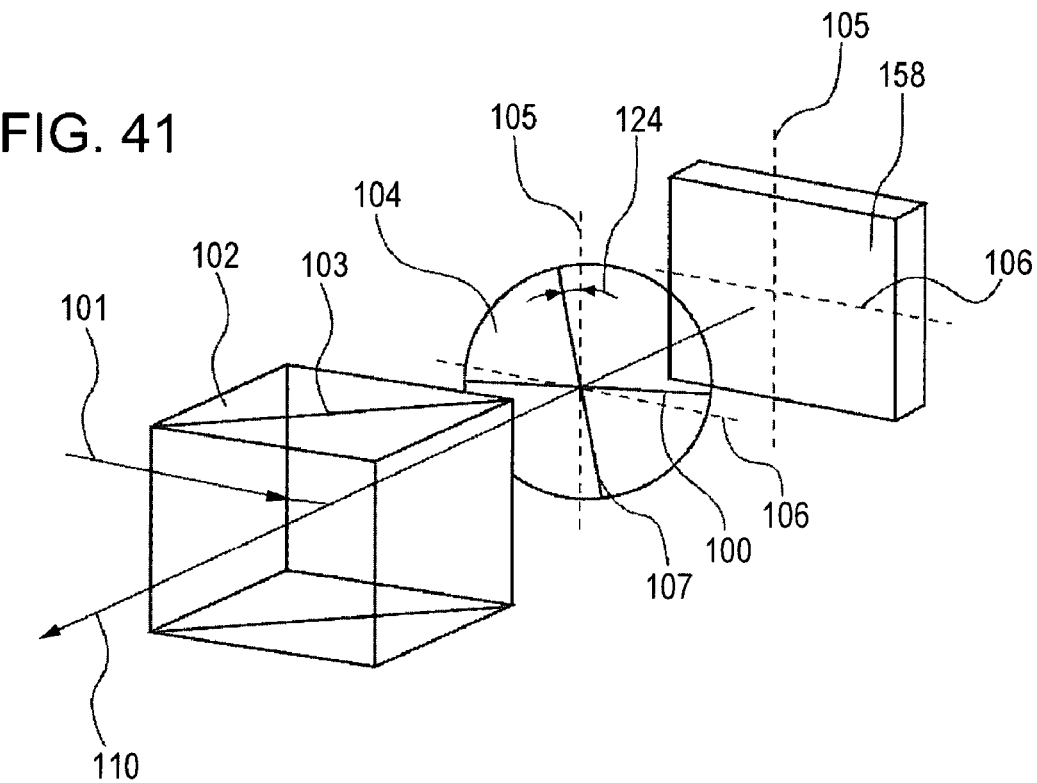
FIG. 41 illustrates a diagram showing a conventional example.
Figure 42:
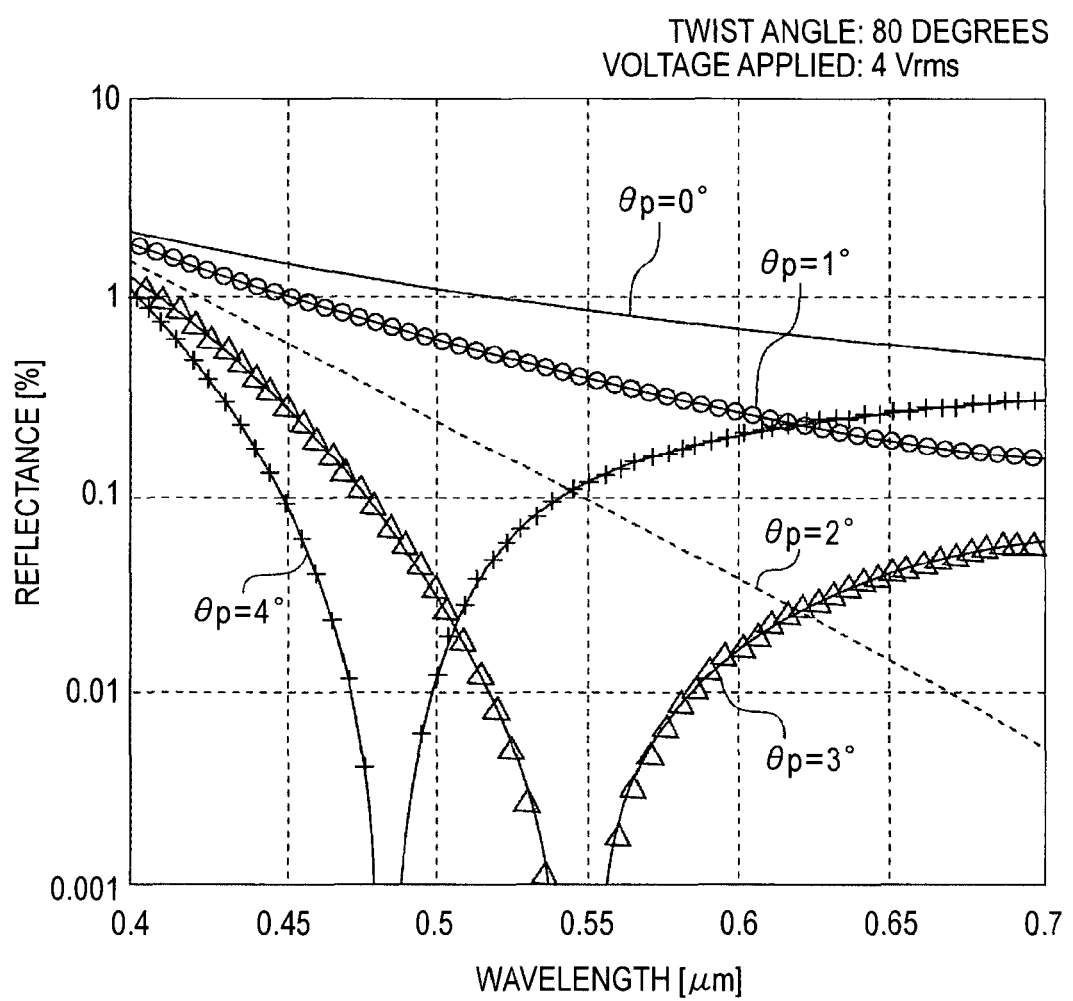
FIG. 42 illustrates a diagram showing a conventional example.

FIG. 39A illustrates the ratio of stray light intensity with respect to incident light intensity as contrast, in a case of rotation within the xy plane with the direction where the direction of the fast axis and the direction of the x axis match as a reference (where the quarter phase difference axis rotation angle=0°), and FIG. 39B in a case of rotation within the xy plane with the direction where the direction of the slow axis and the direction of the x axis match as a reference (where the quarter phase difference axis rotation angle=0°). The clockwise direction of the rotation angle of the quarter wave plate as viewed from the z positive direction is the positive direction, and the counter-clockwise direction is the negative direction.

As can be seen from FIGS. 39A and 39B, with the fast axis as the reference, the contrast is maximum at 4004 when rotated −0.9° in the negative direction, and with the slow axis as the reference, the contrast is maximum at 4005 when rotated +0.9° in the positive direction. As for contrast of 0th order light (stray light), there is no difference in performance according to the disposing direction (fast axis and slow axis direction) of the optical axis of the quarter wave plate 12g, and further, stray light can be reduced further than the case shown in FIGS. 18A and 18B where flat illumination light is cast, so contrast can be improved.

Also, in the case of the reflective liquid crystal display device 11g displaying black generating diffracted light having the phase difference pattern such as shown in FIG. 16 of the first exemplary embodiment, stray light such as shown in FIGS. 20A and 20B is generated. FIG. 20A illustrates a case where the fast axis is set with the x direction as a reference, and FIG. 20B illustrates a case where the slow axis is set with the x direction as a reference. It can be seen from FIG. 20A that the minimum value of the sum of all diffracted stray light is 0.225 with the fast axis inclined by −1.5°, and from FIG. 20B that the minimum value of the sum of all diffracted stray light is 0.045 with the slow axis inclined by +1.5°. Thus, the amount of diffraction stray light can be reduced to around one fifth, and contrast can be improved, by placing the slow axis based on the x direction, and further inclining by +1.5°.

As described above, with the illumination optical system according to the present exemplary embodiment, stray light of the 0th order light at the reflective liquid crystal display device can be reduced, and further, setting the slow axis near the x axis direction facilitates the reduction of stray diffracted light generated at the reflective liquid crystal display device, thus improving contrast.

Also, keeping the generally-parallel angle between the slow axis direction of the quarter wave plate 12g and the S-polarization direction within 5° yields images with high contrast, and keeping this within 3° yields images with even higher contrast.

The reflective liquid crystal display apparatus according to the exemplary embodiments described above can be described as follows.

The reflective liquid crystal display apparatus according to the present exemplary embodiment comprises: a polarization beam splitter having a polarization split film; a reflective liquid crystal display device; a quarter wave plate disposed between the polarization beam splitter and the reflective liquid crystal display device; and an illumination optical system for guiding a light flux from a light source in a converged state to the polarization beam splitter, and also illuminating the reflective liquid crystal display device with light from the light source via the polarization beam splitter and the quarter wave plate; where the optical axis of the illumination optical system can be inclined with respect to the polarization split film; and where, with the positive phase difference provided to convert linear polarized light into right-handed circling polarized light or elliptic polarized light and the negative phase difference provided to convert linear polarized light into left-handed circling polarized light or elliptic polarized light, the phase difference which the reflective liquid crystal display device in a black display state of the reflective liquid crystal display apparatus provides to the diffracted light occurring at the reflective liquid crystal display device is (1) positive or zero, (2) positive or zero, (3) negative or zero, (4) negative or zero; and where, with the polarization direction of S-polarized light defined by the optical axis of the illumination optical system and the polarization split film as the S-polarization direction, the polarization split film which receives the light flux in a converged state has a first region which emits light having a polarization direction inclined clockwise with respect to the S-polarization direction as viewed from the side of the reflective liquid crystal display device, and a second region which emits light having a polarization direction inclined counter-clockwise with respect to the S-polarization direction as viewed from the side of the reflective liquid crystal display device; and where the phase difference, which the reflective liquid crystal display device provides to the first diffracted light emitted from a point on the optical axis of the reflective liquid crystal display device and cast into the first region, is (1) smaller, (2) greater, (3) smaller, (4) greater than the phase difference which the reflective liquid crystal display device provides to the second diffracted light emitted from a point on the optical axis of the reflective liquid crystal display device and cast into the second region; and where the quarter wave plate can be positioned such that the direction of the (1) slow axis, (2) fast axis, (3) fast axis, (4) slow axis of the quarter wave plate and the S-polarization direction are generally parallel.

Light from the light source is cast into the polarization beam splitter and the quarter wave plate in that order, the light emitted form the quarter wave plate illuminates the reflective liquid crystal display device, and the light reflected off of the reflective liquid crystal display device passes through the quarter wave plate and the polarization beam splitter and is input to the projection optical system.

Also, the optical axis of the illumination optically system can be inclined with respect to the face of the polarization split film (the normal line of the face of the polarization split film) at an angle of 40° to 50°, and in at least one exemplary embodiment, 44.5° to 45.5°, and the light flux converged at the illumination optical system is cast into the polarization split face. Here, the light from the light source is divided into multiple light fluxes within the illumination optical system, and each of the divided light fluxes is cast into the polarization split face in the converged state.

Also, the aforementioned S-polarization direction is a direction defined by the optical axis of the illumination optical system, that is, defined by a beam traveling the optical axis of the illumination optical system and the polarization split face (in other words, the polarization direction of S-polarization light at the time of the beam traveling the optical axis of the illumination optical system being cast into the polarization split face), and the direction substantially perpendicular to the S-polarization direction in a plane substantially perpendicular to the optical axis of the above illumination optical system is called the P-polarization direction.

It should be noted that black display refers to a state where light input to the reflective liquid crystal device is shielded from the downstream optical systems (e.g., projection optical system, etc.), and this can be shielded by absorption or by reflection. With the present exemplary embodiment, the light is shielded by being reflected with the polarization beam splitter. Of course, complete shielding of light cast into the reflective liquid crystal display device is impractical, so a small amount of stray light is permissible. Also, arrangements where light is intentionally leaked during black display can be conceived. From a different perspective, the black display state is a state of the reflective liquid crystal display apparatus (reflective liquid crystal display device) where the original image (the original image upon which the image to be displayed using the reflective liquid crystal display apparatus is based upon) is solid black, and does not mean a state where the displayed image is solid black.

Also, the first region (the upper half region of the liquid crystal display device 105a in FIG. 1) is a region where, in the polarization split face 103a in FIG. 1, light is emitted having a polarization direction inclined in the clockwise direction as with 107a with respect to the X axis when viewed from the reflective liquid crystal display device 105a side, and the second region (the lower half region of the liquid crystal display device 105a in FIG. 1) is a region where, in the polarization split face 103a in FIG. 1, light is emitted having a polarization direction inclined in the counter-clockwise direction as with 107b with respect to the X axis when viewed from the reflective liquid crystal display device 105a side.

Also, a description has been made where the quarter wave plate is disposed such that the direction of the slow axis (fast axis) of the quarter wave plate and the S-polarization direction are generally parallel; this term "generally parallel" meaning that the angle between the two should be within 5°, and more suitably within 3°. In the case of using multiple reflective liquid crystal display devices, at least one exemplary embodiment satisfies this condition. Also, in a case of using three reflective liquid crystal display devices (e.g., for the three wavelength regions of red, green, and blue), at least two should satisfy this condition, and regarding the two (e.g., liquid crystal display device for the wavelength regions of red and green) and arrangements can be made where the angle between the slow axis (fast axis) of the quarter wave plate and the S-polarization direction is within 2° (more suitably within 1)°, and the other (e.g., the liquid crystal display device for the blue wavelength region) is within 5° (more suitably within 3)°.

This illumination optical system has a configuration where the focal distance, total power, sum of positive power alone, sum of negative power alone, etc., differ between two planes substantially orthogonally intersecting with inclusion of the optical axis of the illumination optical system.

Multiple first lenses (e.g., cylindrical lenses having refractive power essentially in the first direction, toric lenses having some refractive power in the second direction substantially orthogonal to the first direction, other multiple lenses as known by one of ordinary skill in the relevant art, and equivalents) are arrayed along the first direction crossing the optical axis of the illumination optical system, and suitably comprises a first integrator (cylindrical lens array, 3a in FIG. 12) for dividing the light from the light source into multiple light fluxes (along the first direction), a second integrator (cylindrical lens array, 3b in FIG. 12) where multiple second lenses are disposed corresponding to the multiple first lenses, and a first optical system for irradiating the multiple optical fluxes emitted from the second integrator on the reflective liquid crystal display device in a superimposed manner (while irradiating a substantial portion of the light fluxes so as to be superimposed one upon another, an arrangement where each light flux is guided to the reflective liquid crystal display device in a manner overlapped with each other is permissible) with regard to the first direction (or a first plane including the first direction and the optical axis of the illumination optical system). The arrangement can also have a second optical system having a second direction substantially orthogonal to the first direction, for guiding the light flux from the light source to the reflective liquid crystal display device with the diameter thereof reduced in a plane including the second direction. The second optical system suitably forms an afocal system with regard to the second direction (second plane including the second direction and the optical axis of the illumination optical system), so with respect to guide the generally parallel light from the light source to the reflective liquid crystal display device while reducing the width thereof with regard to this second direction (second plane).

While the present invention has been described with reference to exemplary embodiments, it is to be understood that the invention is not limited to the discussed exemplary embodiments. The scope of the following claims is to be accorded the broadest interpretation so with respect to encompass all modifications, equivalent structures and functions. For example, in the interest of acting as ones own lexicographer, although the following claims may cite terms such as "perpendicular", "orthogonal", "vertical", "horizontal", the intended meaning of these terms within the scope of the claims is to include arrangements of "substantially perpendicular" or "essentially perpendicular", "substantially orthogonal" or "essentially orthogonal", "substantially vertical" or "essentially vertical", and "substantially horizontal" or "essentially horizontal."

What is claimed is:

1. A reflective liquid crystal display apparatus comprising:
a polarization beam splitter having a polarization split film;
a reflective liquid crystal display device;
a quarter wave plate disposed between the polarization beam splitter and the reflective liquid crystal display device; and
an illumination optical system configured for guiding a light flux from a light source in a converged state to the polarization beam splitter, and also illuminating the reflective liquid crystal display device with light from the light source via the polarization beam splitter and the quarter wave plate,
wherein an optical axis of the illumination optical system is inclined with respect to the polarization split film;
wherein, with the positive phase difference provided to convert linear polarized light into right-handed circling polarized light or elliptic polarized light and the negative phase difference provided to convert linear polarized light into left-handed circling polarized light or elliptic polarized light, the phase difference which the reflective liquid crystal display device in a black display state of the reflective liquid crystal display apparatus provides to the diffracted light occurring at the reflective liquid crystal display device is positive or zero,
wherein, with the polarization direction of S-polarized light defined by the optical axis of the illumination optical system and the polarization split film as the S-polarization direction, the polarization split film which receives the light flux in a converged state has a first region which emits light having a polarization direction inclined clockwise with respect to the S-polarization direction as viewed from the side of the reflective liquid crystal display device, and a second region which emits light having a polarization direction inclined counterclockwise with respect to the S-polarization direction as viewed from the side of the reflective liquid crystal display device,
wherein a cross-point is an intersection point of the optical axis of the illumination optical system and the reflective liquid crystal display,
wherein the phase difference, which the reflective liquid crystal display device provides to the first diffracted light emitted from the cross-point and cast into the first region, is greater than the phase difference which the reflective liquid crystal display device provides to the second diffracted light emitted from the cross-point and cast into the second region,
and wherein the quarter wave plate can be positioned such that the direction of the fast axis of the quarter wave plate and the S-polarization direction are generally parallel.

2. The apparatus according to claim 1, wherein, of the incident light flux from the polarization beam splitter converging at the cross-point, with a plane containing the polarization direction of S-polarized light defined by the optical axis of the illumination optical system and the polarization split film of the polarization beam splitter as the S-polarization plane, and with a plane containing the polarization direction of P-polarized light defined by the optical axis of the illumination optical system and the polarization split film of the polarization beam splitter as the P-polarization plane, the intensity of incident light cast into the reflective liquid crystal display device through the S-polarization plane is greater than the intensity of incident light cast into the reflective liquid crystal display device through the P-polarization plane.

3. The apparatus according to claim 1, wherein, of the incident light flux from the polarization beam splitter converging at the cross-point, with a plane containing the polarization direction of S-polarized light defined by the optical axis of the illumination optical system and the polarization split film of the polarization beam splitter as the S-polarization plane, and with a plane passing through the optical axis of the illumination optical system and assuming a 45° angle to the S-polarization plane as a 45° plane, the intensity of incident light cast into the reflective liquid crystal display device through the S-polarization plane is greater than the intensity of incident light cast into the reflective liquid crystal display device through the 45° plane.

4. The apparatus according to claim 1, wherein, of the incident light flux from the polarization beam splitter converging at the cross-point, with a plane containing the polarization direction of P-polarized light defined by the optical axis of the illumination optical system and the polarization split film of the polarization beam splitter as the P-polarization plane, and with a plane passing through optical axis of the illumination optical system and assuming a 45° angle to the P-polarization plane as a 45° plane, the intensity of incident light cast into the reflective liquid crystal display device through the P-polarization plane is greater than the intensity of incident light cast into the reflective liquid crystal display device through the 45° plane.

5. The apparatus according to claim 1, further comprising:
a first integrator, configured with a plurality of first lenses arrayed in a first direction intersecting the optical axis of the illumination optical system, for splitting light from the light source into a plurality of light fluxes;
a second integrator wherein are arrayed a plurality of second lenses corresponding to the plurality of first lenses;
a first optical system configured for irradiating the plurality of light fluxes emitted from the second integrator on the reflective liquid crystal display device in a superimposed manner; and
a second optical system having optical power in a second direction orthogonal to the first direction, configured for compressing the diameter of the light flux from the light source within a plane including the second direction, guided to the reflective liquid crystal display device.

* * * * *